US011660779B2

(12) United States Patent
Monkman et al.

(10) Patent No.: US 11,660,779 B2
(45) Date of Patent: May 30, 2023

(54) METHODS AND COMPOSITIONS FOR TREATMENT OF CONCRETE WASH WATER

(71) Applicant: CarbonCure Technologies Inc., Dartmouth (CA)

(72) Inventors: George Sean Monkman, Halifax (CA); Mark MacDonald, New Brunswick (CA); Dean Paul Forgeron, Nova Scotia (CA)

(73) Assignee: CARBONCURE TECHNOLOGIES INC., Dartmouth (CA)

( * ) Notice: Subject to any disclaimer, the term of this patent is extended or adjusted under 35 U.S.C. 154(b) by 530 days.

(21) Appl. No.: 16/155,013

(22) Filed: Oct. 9, 2018

(65) Prior Publication Data
US 2019/0168416 A1 Jun. 6, 2019

Related U.S. Application Data

(63) Continuation of application No. PCT/CA2017/050445, filed on Apr. 11, 2017.
(Continued)

(51) Int. Cl.
| B28B 5/00 | (2006.01) |
| B28C 5/00 | (2006.01) |
| B28C 5/42 | (2006.01) |
| B28C 7/02 | (2006.01) |
| B28C 7/12 | (2006.01) |
(Continued)

(52) U.S. Cl.
CPC ............ *B28C 5/003* (2013.01); *B28C 5/00* (2013.01); *B28C 5/42* (2013.01); *B28C 7/02* (2013.01); *B28C 7/024* (2013.01); *B28C 7/12* (2013.01); *C02F 1/5209* (2013.01); *C02F 1/5236* (2013.01); *C02F 1/66* (2013.01); *C04B 22/0046* (2013.01); *C04B 28/04* (2013.01); *C04B 28/08* (2013.01); *C04B 40/02* (2013.01); *C04B 40/029* (2013.01); *C02F 2103/12* (2013.01)

(58) Field of Classification Search
CPC .......... B28C 5/003; B28C 5/42; B28C 7/024; B28C 7/12; C02F 1/5209; C02F 1/5236; C02F 1/66; C02F 2103/12; C04B 22/0046; C04B 28/04; C04B 28/08; C04B 40/029
See application file for complete search history.

(56) References Cited

U.S. PATENT DOCUMENTS

| 128,980 A | 7/1872 | Rowland |
| 170,594 A | 11/1875 | Richardson |
(Continued)

FOREIGN PATENT DOCUMENTS

| AU | 2397377 A | 10/1978 |
| AU | 504446 B2 | 10/1979 |
(Continued)

OTHER PUBLICATIONS

Co-pending U.S. Appl. No. 16/249,012, filed Jan. 16, 2019.
(Continued)

*Primary Examiner* — Anshu Bhatia
(74) *Attorney, Agent, or Firm* — Storella & Witt, LLP

(57) ABSTRACT

The invention provides methods and compositions for treating wash water from concrete production with carbon dioxide. The treated wash water can be reused as mix water in fresh batches of concrete.

18 Claims, 58 Drawing Sheets

Related U.S. Application Data

(60) Provisional application No. 62/321,013, filed on Apr. 11, 2016.

(51) Int. Cl.
*C04B 22/00* (2006.01)
*C04B 40/02* (2006.01)
*C02F 1/52* (2023.01)
*C02F 1/66* (2023.01)
*C04B 28/04* (2006.01)
*C04B 28/08* (2006.01)
*C02F 103/12* (2006.01)

(56) References Cited

U.S. PATENT DOCUMENTS

| | | |
|---|---|---|
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Kilburn |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 3,976,445 A | 8/1976 | Douglas et al. |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,375,755 A | 3/1983 | Barbini et al. |
| 4,420,868 A | 12/1983 | McEwen et al. |
| 4,427,610 A | 1/1984 | Murray |
| 4,436,498 A | 3/1984 | Murray |
| 4,526,534 A | 7/1985 | Wollmann |
| 4,588,299 A | 5/1986 | Brown et al. |
| 4,609,303 A | 9/1986 | Shumaker |
| 4,613,472 A | 9/1986 | Svanholm |
| 4,746,481 A | 5/1988 | Schmidt |
| 4,772,439 A | 9/1988 | Trevino-Gonzalez |
| 4,789,244 A | 12/1988 | Dunton et al. |
| 4,846,580 A | 7/1989 | Oury |
| 4,881,347 A | 11/1989 | Mario et al. |
| 4,917,587 A | 4/1990 | Alpar et al. |
| 4,944,595 A | 7/1990 | Hodson |
| 5,051,217 A | 9/1991 | Alpar et al. |
| 5,141,363 A | 8/1992 | Stephens |
| 5,158,996 A | 10/1992 | Valenti |
| 5,162,402 A | 11/1992 | Ogawa et al. |
| 5,203,919 A | 4/1993 | Bobrowski et al. |
| 5,220,732 A | 6/1993 | Lee |
| 5,232,496 A | 8/1993 | Jennings et al. |
| 5,244,498 A | 9/1993 | Steinke |
| 5,257,464 A | 11/1993 | Trevino-Gonzales |
| 5,298,475 A | 3/1994 | Shibata et al. |
| 5,352,035 A | 10/1994 | Macaulay et al. |
| 5,356,579 A | 10/1994 | Jennings et al. |
| 5,358,566 A | 10/1994 | Tanaka et al. |
| 5,360,660 A | 11/1994 | Nohlgren |
| 5,393,343 A | 2/1995 | Darwin et al. |
| 5,419,632 A | 5/1995 | Stephens |
| 5,427,617 A | 6/1995 | Bobrowski et al. |
| 5,451,104 A | 9/1995 | Kleen et al. |
| 5,453,123 A | 9/1995 | Burge et al. |
| 5,458,470 A | 10/1995 | Mannhart et al. |
| 5,494,516 A | 2/1996 | Drs et al. |
| 5,505,987 A | 4/1996 | Jennings et al. |
| 5,518,540 A | 5/1996 | Jones, Jr. |
| 5,583,183 A | 12/1996 | Darwin et al. |
| 5,609,681 A | 3/1997 | Drs et al. |
| 5,612,396 A | 3/1997 | Valenti et al. |
| 5,624,493 A * | 4/1997 | Wagh ................. C04B 7/36 106/738 |
| 5,633,298 A | 5/1997 | Arfaei et al. |
| 5,643,978 A | 7/1997 | Darwin et al. |
| 5,650,562 A | 7/1997 | Jones, Jr. |
| 5,660,626 A | 8/1997 | Ohta et al. |
| 5,661,206 A | 8/1997 | Tanaka et al. |
| 5,665,158 A | 9/1997 | Darwin et al. |
| 5,667,298 A | 9/1997 | Musil et al. |
| 5,668,195 A | 9/1997 | Leikauf |
| 5,669,968 A | 9/1997 | Kobori et al. |
| 5,674,929 A | 10/1997 | Melbye |
| 5,676,905 A | 10/1997 | Andersen et al. |
| 5,690,729 A | 11/1997 | Jones, Jr. |
| 5,703,174 A | 12/1997 | Arfaei et al. |
| 5,725,657 A | 3/1998 | Darwin et al. |
| 5,728,207 A | 3/1998 | Arfaei et al. |
| 5,744,078 A | 4/1998 | Soroushian et al. |
| 5,752,768 A | 5/1998 | Assh |
| 5,753,744 A | 5/1998 | Darwin et al. |
| 5,798,425 A | 8/1998 | Albrecht et al. |
| 5,800,752 A | 9/1998 | Charlebois |
| 5,803,596 A | 9/1998 | Stephens |
| 5,804,175 A | 9/1998 | Ronin et al. |
| 5,840,114 A | 11/1998 | Jeknavorian et al. |
| 5,873,653 A | 2/1999 | Paetzold |
| 5,882,190 A | 3/1999 | Doumet |
| 5,885,478 A | 3/1999 | Montgomery et al. |
| 5,912,284 A | 6/1999 | Hirata et al. |
| 5,935,317 A | 8/1999 | Soroushian et al. |
| 5,947,600 A | 9/1999 | Maeda et al. |
| 5,965,201 A | 10/1999 | Jones, Jr. |
| 6,008,275 A | 12/1999 | Moreau et al. |
| 6,023,941 A | 2/2000 | Rhoades |
| 6,042,258 A | 3/2000 | Hines et al. |
| 6,042,259 A | 3/2000 | Hines et al. |
| 6,063,184 A | 5/2000 | Leikauf et al. |
| 6,066,262 A | 5/2000 | Montgomery et al. |
| 6,113,684 A | 9/2000 | Kunbargi |
| 6,136,950 A | 10/2000 | Vickers, Jr. et al. |
| 6,187,841 B1 | 2/2001 | Tanaka et al. |
| 6,264,736 B1 | 7/2001 | Knopf et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,318,193 B1 | 11/2001 | Brock et al. |
| 6,334,895 B1 | 1/2002 | Bland |
| 6,372,157 B1 | 4/2002 | Krill, Jr. et al. |
| 6,387,174 B2 | 5/2002 | Knopf et al. |
| 6,418,948 B1 | 7/2002 | Harmon |
| 6,451,105 B1 | 9/2002 | Turpin, Jr. |
| 6,463,958 B1 | 10/2002 | Schwing |
| 6,517,631 B2 | 2/2003 | Bland |
| 6,648,551 B1 | 11/2003 | Taylor |
| 6,682,655 B2 | 1/2004 | Beckham et al. |
| 6,871,667 B2 | 3/2005 | Schwing et al. |
| 6,890,497 B2 | 5/2005 | Rau et al. |
| 6,936,098 B2 | 8/2005 | Ronin |
| 6,960,311 B1 | 11/2005 | Mirsky et al. |
| 6,997,045 B2 | 2/2006 | Wallevik et al. |
| 7,003,965 B2 | 2/2006 | Auer et al. |
| 7,201,018 B2 | 4/2007 | Gershtein et al. |
| 7,390,444 B2 | 6/2008 | Ramme et al. |
| 7,399,378 B2 | 7/2008 | Edwards et al. |
| 7,419,051 B2 | 9/2008 | Damkjaer et al. |

(56) References Cited

U.S. PATENT DOCUMENTS

| | | |
|---|---|---|
| 7,549,493 B1 | 6/2009 | Jones |
| 7,588,661 B2 | 9/2009 | Edwards et al. |
| 7,635,434 B2 | 12/2009 | Mickelson et al. |
| 7,704,349 B2 | 4/2010 | Edwards et al. |
| 7,735,274 B2 | 6/2010 | Constantz et al. |
| 7,736,430 B2 | 6/2010 | Barron et al. |
| 7,771,684 B2 | 8/2010 | Constantz et al. |
| 7,815,880 B2 | 10/2010 | Constantz et al. |
| 7,879,146 B2 | 2/2011 | Raki et al. |
| 7,906,086 B2 | 3/2011 | Comrie |
| 7,914,685 B2 | 3/2011 | Constantz et al. |
| 7,922,809 B1 | 4/2011 | Constantz et al. |
| 7,950,841 B2 | 5/2011 | Klein et al. |
| 7,966,250 B2 | 6/2011 | Constantz et al. |
| 8,006,446 B2 | 8/2011 | Constantz et al. |
| 8,043,426 B2 | 10/2011 | Mohamed et al. |
| 8,105,558 B2 | 1/2012 | Comrie |
| 8,114,214 B2 | 2/2012 | Constantz et al. |
| 8,114,367 B2 | 2/2012 | Riman et al. |
| 8,118,473 B2 | 2/2012 | Cooley et al. |
| 8,137,455 B1 | 3/2012 | Constantz et al. |
| 8,157,009 B2 | 4/2012 | Patil et al. |
| 8,177,909 B2 | 5/2012 | Constantz et al. |
| 8,192,542 B2 | 6/2012 | Virtanen |
| 8,235,576 B2 | 8/2012 | Klein et al. |
| 8,272,205 B2 | 9/2012 | Estes et al. |
| 8,287,173 B2 | 10/2012 | Khouri |
| 8,311,678 B2 | 11/2012 | Koehler et al. |
| 8,313,802 B2 | 11/2012 | Riman et al. |
| 8,333,944 B2 | 12/2012 | Constantz et al. |
| 8,470,275 B2 | 6/2013 | Constantz et al. |
| 8,491,858 B2 | 7/2013 | Seeker et al. |
| 8,503,596 B2 | 8/2013 | Sheets |
| 8,518,176 B2 | 8/2013 | Silva et al. |
| 8,584,864 B2 | 11/2013 | Lee et al. |
| 8,708,547 B2 | 4/2014 | Bilger |
| 8,709,960 B2 | 4/2014 | Riman et al. |
| 8,721,784 B2 | 5/2014 | Riman et al. |
| 8,746,954 B2 | 6/2014 | Cooley et al. |
| 8,845,940 B2 | 9/2014 | Niven et al. |
| 8,989,905 B2 | 3/2015 | Sostaric et al. |
| 9,028,607 B2 | 5/2015 | Ramme |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B1 | 7/2016 | Niven et al. |
| 9,429,558 B2 | 8/2016 | Boncan et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 10,246,379 B2 | 4/2019 | Niven et al. |
| 10,350,787 B2 | 7/2019 | Forgeron et al. |
| 10,392,305 B2 | 8/2019 | Wang et al. |
| 10,570,064 B2 | 2/2020 | Monkman et al. |
| 10,683,237 B2 | 6/2020 | Lee et al. |
| 10,927,042 B2 | 2/2021 | Monkman et al. |
| 11,090,700 B1 | 8/2021 | Camell |
| 2002/0019459 A1 | 2/2002 | Albrecht et al. |
| 2002/0047225 A1 | 4/2002 | Bruning et al. |
| 2002/0179119 A1* | 12/2002 | Harmon ............ B01F 15/00032 134/22.18 |
| 2003/0070448 A1 | 4/2003 | Gasteyer et al. |
| 2003/0122273 A1 | 7/2003 | Fifield |
| 2005/0131600 A1 | 6/2005 | Quigley et al. |
| 2005/0219938 A1 | 10/2005 | Rigaudon et al. |
| 2005/0219939 A1 | 10/2005 | Christenson et al. |
| 2007/0114178 A1 | 5/2007 | Coppola et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1* | 9/2007 | Barron ............... C04B 28/021 166/292 |
| 2008/0092957 A1 | 4/2008 | Rosaen |
| 2008/0174041 A1 | 7/2008 | Firedman et al. |
| 2008/0183523 A1 | 7/2008 | Dikeman |
| 2008/0202389 A1 | 8/2008 | Hojaji et al. |
| 2008/0245274 A1 | 10/2008 | Ramme |
| 2008/0264872 A1 | 10/2008 | Konishi et al. |
| 2008/0275149 A1 | 11/2008 | Ladely et al. |
| 2008/0308133 A1 | 12/2008 | Grubb et al. |
| 2008/0316856 A1 | 12/2008 | Cooley et al. |
| 2009/0044832 A1* | 2/2009 | Leonardich ............... B08B 3/14 134/10 |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0086983 A1 | 4/2010 | Gellett et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0023659 A1 | 2/2011 | Nguyên et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0262328 A1 | 10/2011 | Wijmans et al. |
| 2011/0277670 A1 | 11/2011 | Self et al. |
| 2011/0281333 A1 | 11/2011 | Brown et al. |
| 2011/0289901 A1 | 12/2011 | Estes et al. |
| 2011/0303551 A1 | 12/2011 | Gilliam et al. |
| 2011/0320040 A1 | 12/2011 | Koehler et al. |
| 2012/0031303 A1 | 2/2012 | Constantz et al. |
| 2012/0153153 A1 | 6/2012 | Chang et al. |
| 2012/0238006 A1 | 9/2012 | Gartner et al. |
| 2012/0290208 A1 | 11/2012 | Jiang et al. |
| 2012/0298011 A1 | 11/2012 | Silva et al. |
| 2012/0312194 A1 | 12/2012 | Riman et al. |
| 2013/0025317 A1 | 1/2013 | Terrien et al. |
| 2013/0036945 A1 | 2/2013 | Constantz et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 | 7/2014 | Joensson et al. |
| 2014/0212941 A1 | 7/2014 | Lee |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0274537 A1 | 10/2015 | Myers et al. |
| 2015/0298351 A1 | 10/2015 | Beaupré |
| 2015/0345034 A1 | 12/2015 | Sundara et al. |
| 2015/0355049 A1 | 12/2015 | Ait et al. |
| 2016/0001462 A1 | 1/2016 | Forgeron et al. |
| 2016/0107939 A1 | 4/2016 | Monkman et al. |
| 2016/0185662 A9 | 6/2016 | Niven et al. |
| 2016/0272542 A1 | 9/2016 | Monkman et al. |
| 2016/0280610 A1 | 9/2016 | Forgeron et al. |
| 2016/0340253 A1 | 11/2016 | Forgeron et al. |

(56) References Cited

U.S. PATENT DOCUMENTS

| | | |
|---|---|---|
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2017/0252714 A1 | 9/2017 | Bennett et al. |
| 2018/0022654 A1 | 1/2018 | Forgeron et al. |
| 2018/0029934 A1 | 2/2018 | Monkman et al. |
| 2018/0118622 A1 | 5/2018 | Monkman et al. |
| 2018/0252444 A1 | 9/2018 | Nelson et al. |
| 2018/0258000 A1 | 9/2018 | Lee et al. |
| 2019/0168416 A1 | 6/2019 | Monkman et al. |
| 2020/0165170 A1 | 5/2020 | Niven et al. |
| 2020/0223760 A1 | 7/2020 | Monkman et al. |
| 2020/0282595 A1 | 9/2020 | Monkman et al. |
| 2022/0001578 A1 | 1/2022 | Forgeron et al. |
| 2022/0013196 A1 | 1/2022 | Monkman et al. |
| 2022/0065527 A1 | 3/2022 | Forgeron et al. |
| 2022/0194852 A1 | 6/2022 | Thomas et al. |

FOREIGN PATENT DOCUMENTS

| | | |
|---|---|---|
| AU | 2017249444 A1 | 11/2018 |
| AU | 2018288555 A1 | 1/2020 |
| CA | 970935 A1 | 7/1975 |
| CA | 1045073 A | 12/1978 |
| CA | 1072440 A | 2/1980 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CA | 2943791 A1 | 10/2015 |
| CA | 3019860 A1 | 10/2017 |
| CA | 3068082 A1 | 12/2018 |
| CL | 1785744 | 12/2019 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 101844826 A | 9/2010 |
| CN | 203357623 U | 12/2013 |
| CN | 105102370 A | 11/2015 |
| CN | 104045251 B | 6/2016 |
| CN | 105174766 B | 5/2017 |
| CN | 107814530 A | 3/2018 |
| CN | 106746828 B | 5/2019 |
| CN | 110590260 A | 12/2019 |
| DE | 1817001 A1 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0639650 A1 | 2/1995 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2887651 A1 | 6/2015 |
| EP | 2036952 B1 | 4/2016 |
| EP | 3013544 A1 | 5/2016 |
| EP | 2387551 B1 | 7/2016 |
| EP | 1985754 B1 | 8/2016 |
| EP | 3081842 A1 | 10/2016 |
| EP | 3129126 A1 | 2/2017 |
| EP | 3129126 A4 | 11/2018 |
| EP | 3442761 A1 | 2/2019 |
| EP | 3642170 A4 | 3/2021 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| FR | 2805532 A1 | 8/2001 |
| FR | 2969997 B1 | 3/2015 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2300631 A | 11/1996 |
| GB | 2302090 A | 1/1997 |
| GB | 2392502 A | 3/2004 |
| GB | 2467005 A | 7/2010 |
| IN | 201817042016 A | 4/2017 |
| IN | 201917054847 A | 12/2019 |

(56) References Cited

FOREIGN PATENT DOCUMENTS

| | | |
|---|---|---|
| JP | S56115423 A | 9/1981 |
| JP | S5850197 A | 3/1983 |
| JP | S60187354 A | 9/1985 |
| JP | S1050654 A | 3/1986 |
| JP | S62122710 A | 6/1987 |
| JP | S1026403 A | 1/1989 |
| JP | H0218368 A | 1/1990 |
| JP | H0254504 U | 4/1990 |
| JP | H05116135 A | 5/1993 |
| JP | H05116135 A | 5/1993 |
| JP | H05117012 A | 5/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |
| JP | H09124099 A | 5/1997 |
| JP | H10194798 A | 7/1998 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2001026418 A | 1/2001 |
| JP | 2001170659 A | 6/2001 |
| JP | 2002012480 A | 1/2002 |
| JP | 2002127122 A | 5/2002 |
| JP | 3311436 B2 | 8/2002 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 3147769 U | 1/2009 |
| JP | 2009115209 A | 5/2009 |
| JP | 2009136770 A | 6/2009 |
| JP | 4313352 B2 | 8/2009 |
| JP | 2010125386 A | 6/2010 |
| JP | 2011073891 A | 4/2011 |
| JP | 2014213479 A | 11/2014 |
| JP | 2017074552 A | 4/2017 |
| JP | 2020524103 A | 8/2020 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060064557 A | 6/2006 |
| KR | 100766364 B1 | 10/2007 |
| KR | 100950009 B1 | 3/2010 |
| KR | 20110048266 A | 5/2011 |
| MX | 2018012464 A | 8/2019 |
| MX | 2019015651 | 12/2019 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SG | 11201810010 P | 12/2018 |
| SG | 11201912759 R | 1/2020 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | 2008057275 A2 | 5/2008 |
| WO | WO-2008149389 A1 | 12/2008 |
| WO | WO-2008149390 A1 | 12/2008 |
| WO | WO-2009078430 A1 | 6/2009 |
| WO | WO-2009089906 A1 | 7/2009 |
| WO | WO-2009132692 A1 | 11/2009 |
| WO | 2010048457 A1 | 4/2010 |
| WO | WO-2010074811 A1 | 7/2010 |
| WO | WO-2012079173 A1 | 6/2012 |
| WO | WO-2012081486 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | WO-2014121198 A1 | 8/2014 |
| WO | 2014154741 A1 | 10/2014 |
| WO | WO-2014205577 A1 | 12/2014 |
| WO | WO-2015123769 A1 | 8/2015 |
| WO | 2015154162 A1 | 10/2015 |
| WO | WO-2015/154174 | 10/2015 |
| WO | WO-2015154162 A1 | 10/2015 |
| WO | WO-2016041054 A1 | 3/2016 |
| WO | 2016082030 A1 | 6/2016 |
| WO | WO-2016082030 | 6/2016 |
| WO | WO-2016082030 A1 | 6/2016 |
| WO | WO-2017000075 A1 | 1/2017 |
| WO | WO-2017041176 | 3/2017 |
| WO | 2017177324 A1 | 10/2017 |
| WO | WO-2017177324 A1 | 10/2017 |
| WO | 2018232507 A1 | 12/2018 |
| WO | WO-2018232507 A1 | 12/2018 |

OTHER PUBLICATIONS

U.S. Appl. No. 15/184,219 Office Action dated Feb. 4, 2019.
U.S. Appl. No. 15/240,954 Ex Parte Quayle Office action dated Feb. 5, 2019.
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
Cheung et al. Impact of admixtures on the hydration kinetics of Portland cement. Cement and Concrete Research 41:1289-1309 (2011).
"Clear Edge Filtration—Screen and Filter, Process Belts, and Screen Print," Mining-Techology.com, no date, [retrieved on May 25, 2010], Retrieved from: http/www.mining-technology.com/contractors/filtering/clear-edge/, 2 pages.
Co-pending U.S. Appl. No. 15/911,573, filed Mar. 5, 2018.
Co-pending U.S. Appl. No. 15/649,339, filed Jul. 13, 2017.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/096,018, filed Dec. 23, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.

(56) References Cited

OTHER PUBLICATIONS

Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/976,360, filed Apr. 7, 2014.
Co-pending U.S. Appl. No. 61/980,505, filed Apr. 16, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/.
EP15862209.2 Partial Supplementary European Search Report dated Jun. 20, 2018.
Estes-Haselbach. The greenest concrete mixer—carbon sequestration in freshly mixed concrete. Sep. 25, 2012.
European search report dated Nov. 7, 2017 for EP Application No. 15776706.
European search report with written opinion dated Feb. 2, 2017 for EP2951122.
European search report with written opinion dated Nov. 14, 2017 for EP Application No. 15777459.
European search report with written opinion dated Nov. 29, 2017 for EP15780122.
European search report with written opinion dated Jan. 20, 2017 for EP14818442.
European search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: Charleroi Lock & Dam," Construction Today, 2010, [retrieved on May 25, 2010], Retrieved from http://www.construction-today.com/cms1/content/view/1909/104/, 2 pages.
"GLENIUM® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.

Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International Search Report and Written Opinion dated Aug. 30, 2016 for International application No. PCT/CA2016/050773.
International search report and written opinion dated Sep. 18, 2014 for PCT/CA2014/050611.
International Search Report and Written Opinion dated Oct. 19, 2016 for International Application No. PCT/CA2016/051062.
International search report dated May 16, 2014 for PCT Application No. PCT/US14/14447.
International search report with written opinion dated Jun. 15, 2017 for PCT/CA2017/050445.
International search report with written opinion dated Jul. 3, 2016 for PCT/CA2015/050195.
Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Kim, et al. Properties of cement-based mortars substituted by carbonated fly ash and carbonated under supercritical conditions. IJAER. 9(24), 25525-25534 (2014).
Lange, et al. Preliminary investigation into the effects of carbonation on cement-solidified hazardous wastes. Environmental Science and Technology. 1996; 30(1):25-30.
Le et al. Hardened properties of high-performance printing concrete. Cement and Concrete Research, vol. 42, No. 3, Mar. 31, 2012, pp. 558-566.
Lobo et al. Recycled Water in Ready Mixed Concrete Operations. Concrete in Focus, Spring 2003 (2003). 10 pages.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
Mass. Premixed Cement Paste. Concrete International 11(11):82-85 (Nov. 1, 1989).
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.

(56) References Cited

OTHER PUBLICATIONS

Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete 13.-15. Aug. 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. These from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 14, 2017 for U.S. Appl. No. 15/157,205.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 24, 2017 for U.S. Appl. No. 15/161,927.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 24, 2015 for U.S. Appl. No. 14/249,308.
Notice of allowance dated Jun. 30, 2017 for U.S. Appl. No. 15/434,429.
Notice of allowance dated Jul. 5, 2016 for U.S. Appl. No. 14/282,965.
Notice of allowance dated Jul. 28, 2017 for U.S. Appl. No. 15/434,429.
Notice of allowance dated Aug. 2, 2017 for U.S. Appl. No. 15/161,927.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notice of Allowance dated Dec. 21, 2016 for U.S. Appl. No. 15/161,927.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Feb. 27, 2017 for U.S. Appl. No. 14/171,350.
Office action dated Mar. 7, 2016 for U.S. Appl. No. 14/796,751.
Office action dated Mar. 7, 2017 for U.S. Appl. No. 15/434,429.
Office action dated Mar. 10, 2015 for U.S. Appl. No. 14/249,308.
Office action dated Mar. 14, 2017 for U.S. Appl. No. 15/228,964.
Office action dated Mar. 28, 2013 for U.S. Appl. No. 13/660,447.
Office action dated Apr. 26, 2016 for U.S. Appl. No. 14/950,288.
Office action dated May 10, 2017 for U.S. Appl. No. 13/994,681.
Office Action dated Jun. 16, 2016 for U.S. Appl. No. 13/994,681.
Office action dated Jul. 3, 2017 for U.S. Appl. No. 14/171,350.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Oct. 19, 2017 for U.S. Appl. No. 15/228,964.
Office Action dated Nov. 3, 2016 for U.S. Appl. No. 15/161,927.
Office action dated Dec. 2, 2015 for U.S. Appl. No. 14/282,965.
Office action dated Dec. 7, 2015 for U.S. Appl. No. 14/796,751.
Office Action dated Dec. 29, 2016 for U.S. Appl. No. 15/157,205.
Office Action dated Dec. 30, 2016 for U.S. Appl. No. 13/994,681.
Papadakis, et al. A reaction engineering approach to the problem of concrete carbonation. AlChE Journal. 1989; 35(10):1639-1650.
Papadakis, et al. Fundamental Modeling and Experimental Investigation of Concrete Carbonation. ACI Materials Journal. 1991; 88(4):363-373.
PCT Application No. PCT/CA2014/050611 as filed Jun. 25, 2014.
PCT/CA2018/050750 International Search Report and Written Opinion dated Sep. 6, 2018.
Phipps and MacDonald. Sustainability Leads to Durability in the New I-35W Bridge. Concrete International. Feb. 2009; vol. 31 Issue 2, p. 27-32.
"POZZOLITH® 200N: Water-Reducing Admixture," BASF, Product Data, Sep. 2010, 2 pages, found at http://www.basf-admixtures.com/en/products/waterreducingretarding/pozzolith200n/Pages/default.aspx.
"POZZOLITH® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
EP15862209.2 Extended European Search Report dated Oct. 8, 2018.
U.S. Appl. No. 15/304,208 Office Action dated Jan. 24, 2019.
U.S. Appl. No. 15/170,018 Notice of Allowance dated Dec. 19, 2018.
U.S. Appl. No. 15/170,018 Office Action dated Oct. 16, 2018.
U.S. Appl. No. 15/184,219 Office Action dated Oct. 16, 2018.
U.S. Appl. No. 15/240,954 Office Action dated Oct. 23, 2018.
Steinour, H. Some effects of carbon dioxide on mortars and concrete-discussion. Journal of the American Concrete Institute. 1959; 30:905-907.

(56) References Cited

OTHER PUBLICATIONS

Technology Roadmap: Cement. International Energy Agency. Dec. 2009 [Retrieved on Jul. 13, 2013], Retrieved from http://www.iea.org/publications/freepublications/publication/name,3861,en.html.
Teir, et al. Carbonation of Finnish magnesium silicates for CO2 sequestration. Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Dry cast machine. Besser Company. Sioux, Iowa, USA. 06-09.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Yelton, R. Treating Process Water. The Concrete Producer. pp. 441-443. Jun. 1, 1997.
Young, et al. Accelerated Curing of Compacted Calcium Silicate Mortars on Exposure to CO2. Journal of the American Ceramic Society . . . 1974; 57(9):394-397.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
EP14746909.2 Summons to Attend Oral Proceedings dated Jun. 19, 2019.
U.S. Appl. No. 15/184,219 Notice of Allowance dated Aug. 19, 2019.
U.S. Appl. No. 15/240,954 Notice of Allowance dated Mar. 5, 2019.
U.S. Appl. No. 15/284,186 Office Action dated Jun. 14, 2019.
U.S. Appl. No. 15/304,208 Office Action dated Oct. 25, 2019.
U.S. Appl. No. 15/650,524 Office Action dated Sep. 17, 2019.
U.S. Appl. No. 15/828,240 Office Action dated Jul. 22, 2019.
Cornerstone Custom Concrete, LLC. "How Much Does Concrete Weigh?" Retrieved Jul. 15, 2019. <web.archive.org/web/20130124160823/http://www.minneapolis-concrete.com/how-much-does-concrete-weigh.html>. One page. (Year: 2013).
Google Patents Translation of EP1785245. pp. 1-2. Retrieved Jul. 17, 2019. (Year: 2007).
U.S. Appl. No. 15/184,219 Notice of Allowance dated Oct. 10, 2019.
U.S. Appl. No. 15/184,219 Notice of Allowance dated Sep. 18, 2019.
ASTM International, "Standard Test Method for Slump of Hydraulic-Cement Concrete," Designation: C143/C143M—15a, Revised 5.1.1., Dec. 15, 2015, 4 pages.
Canadian Intellectual Property Office, Canadian Office Action for Application No. 2,943,791 dated Apr. 22, 2021, 3 pages.
Canadian Intellectual Property Office, Canadian Office Action for Application No. 2,943,791 dated May 27, 2022, 3 pages.
Canadian Intellectual Property Office, Canadian Office Action for Application No. 2,943,791 dated Nov. 25, 2021, 4 pages.
Canadian Intellectual Property Office, Canadian Office Action for Application No. 2,945,060, dated Jan. 20, 2022, 4 pages.
Canadian Intellectual Property Office, Canadian Office Action for Application No. 2,979,471 dated Jul. 10, 2020, 3 pages.
Canadian Intellectual Property Office, Canadian Office Action for Application No. 3,120,472 dated Apr. 22, 2022, 3 pages.
Canadian Patent Office, Examination Search Report for CA 2,968,246, dated Aug. 18, 2022, 3 pages.
Chile Patent Office, First Office Action and Translation for Application No. 3376-2020, dated Nov. 18, 2021, 34 Pages.
Chile Patent Office, First Office Action for Application No. 3804-2019, dated Mar. 30, 2021, 24 Pages.
Chile Patent Office, Second Examination Report with English Transmittal for Application No. 3376-2020, dated Jun. May 16, 2022, 21 Pages.
Chinese International Search Report for Application No. 2019800306982, dated Mar. 25, 2022, 2 pages.
Corrected First Office Action for Chilean Application No. 3804-2019, dated Aug. 31, 2021, 51 pages.
European Communication for European Application No. 17781677.4, dated May 9, 2022, 5 pages.
Examination Report and translation for Brazilian Application No. 112017010897-6 dated Nov. 23, 2021; 7 pages.
Examination Report for Australian Application No. 2017249444 dated Jul. 28, 2021, 6 pages.
Examination Report for Australian Application No. 2018288555 dated Feb. 20, 2021, 5 pages.
Examination Report for Canadian Application No. 2945060 dated Apr. 19, 2021, 3 pages.
Examination Report for Canadian Application No. 2968246 dated Oct. 22, 2021, 4 pages.
Examination Report for EP 15777459.7 dated Apr. 17, 2020, 7 pages.
Examination Report for European Application No. 17781677.4 dated May 9, 2022; 5 pages.
Examination Report for Indian Application No. 201817042016 dated Mar. 4, 2021, 5 pages.
Examination Report for Indian Application No. 201917054847 dated Apr. 20, 2021, 7 pages.
Examination Report for Japanese Application No. JP 2019-571536 dated Aug. 26, 2021, 86 pages.
Examination Report for Singapore Application No. 11201912759R dated Dec. 18, 2021, 5 pages.
Extended European Search Report dated Aug. 18, 2020, for European patent application No. 19207508.3, 9 pages.
Extended European Search Report dated Oct. 8, 2018, for European patent application No. EP15862209.2, 10 pages.
Extended European Search Report for EP 19894565.1, dated Aug. 3, 2022.
Extended European Search Report for European Application No. 18820477.0 dated Feb. 5, 2021, 11 pages.
First Written Opinion, issued by the Intellectual Property Office of Singapore, dated Mar. 3, 2020, for Singapore patent application No. 11201810010P, 8 pages.
Ghacham, "Valorization of waste concrete through CO2 mineral carbonation: optimizing parameter and improving reactivity using concrete separation". Journal of Cleaner Production, 2019, vol. 166, pp. 1-10.
Ho et al., "CO2 Utilization via Direct Aqueous Carbonation of Synthesized Concrete Fines under Atmospheric Pressure". ACS Omega, Jun. 22, 2020 (Jun. 22, 2020), vol. 5, pp. 15877-15890.
International Search Report and Written Opinion dated Jan. 13, 2021 for PCT Application No. PCT/US20/54625, 6 pages.
International Search Report and Written Opinion dated Oct. 19, 2021 for PCT Application No. PCT/US21/40764, 11 pages.
International Search Report and Written Opinion dated May 14, 2020 for PCT application No. PCT/US2019/066407, 11 pages.
International Search Report and Written Opinion dated Jul. 22, 2020 for PCT/IB2020/053953, 12 pages.
International Search Report and Written Opinion dated Mar. 29, 2022 for PCT Application No. PCT/IB2021/000718.
International Search Report and Written Opinion dated Aug. 25, 2021 for PCT Application No. PCT/IB2021/055223.
International Search Report and Written Opinion dated Sep. 6, 2018 for PCT/CA2018/050750, 13 pages.
Japanese Patent Application No. 2019-571536, Notice of Reasons for Rejection, (Translation) dated Jun. 8, 2022, 5 pages.
Liang et al., "Utilization of CO2 curing to enhance the properties of recycled aggregate and prepared concrete: A review". Cement and Concrete Composites, Nov. 1, 2019 (Jan. 11, 2019), vol. 105, pp. 1-14 * Abstract;* Section 1.0;* Section 2.2.4;* Fig. 4(d).
Liu, J. et al., "Development of a Co2 solidification method for recycling autoclaved lightweight concrete waste", Journal of Materials Science Letters 20,2001, pp. 1791-1794.

(56) References Cited

OTHER PUBLICATIONS

Lu et al., "Carbon Dioxide Sequestration on Recycled Aggregates," Carbon Dioxide Sequestration in Cementitious Construction Materials, Woodhead Publishing Series in Civil and Structural Engineering, 2018, pp. 247-277.

Lu et al., "Effects of Carbonated Hardened Cement Paste Powder on Hydration and Microstructure of Portland Dement," Construction and Building Materials, 186, pp. 699-708 (2018).

Morocco Patent Application No. 53762 Search Report with Opinion on Patentability, dated Jul. 1, 2022, pages.

Office Action for Chilean Application No. 03376-2020 dated Nov. 18, 2021, 34 pages.

Ozcan et al., "Process integration of a Ca-looping carbon capture process in a cement plant", International Journal of Greenhouse Gas Control, 2013, vol. 19, pp. 530-540. https://doi.org/10.1016/j.ijggc.2013.10 009).

Shi et al. "Performance Enhancement of Recycled Concrete Aggregate—A Review," Journal of Cleaner Production, 112, pp. 466-472 (2006).

Summons to Attend Oral Proceedings for EP 15777459.7 dated Aug. 27, 2021, 7 pages.

Zhan et al. "Carbonation Treatment of Recycled Concrete Aggregate: Effect on Transport Properties and Steel Corrosion of Recycled Aggregate Concrete," Cement and Concrete Composites, 104, p. 1 8 (Jul. 4, 2019).

Canadian Intellectual Property Office, Canadian Office Action for Application No. 3,120,472 dated Oct. 12, 2022, 4 pages.

Examination Report for Australian Application No. 2018288555 dated Aug. 9, 2021, 5 pages.

Republic of Columbia [translation]; First Exam Report for No. NC2021/0009084, dated Aug. 5, 2022, 13 pages.

Singapore, Invitation to Respond to Written Opinion for Application No. 11221062015, dated Oct. 18, 2022, 2 pages.

Singapore, Written Opinion for Application No. 11221062015, dated Oct. 18, 2022, 8 pages.

India, Examination Report for Application No. 202127030664 dated Dec. 15, 2022, 7 pages.

Mexican Office Action for Application No. MX/a/2017/006746 dated Dec. 1, 2022, 5 pages.

Indonesia Application No. P00202105311 Substantive Examination Results Stage I dated Jan. 11, 2023.

Canadian Office Action for Application No. 3,019,860 dated Mar. 2, 2023, 3 pages.

\* cited by examiner

Figure 38

Analyte Concentration (mg/L)

| Sample | Ag | Al | As | Ba | Be | Bi | Ca | Cd | Ce | Co | Cr | Cu | Fe | Ga | Ge | In | K | La |
|---|---|---|---|---|---|---|---|---|---|---|---|---|---|---|---|---|---|---|
| 100% OPC - Aged 1 Days - Untreated | <0.02 | <0.05 | <0.2 | 1.03 | <0.01 | <0.1 | 915 | <0.01 | <0.05 | <0.05 | 0.39 | 0.01 | <0.01 | <0.2 | <0.5 | <0.5 | 640 | <0.05 |
| 100% OPC - Aged 7 Days - Untreated | <0.02 | <0.05 | <0.2 | 5.33 | <0.01 | <0.1 | 759 | <0.01 | <0.05 | <0.05 | 0.02 | <0.01 | <0.01 | <0.2 | <0.5 | <0.5 | 685 | <0.05 |
| 100% OPC - Aged 1 Days - CO2 Treated | <0.02 | 0.05 | <0.2 | 0.04 | <0.01 | <0.1 | 444 | <0.01 | <0.05 | <0.05 | 4.54 | <0.01 | <0.01 | <0.2 | <0.5 | <0.5 | 301 | <0.05 |
| 100% OPC - Aged 7 Days - CO2 Treated | <0.02 | <0.05 | <0.2 | 0.06 | <0.01 | <0.1 | 372 | <0.01 | <0.05 | <0.05 | 4.90 | <0.01 | <0.01 | <0.2 | <0.5 | <0.5 | 260 | <0.05 |
| 25% Slag + 75% OPC - Aged 1 Days - Untreated | <0.02 | <0.05 | <0.2 | 3.17 | <0.01 | <0.1 | 880 | <0.01 | <0.05 | <0.05 | 0.12 | 0.01 | <0.01 | <0.2 | <0.5 | <0.5 | 525 | <0.05 |
| 25% Slag + 75% OPC - Aged 7 Days - Untreated | <0.02 | 0.22 | <0.2 | 5.16 | <0.01 | <0.1 | 755 | <0.01 | <0.05 | <0.05 | 0.03 | 0.02 | <0.01 | <0.2 | <0.5 | <0.5 | 621 | <0.05 |
| 25% Slag + 75% OPC - Aged 1 Days - CO2 Treated | <0.02 | <0.05 | <0.2 | 0.07 | <0.01 | <0.1 | 333 | <0.01 | <0.05 | <0.05 | 0.29 | 0.01 | <0.01 | <0.2 | <0.5 | <0.5 | 202 | <0.05 |
| 25% Slag + 75% OPC - Aged 7 Days - CO2 Treated | <0.02 | <0.05 | <0.2 | 0.07 | <0.01 | <0.1 | 175 | <0.01 | <0.05 | <0.05 | 0.02 | 0.03 | <0.01 | <0.2 | <0.5 | <0.5 | 135 | <0.05 |

Figure 39

Analyte Concentration (mg/L)

| Sample | Li | Mg | Mn | Mo | Na | Nb | Ni | P | Pb | S | Sb | Se | Si | Sn | Sr | Ta | Te | Ti | Tl | V | Zn | Zr | pH |
|---|---|---|---|---|---|---|---|---|---|---|---|---|---|---|---|---|---|---|---|---|---|---|---|
| 100% OPC - Aged 1 Days - Untreated | 2.7 | 0.01 | <0.01 | 0.1 | 106 | <0.2 | <0.01 | <0.1 | <0.1 | 76 | <0.1 | <0.5 | 0.2 | <0.5 | 43.0 | <0.5 | <0.5 | 0.09 | <0.5 | <0.01 | 0.02 | <0.01 | 12.5 |
| 100% OPC - Aged 7 Days - Untreated | 4.0 | <0.01 | <0.01 | <0.1 | 126 | <0.2 | <0.01 | <0.1 | <0.1 | 13 | <0.1 | <0.5 | 0.3 | <0.5 | 66.1 | <0.5 | <0.5 | 0.08 | <0.5 | 0.01 | <0.01 | <0.01 | 12.4 |
| 100% OPC - Aged 1 Days - CO2 Treated | 1.0 | 64.1 | <0.01 | 0.8 | 63 | <0.2 | <0.01 | <0.1 | <0.1 | 473 | <0.1 | <0.5 | 64.9 | <0.5 | 3.90 | <0.5 | <0.5 | 0.05 | <0.5 | 0.11 | <0.01 | <0.01 | 7.4 |
| 100% OPC - Aged 7 Days - CO2 Treated | 1.5 | 136 | <0.01 | 0.5 | 64 | <0.2 | <0.01 | <0.1 | <0.1 | 371 | <0.1 | 0.6 | 49.6 | <0.5 | 4.27 | <0.5 | <0.5 | 0.04 | <0.5 | 0.13 | <0.01 | <0.01 | 7.8 |
| 25% Slag + 75% OPC - Aged 1 Days - Untreated | 2.3 | 0.01 | <0.01 | <0.1 | 91 | <0.2 | <0.01 | <0.1 | <0.1 | 21 | <0.1 | <0.5 | 0.2 | <0.5 | 41.0 | <0.5 | <0.5 | 0.08 | <0.5 | <0.01 | <0.01 | <0.01 | 13 |
| 25% Slag + 75% OPC - Aged 7 Days - Untreated | 4.0 | <0.01 | <0.01 | <0.1 | 123 | <0.2 | <0.01 | <0.1 | <0.1 | 7 | <0.1 | <0.5 | 0.3 | <0.5 | 61.2 | <0.5 | <0.5 | 0.07 | <0.5 | <0.01 | <0.01 | 0.01 | 12.3 |
| 25% Slag + 75% OPC - Aged 1 Days - CO2 Treated | 1.2 | 70.8 | <0.01 | 0.7 | 66 | <0.2 | <0.01 | <0.1 | <0.1 | 416 | <0.1 | <0.5 | 49.9 | <0.5 | 2.58 | <0.5 | <0.5 | 0.04 | <0.5 | 0.11 | 0.01 | <0.01 | 7.6 |
| 25% Slag + 75% OPC - Aged 7 Days - CO2 Treated | 1.6 | 213 | <0.01 | 0.6 | 64 | <0.2 | <0.01 | <0.1 | <0.1 | 370 | <0.1 | 0.6 | 45.2 | <0.5 | 1.90 | <0.5 | <0.5 | 0.02 | <0.5 | 0.11 | 0.01 | <0.01 | 8 |

75% OPC + 25% Slag @ 3.5 k mag

US 11,660,779 B2

METHODS AND COMPOSITIONS FOR TREATMENT OF CONCRETE WASH WATER

CROSS-REFERENCE

This application is a continuation of PCT Application No. PCT/CA2017/050445, filed on Apr. 11, 2017, which claims the benefit of U.S. Provisional Application No. 62/321,013, filed Apr. 11, 2016, which application is incorporated herein by reference.

BACKGROUND OF THE INVENTIONS

Wash water, produced in the making of concrete, poses a significant problem in terms of use and/or disposal. Methods and compositions to better manage concrete wash water are needed.

SUMMARY OF THE INVENTION

In one aspect the invention provides methods.

In certain embodiments, the invention provides a method of preparing a concrete mix comprising (i) adding concrete materials to a mixer; (ii) adding mix water to the mixer, wherein the mix water comprises carbonated concrete wash water; and (iii) mixing the water and the concrete materials to produce a concrete mix. In certain embodiments, the carbonated concrete wash water comprises at least 10% of the total mix water. In certain embodiments, the carbonated concrete mix water comprises at least 40% of the total mix water. In certain embodiments, the mix water comprises a first portion of water that is not carbonated mix water and a second portion of mix water that comprises carbonated mix water, wherein the first batch of mix water is added to the concrete materials before the second batch of mix water. The first portion of water can added at a first location and the second portion of water can added at a second location, e.g., the drum of a ready-mix truck, wherein the first and second locations are different. In certain embodiments, the second portion of mix water is added at least 2 minutes after the first portion. In certain embodiments, the carbonated concrete wash water has a density of at least 1.10 g/cm$^3$. In certain embodiments, the carbonated concrete wash water has been held for at least 1 day. In certain embodiments, the carbonated concrete wash water has been held for at least 3 days. In certain embodiments, the concrete mix is sufficiently workable for its intended use, and the carbonated wash water is of an age that the same mix made with the wash water of the same age in the same proportions would not be sufficiently workable for its intended use. In certain embodiments, the mix water comprises carbonated wash water in an amount that results in a concrete mix that is at least 1, 2, 3, 4, 5, 6, 7, 8, 9, 10, 12, 15, 20, 25, 30, 40, or 50%, for example 5%, stronger at a time after pouring—e.g., 1 day, 7 days, 28 days, or any combination thereof—than the same concrete mix made without carbonated wash water. In certain embodiments, the mix water comprises carbonated wash water in an amount that allows the concrete mix to contain at least 1, 2, 3, 4, 5, 6, 7, 8, 9, 10, 11, 12, 13, 14, 15, 16, 17, 18, 19, 20, 22, 25, 30, 40, or 50%, for example at least 5%, less cement than, and retain a compressive strength after pouring of within 1, 2, 3, 4, 5, 6, 7, 8, 9, 10, 12, 15, 20, 25, 30, 40, or 50%, for example at least 5%, of the same concrete mix made without carbonated wash water and with the extra (normal mix) percentage cement.

In another aspect, the invention provides apparatus.

In certain embodiments, the invention provides an apparatus for carbonating wash water produced in the production of concrete in a wash water operation wherein the wash water comprises cement and/or supplementary cementitious materials (SCM), comprising (i) a source of carbon dioxide; (ii) a first conduit operably connected to the source of carbon dioxide that runs to a wash water container, wherein (a) the wash water container contains wash water from a concrete production site; (b) the conduit has one or more openings positioned to deliver carbon dioxide at or under the surface of the wash water in the container to produce carbonated wash water; (iii) a system to transport the carbonated wash water to a concrete mix operation where the carbonated wash water is used as mix water in a concrete mix. The apparatus can further include (iv) a controller that determines whether or not, and/or how, to modify delivery of carbon dioxide to the wash water, or another characteristic of the wash water operation, or both, based on the one or more characteristics of the wash water or wash water operation. The characteristic can be, e.g., at least one, at least two, at least three, at least four, at least five, or at least six, of pH of the wash water, rate of delivery of carbon dioxide to the wash water, total amount of wash water in the wash water container, temperature of the wash water, specific gravity of the wash water, concentration of one or more ions in the wash water, age of the wash water, circulation rate of the wash water, timing of the circulation of the wash water, or timing of circulation of the wash water. In certain embodiments, the apparatus may further include (v) one or more sensors that monitor one or more characteristics of the wash water and/or the carbonation of the wash water in the container, wherein the one or more sensors is operably connected to the controller and delivers information regarding the characteristic of the wash water and/or wash water operation to the controller. In certain embodiments, the apparatus includes at least one, two, three, four, five, or six of sensors for (a) pH of the wash water, (b) rate of delivery of carbon dioxide to the wash water, (c) total amount of wash water in the wash water container, (d) temperature of the wash water, (e) specific gravity of the wash water, (f) concentration of one or more ions in the wash water, (g) age of the wash water, (h) circulation rate of the wash water, (i) timing of circulation of the wash water, or any combination thereof. The apparatus may further include (iii) one or more actuators operably connected to the controller to modify delivery of carbon dioxide to the wash water, or another characteristic of the wash water operation, or both.

In certain embodiments, the invention provides an apparatus for preparing a concrete mix comprising (i) a first mixer for mixing concrete materials and water; (ii) a second mixer for mixing concrete materials and water; (iii) a first water container holding water that comprises carbonated concrete wash water; (iv) a second water container, different from the first, holding water that is not carbonated concrete wash water; (iv) a first system fluidly connecting the first water container with the second mixer and a second system fluidly connecting the second water container with the first mixer. The first and second mixers can be the same mixer; in certain embodiments, they are different mixers. In certain embodiments, the first mixer is the drum of a ready-mix truck. In certain embodiments, the apparatus further includes a controller configured to add a first amount of the water in the second water container to the first mixer at a first time and to add a second amount of the water in the first water container to the second mixer at a second time, wherein the first and second times are different and wherein the first time is before the second time.

In certain embodiments, the invention provides an apparatus for preparing a concrete mix comprising (i) a mixer for mixing concrete materials and water; (ii) a first water container holding water that comprises carbonated concrete wash water; (iii) a second water container, different from the first, holding water that is not carbonated concrete wash water; (iv) a third container, fluid connected to the first and second water containers and to the mixer, for receiving a first portion of the water in the first container and a second portion of the water in the second container, mixing them to form mixed waters, and sending a third portion of the mixed waters to the mixer.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 38 shows data of FIGS. 31-36 in Tabular form.

FIG. 39 shows data of FIGS. 31-36 in Tabular form.

DETAILED DESCRIPTION OF THE INVENTION

Figure 1:
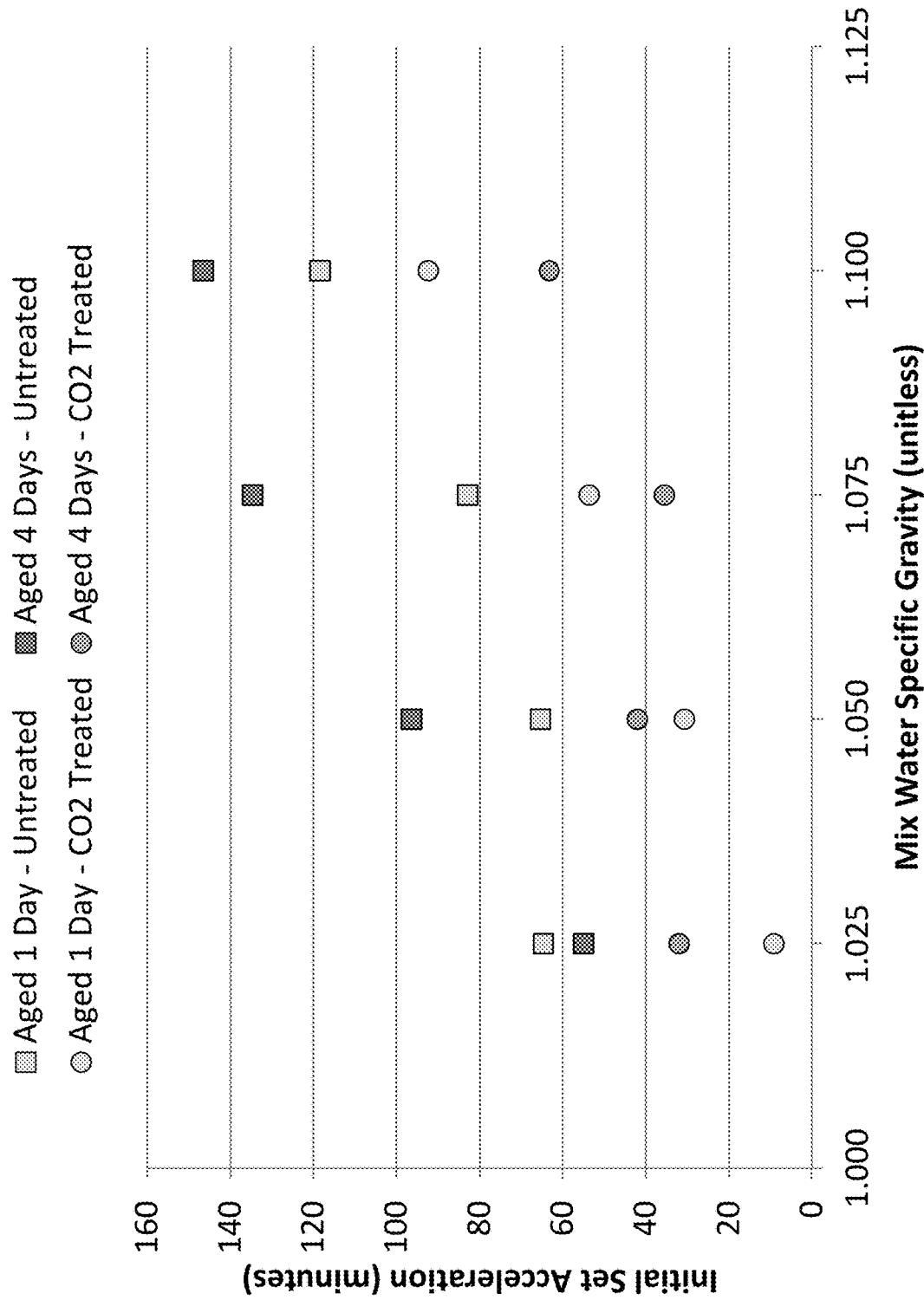
FIG. 1 shows set acceleration in concrete produced with wash (grey) water at various specific gravities and ages, where the water was with and without carbon dioxide treatment. See Example 1.

Wash water, also called grey water herein, is produced as a byproduct of the concrete industry. This water, which may contain suspended solids in the form of sand, aggregate and/or cementitious materials, is generated through various steps in the cycle of producing concrete structures. Generally a large volume of concrete wash water is produced by the washing-out of concrete mixer trucks following the delivery of concrete. This water is alkaline in nature and requires specialized treatment, handling and disposal.

While this water can be suitable for reuse in the production of concrete, it has been documented that the wash water can result in negative impacts on the properties of concrete, namely set acceleration and loss of workability. Wash water is mainly a mixture of cement and, in many cases, supplementary cementitious materials (SCMs) in water. It becomes problematic as a mix water because as the cement hydrates it changes the chemistry of the water. These changes in chemistry, along with the hydration products, cause a host of issues when the water is used as mix water, such as acceleration, increased water demand, reduced 7-day strength, and the like. These issues generally worsen as the amount of cement in the water increases, and/or the water ages.

The methods and compositions of the invention utilize the application of $CO_2$ to concrete wash water to improve its properties for reuse in the production of concrete. Thus, wash water that has a cement content (e.g., specific gravity) and/or that has aged to a degree that would normally not allow its use as mix water can, after application of carbon dioxide, be so used.

Without being bound by theory, it is thought that by carbonating wash water, several results may be achieved that are beneficial in terms of using the water as part or all of mix water for subsequent batches of concrete:

1) Maintain a pH of ~7: This effectively dissolves the cement due to the acidity of $CO_2$. This helps deliver a grey water of consistent chemistry and removes the "ageing effects".

2) Precipitate any insoluble carbonates: $CO_2$ actively forms carbonate reaction products with many ions. This removes certain species from solution, such as calcium, aluminum, magnesium and others. This is another step that helps provide a grey water of consistent chemistry.

3) Change solubility of cement ions: The solubilities of many ions depend on pH. By maintaining the pH at ~7 with $CO_2$ the nature of the water chemistry is changed, potentially in a favorable direction.

4) Shut down pozzolanic reactions: By maintaining the pH around 7 no $Ca(OH)_2$ is available to react with slag and/or fly ash in the grey water. This can mean that these SCMs are unaltered through the treatment and reuse of the grey water, thus reducing the impact of the grey water substantially.

5) Reduce amount of anions behind: The formation of carbonate precipitates using $CO_2$ is advantageous over other common acids, like HCl or $H_2SO_4$ whose anions, if left soluble in the treated water, can adversely impact the chemistry of the grey water for concrete batching.

6) Cause retardation: By saturating the grey water with $CO_2/HCO_3$-retardation can be achieved when used as batch water.

7) Nature of precipitates: The process may potentially be altered to form precipitates that have less effects on the water demand of concrete prepared with grey water. In particular, conditions of carbonation may be used that produce nanocrystalline carbonates, such as nanocrystalline calcium carbonate, that are known to be beneficial when used in concrete products.

In certain embodiments, the invention provides a method of providing a mix water for a batch of concrete, where the mix water comprises wash water from one or more previous batches of concrete that has be exposed to carbon dioxide in an amount above atmospheric concentrations of carbon dioxide, to carbonate the wash water ("carbonated wash water."). The mix water may contain at least 10, 20, 30, 40, 50, 60, 70, 80, 90, 95, 99, or 99.5% carbonated wash water. Alternatively or additionally, the mix water may contain no more than 20, 30, 40, 50, 60, 70, 80, 90, 95, 99, 99.5, or 100% carbonated wash water. In certain embodiments, the mix water is 100% carbonated wash water. In certain embodiments, the mix water is 1-100% carbonated wash water. In certain embodiments, the mix water is 1-80% carbonated wash water. In certain embodiments, the mix water is 1-50% carbonated wash water. In certain embodiments, the mix water is 1-30% carbonated wash water. In certain embodiments, the mix water is 10-100% carbonated wash water. In certain embodiments, the mix water is 20-100% carbonated wash water. In certain embodiments, the mix water is 50-100% carbonated wash water. In certain embodiments, the mix water is 70-100% carbonated wash water. In certain embodiments, the mix water is 90-100% carbonated wash water.

In certain embodiments, a first portion of mix water that is plain water, e.g., not wash or other water that has been carbonated, such as plain water as normally used in concrete mixes, is mixed with concrete materials, such as cement, aggregate, and the like, and then a second portion of mix water that comprises carbonated water, which can be carbonated plain water or, e.g., carbonated wash water is added. The first portion of mix water may be such that an acceptable level of mixing is achieved, e.g., mixing without clumps or without substantial amounts of clumps. For example, the first portion of mix water that is plain water may be 1-90%, or 1-80%, or 1-75%, or 1-70%, or 1-65%, or 1-60%, or 1-55%, or 1-50%, or 1-45%, or 1-40%, or 1-30%, or 1-20%, or 1-10% of the total mix water used in the concrete mix, while the remainder of the mix water used in the concrete mix is the second portion, i.e., carbonated mix water. The first portion of water may be added at one location and the second portion at a second location. For example, in a ready mix operation, the first portion may be added to concrete materials which are mixed, then the mixed materials are transferred to a drum of a ready-mix truck, where the second portion of water is added to achieve carbonation of the concrete in the drum of the ready-mix truck. However, it is also possible that both the first and the second locations are the same location, e.g., a mixer prior to deposit into a ready-mix truck, or the drum of the ready-mix truck. The second portion of water may be added at any suitable time after the addition of the first portion. In general, the second portion of water is added at least after the first portion and the concrete materials have mixed sufficiently to achieve mixing without clumps or without substantial amounts of clumps. In certain embodiments, the second portion of water is added at least 1, 2, 3, 4, 5, 6, 7, 8, 9, 10, 12, 15, 20, 25, 30, 40, 50, or 60 minutes after the first portion of water.

The wash water may be carbonated at any suitable time, for example, right after its production, at some time after production, or just before use in the concrete, or any combination thereof. For example, in certain embodiments, carbonation of wash water can commence no later than 1, 2, 5, 10, 20, 30, 40, 60, 80, 100, 120, 150, 180, 240, 300, 360, 420, or 480 minutes after formation of the wash water, and/or no sooner than 2, 5, 10, 20, 30, 40, 60, 80, 100, 120, 150, 180, 240, 300, 360, 420, 480, or 540 minutes after formation of the wash water. The carbonation can continue for any suitable period of time, for example, in certain embodiments wash water is continuously exposed to carbon dioxide for a period of time after carbonation commences. Alternatively or additionally, wash water can be carbonated just before its use as mix water, for example, no more than 1, 2, 5, 10, 20, 30, 40, 60, 80, 100, 120, 150, 180, 240, 300, 360, 420, or 480 minutes before its use as mix water (e.g., before contacting the concrete mixture), and/or no sooner than 2, 5, 10, 20, 30, 40, 60, 80, 100, 120, 150, 180, 240, 300, 360, 420, 480, or 540 minutes before its use as mix water.

In certain embodiments, the wash water is circulated before its use as a mix water. For example, part or all of the wash water that is carbonated may be circulated (e.g., run through one or more loops to, e.g., aid in mixing and/or reactions, or agitated, or stirred, or the like). This circulation may occur continuously or intermittently as the water is held prior to use. In certain embodiments the wash water is circulated for at least 5, 10, 20, 50, 70, 80, 90, 95, or 99% of the time it is held prior to use as mix water.

It will be appreciated that many different wash waters are typically combined and held, for example, in a holding tank, until use or disposal. Carbonation of wash water may occur before, during, or after its placement in a holding tank, or any combination thereof. Some or all of the wash water from a given operation may be carbonated. It is also possible that wash water from one batch of concrete may be carbonated then used directly in a subsequent batch, without storage.

Any suitable method or combination of methods may be used to carbonate the wash water. The wash water may be held in a container and exposed to a carbon dioxide atmosphere while mixing. Carbon dioxide may be bubbled through mix water by any suitable method; for example, by use of bubbling mats, or alternatively or additionally, by introduction of carbon dioxide via a conduit with one or a plurality of openings beneath the surface of the wash water. The conduit may be positioned to be above the sludge that settles in the tank and, in certain embodiments, regulated so as to not significantly impede settling. Catalysts may also be used to accelerate one or more reactions in the carbonating wash water.

In certain cases, mix water, e.g., wash water may be treated with carbon dioxide in such a manner that the carbon dioxide content of the water increases beyond normal saturation, for example, at least 10, 20, 30, 40, 50, 70, 100, 150, 200, or 300% beyond normal saturation, compared to the same water under the same conditions that is normally saturated with carbon dioxide. Normal saturation is, e.g., the saturation achieved by, e.g., bubbling carbon dioxide through the water, e.g., wash water, until saturation is achieved, without using manipulation of the water beyond the contact with the carbon dioxide gas. For methods of treating water to increase carbon dioxide concentration beyond normal saturation levels, see, e.g., U.S. Patent Application Publication No. 2015/0202579.

In certain embodiments, the invention allows the use of wash water substantially "as is," that is, without settling to remove solids. Carbonation of the wash water permits its use as mix water, even at high specific gravities.

This technology can allow the use of grey water as mix water, where the grey water is at specific gravities of at least 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.22, 1.25, 1.30, 1.35, 1.40, or 1.50, and/or not more than 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.22, 1.25, 1.30, 1.35, 1.40, 1.50 or 1.60; e.g., 1.0-1.2, or 1.0 to 1.3, or 1.0 to 1.18, or 1.0 to 1.16, or 1.0 to 1.15, or 1.0 to 1.14, or 1.0 to 1.13, or 1.0 to 1.12, or 1.0 to 1.10, or 1.0 to 1.09, or 1.0 to 1.08, or 1.0 to 1.07, or 1.0 to 1.06, or 1.0 to 1.05, or 1.0 to 1.04, or 1.0 to 1.03, or 1.0 to 1.02, 1.01-1.2, or 1.01 to 1.3, or 1.01 to 1.18, or 1.01 to 1.16, or 1.01 to 1.15, or 1.01 to 1.14, or 1.01 to 1.13, or 1.01 to 1.12, or 1.01 to 1.10, or 1.01 to 1.09, or 1.01 to 1.08, or 1.01 to 1.07, or 1.01 to 1.06, or 1.01 to 1.05, or 1.01 to 1.04, or 1.01 to 1.03, or 1.01 to 1.02, or 1.02-1.2, or 1.02 to 1.3, or 1.02 to 1.18, or 1.02 to 1.16, or 1.02 to 1.15, or 1.02 to 1.14, or 1.02 to 1.13, or 1.02 to 1.12, or 1.02 to 1.10, or 1.02 to 1.09, or 1.02 to 1.08, or 1.02 to 1.07, or 1.02 to 1.06, or 1.02 to 1.05, or 1.02 to 1.04, or 1.02 to 1.03, or 1.03-1.2, or 1.03 to 1.3, or 1.03 to 1.18, or 1.03 to 1.16, or 1.03 to 1.15, or 1.03 to 1.14, or 1.03 to 1.13, or 1.03 to 1.12, or 1.03 to 1.10, or 1.03 to 1.09, or 1.03 to 1.08, or 1.03 to 1.07, or 1.03 to 1.06, or 1.03 to 1.05, or 1.03 to 1.04, or 1.05-1.2, or 1.05 to 1.3, or 1.05 to 1.18, or 1.05 to 1.16, or 1.05 to 1.15, or 1.05 to 1.14, or 1.05 to 1.13, or 1.05 to 1.12, or 1.05 to 1.10, or 1.05 to 1.09, or 1.05 to 1.08, or 1.05 to 1.07, or 1.05 to 1.06. In certain embodiments the methods and compositions of the invention allow the use of grey (wash) water as mix water, where the grey water has a specific gravity of at least 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20.

The use of wash water in a concrete mix, especially carbonated wash water, often results in enhanced strength of the resulting concrete composition at one or more times after pouring, for example, an increase in compressive strength, when compared to the same concrete mix without carbonated wash water, of at least 1, 2, 3, 4, 5, 6, 7, 8, 9, 10, 12, 14, 16, 18, 20, 22, or 25% at 1-day, 7-days, and/or 28-days. This increase in early strength often allows the use of less cement in a mix that incorporates carbonated wash water than would be used in the same mix that did not incorporate carbonated wash water; for example, the use of 1, 2, 3, 4, 5, 6, 7, 8, 9, 10, 11, 12, 13, 14, 15, 16, 17, 18, 20, 22, 25, 30, 35, or 40% less cement in the mix where the mix retains a compressive strength at a time after pouring, e.g., at 1, 7, and/or 28-days, that is within 1, 2, 3, 4, 5, 6, 7, 8, 9, 10, 12, 15, 20, 30, 40, or 50% of the compressive strength of the mix that did not incorporate carbonated wash water, e.g., within 5%, or within 7%, or within 10%.

In addition, the carbonation of wash water can allow the use of wash water at certain ages that would otherwise not be feasible, e.g., wash water that has aged at least 1, 2, 3, 4, 5, 6, 7, 8, 9, 10, 12, or 15 days. Wash water that has been carbonated may be used in concrete at an age where it would otherwise produce a concrete mix without sufficient workability to be used.

The $CO_2$ treatment produces carbonate reaction products that likely contain some amount of nano-structured material. Of the carbonated products in the wash water, e.g., calcium carbonate, at least 1, 2, 5, 7, 10, 12, 15, 20, 25, 30, 25, 40, 45, 50, 60, 70, 80, or 90% may be present as nano-structured materials, and/or not more than 5, 7, 10, 12, 15, 20, 25, 30, 25, 40, 45, 50, 60, 70, 80, 90, 95, or 100% may be present as nano-structured material. A "nano-structured material," as that term used herein, includes a solid product of reaction of a wash water component with carbon dioxide whose longest dimension is no more than 500 nm, in certain embodiments no more than 400 nm, in certain embodiment no more than 300 nm, and in certain embodiments no more than 100 nm.

The $CO_2$ treatment has the further benefit of sequestering carbon dioxide, as the carbon dioxide reacts with components of the wash water (typically cement or supplementary cementitious material), as well as being present as dissolved carbon dioxide/carbonic acid/bicarbonate which, when the wash water is added to a fresh concrete mix, further reacts with the cement in the mix to produce further carbon dioxide-sequestering products. In certain embodiments, the carbon dioxide added to the wash water results in products in the wash water that account for at least 1, 2, 5, 7, 10, 12, 15, 20, 25, 30, 25, 40, 45, 50, 60, 70, 80, or 90% carbon dioxide by weigh cement (bwc) in the wash water, and/or not more than 5, 7, 10, 12, 15, 20, 25, 30, 25, 40, 45, 50, 60, 70, 80, 90, 95, or 100% carbon dioxide by weigh cement (bwc) in the wash water.

Embodiments include applying $CO_2$ immediately after the wash water is generated, in a tank, and/or as the grey water is being loaded for batching.

Alternatively or additionally, carbonation of grey (wash) water can allow use of aged wash water as mix water, for example, wash water that has aged at least 1, 2, 3, 4, 5, 6, 7, 8, 9, or 10 days.

The source of the carbon dioxide can be any suitable source. In certain embodiments, some or all of the carbon dioxide is recovered from a cement kiln operation, for example, one or more cement kiln operations in proximity to the concrete production facility, e.g., one or more cement kiln operations that produce cement used in the concrete production facility.

Compositions of the invention include an apparatus for carbonating concrete wash water in a wash water operation that includes a source of carbon dioxide operably connected to a conduit that runs to a wash water container containing wash water from a concrete production site, where one or more openings of the conduit are positioned to deliver carbon dioxide at or under the surface of wash water in the container, or both, and a system to transport the carbonated wash water to a concrete mix operation where the carbonated wash water is used as mix water in a concrete mix, e.g. a second conduit that can be positioned to remove carbonated wash water from the wash water container and transport it to a concrete mix operation, where the carbonated wash water is used as part or all of mix water for concrete batches. Generally, the carbon dioxide will be delivered directly to the wash water tank as described elsewhere herein, though in some embodiments carbonation may occur outside the tank and the carbonated water returned to the tank. The apparatus may further include a controller that determines whether or not to modify the delivery of carbon dioxide based at least in part on one or more characteristics of the wash water or wash water operation. The characteristics may include one or more of pH of the wash water, rate of delivery of carbon dioxide to the wash water, total amount of wash water in the wash water container, temperature of the wash water, specific gravity of the wash water, concentration of one or more ions in the wash water, age of the wash water, circulation rate of the wash water, timing of circulation of the wash water, or any combination thereof. One or more sensors may be used for monitoring one or more characteristics of the wash water; additionally, or alternatively, manual measurements may be made periodically, e.g., manual measurements of specific gravity, pH, or the like. The apparatus may further comprise one or more actuators operably connected to the controller to modify delivery of carbon dioxide to the wash water, or another characteristic of the wash water, or both. The apparatus may include a system for moving the wash water, such as by circulating or agitating the wash water, either continuously or intermittently. The composition may further include a delivery system for delivering carbon dioxide to the source of carbon dioxide, where some or all of the carbon dioxide is derived from a cement kiln operation in proximity to the concrete production site, for example, a cement kiln operation that produces some or all of cement used in the concrete production site.

EXAMPLES

Example 1

Samples of grey (wash) water were prepared in the lab. Lab grey water was made by mixing cement with potable water. Specific gravity (SG) range of lab grey water was 1.025 to 1.100. Grey water was allowed to age for either 1 or 4 days before being used as mix water in the preparation of mortar samples. Set time of mortar was measured via penetrometer as per ASTM C403.

Set Time.

In FIG. 1, Acceleration is plotted relative to the set time for a sample made with potable water (SG=1.000). Both SG and age of grey water have large accelerating effect on mortar initial set.

A $CO_2$ treatment was applied to grey water samples in same age and SG range as previous set. As with untreated samples, acceleration is plotted relative to the set time for a sample made with potable water (SG=1.000) (FIG. 1).

Treatment of the grey water with $CO_2$ resulted in two main improvements: 1) Reduced acceleration: the amount of initial set acceleration was greatly reduced by the $CO_2$ treatment of the grey water; and 2) Reduction in age effects: the set time acceleration was not significantly influenced by aging of the $CO_2$ treated grey water samples The reduction in acceleration and age effects helps address two of the primary obstacles associated with grey water reuse. First, the CO2 treatment opens the potential to correlate impacts of the grey water directly to the SG value of the sample regardless of age, and second, the reduction in the scale of the acceleration allows for simple modifications to admixture loadings to fine-tune set time.

Example 2

This Example demonstrates that treatment of concrete wash water (grey water) with carbon dioxide improves set, workability, and other characteristics of concrete made using the wash water, and allows the use of wash water at higher specific gravity than the typical maximum allowed.

In a first set of tests, samples of wash water were produced in the lab by adding known amounts of cementitious materials to potable water sources. The samples of wash water were allowed to age for up to 6 days before being used as mix water in the preparation of mortar samples. Certain samples were subjected to $CO_2$ treatment, which included vigorous mixing and aging of the wash water under a $CO_2$ atmosphere. Typically the exposure to $CO_2$ was initiated in the timeframe of 30-120 minutes after preparation of the wash water and continued until the wash water was used for mortar preparation. Variations on the $CO_2$ treatment were deployed wherein a sample of wash water was only exposed to $CO_2$ once: either directly before use as mix water or in the time frame of 30-120 minutes after the wash water was prepared. The $CO_2$ treatments presented would result in $CO_2$ uptake on the order of 10-40% by weight of cement.

The proportions and properties of wash water prepared for this study are presented in Table 1, below. The density of cement was taken as 3.15 g/mL while the density of slag and class F fly ash were both taken as 2.2 g/mL. Grey water samples were prepared at additional specific gravity values using the same logic presented within this table.

TABLE 1

Compositions of Wash Waters used in the Example

| Wash Water Type | Mass of water (g) | Mass of cement (g) | Mass of slag (g) | Mass of fly ash (g) | Final Mixture Density (g/mL) | Final Mixture Specific Gravity |
|---|---|---|---|---|---|---|
| 100% OPC | 267.5 | 40 | 0 | 0 | 1.10 | 1.10 |
| 100% OPC | 267.5 | 65 | 0 | 0 | 1.15 | 1.15 |
| 100% OPC | 267.5 | 85 | 0 | 0 | 1.20 | 1.20 |
| 50% SCMs | 267.5 | 23 | 14 | 9 | 1.10 | 1.10 |
| 50% SCMs | 267.5 | 35 | 21 | 14 | 1.15 | 1.15 |
| 50% SCMs | 267.5 | 49 | 29 | 20 | 1.20 | 1.20 |

The concrete wash water samples produced in the lab were used to produce mortar samples and assessed for their impact on fresh properties. The wash water samples were used to prepare mortar samples by combining with 1350 g sand and 535 g of cement in a bench-top paddle style mixer. Set time was measured in accordance with ASTM C403 using the penetrometer method. Calorimetry was collect using a Calmetrix iCal8000. Set time and slump results were compared to mortar samples prepared with potable water Set and Workability. All statements apply to both EF50 and 100% OPC grey water compositions Set Time.

Figure 2:
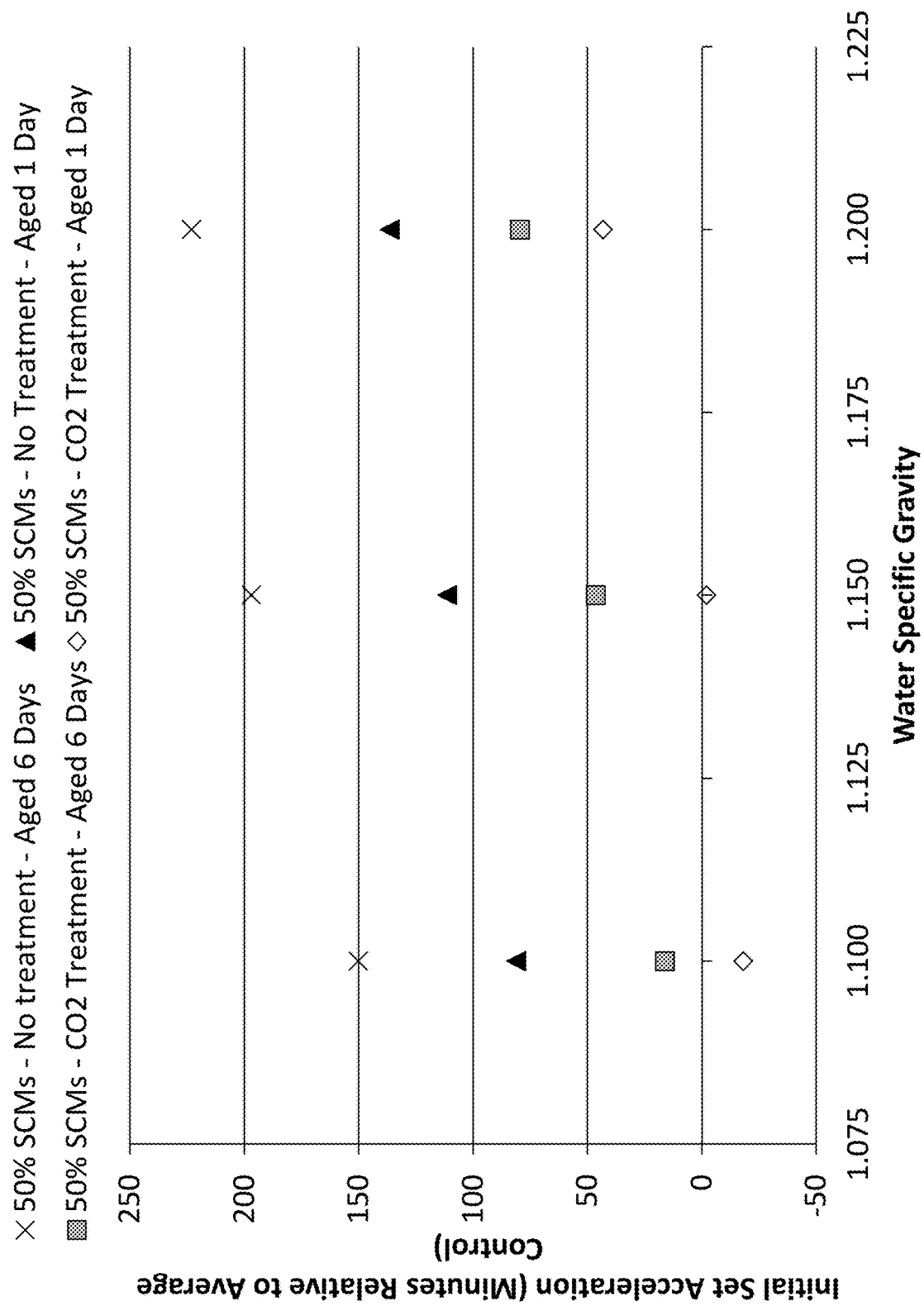
FIG. 2 shows set acceleration in concrete produced with wash (grey) water produced with Ordinary Portland Cement (OPC, 50%) and supplementary cementitious materials (SCM, 50%), where the water was treated and untreated with carbon dioxide, and aged 1 or 6 days.
Figure 4:
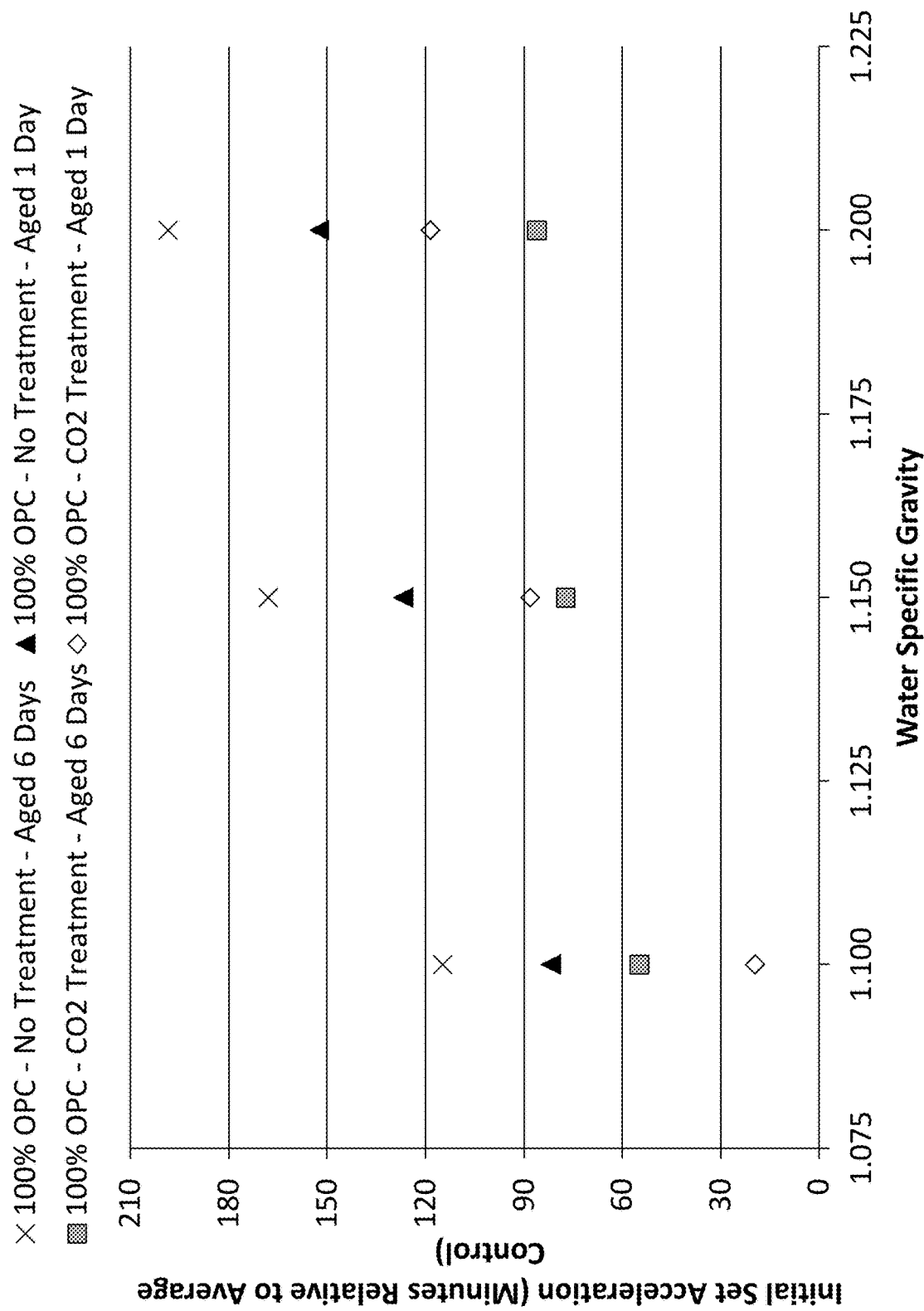
FIG. 4 shows set acceleration in concrete produced with wash (grey) water produced with Ordinary Portland Cement (OPC, 100%), where the water was treated and untreated with carbon dioxide, and aged 1 or 6 days.
Figure 6:
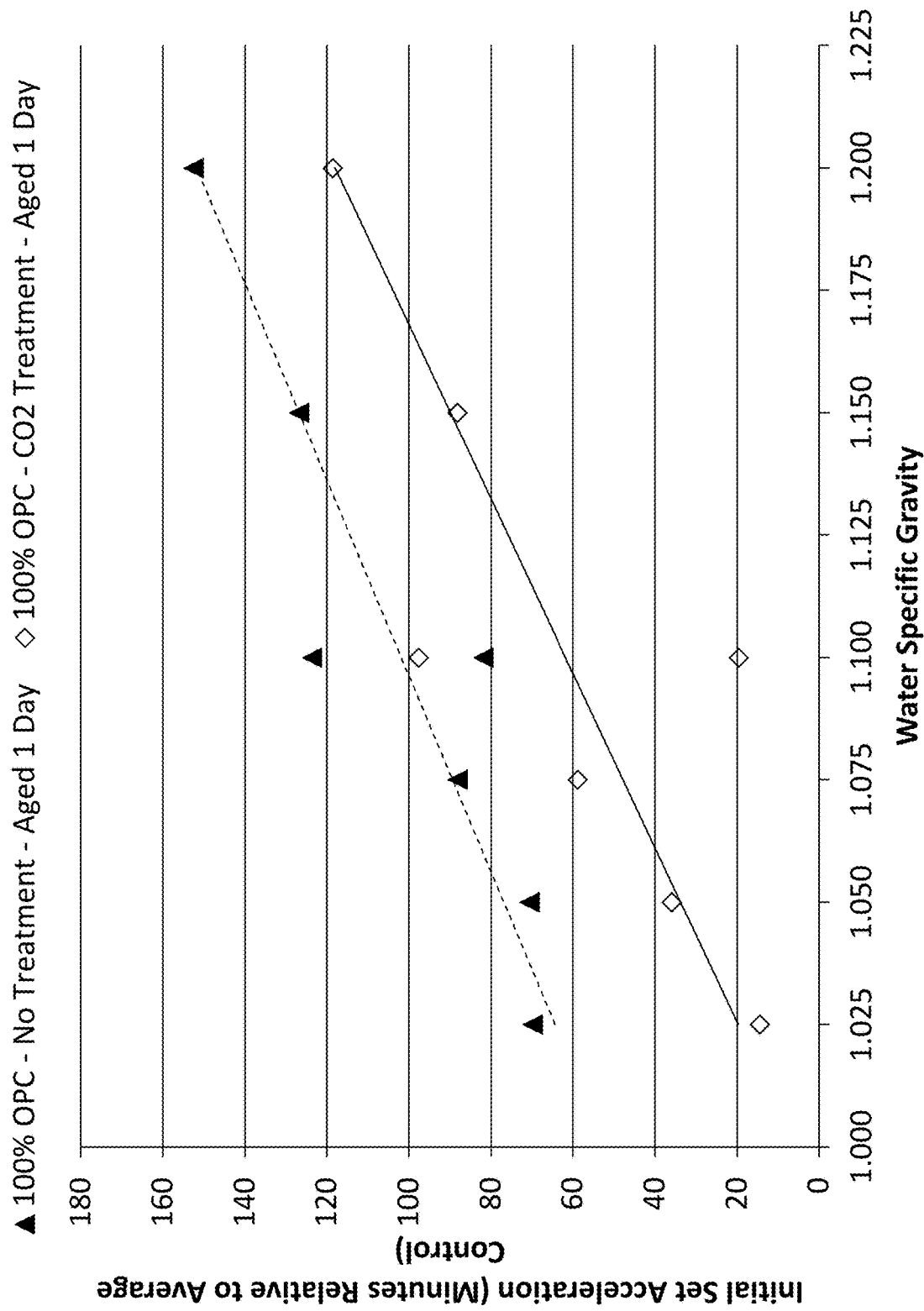
FIG. 6 shows set acceleration in concrete produced with wash (grey) water produced with Ordinary Portland Cement (OPC, 100%), where the water was treated and untreated with carbon dioxide, and aged 1 or 6 days, in a large number of different specific gravities.

In all cases the CO2 treatment greatly reduced the acceleration caused by increases solid contents in the wash water (FIGS. 2, 4 and 6). In addition, in all cases the CO2 treatment greatly reduced the acceleration caused by increases aging of the wash water (FIG. 2).

Figure 3:
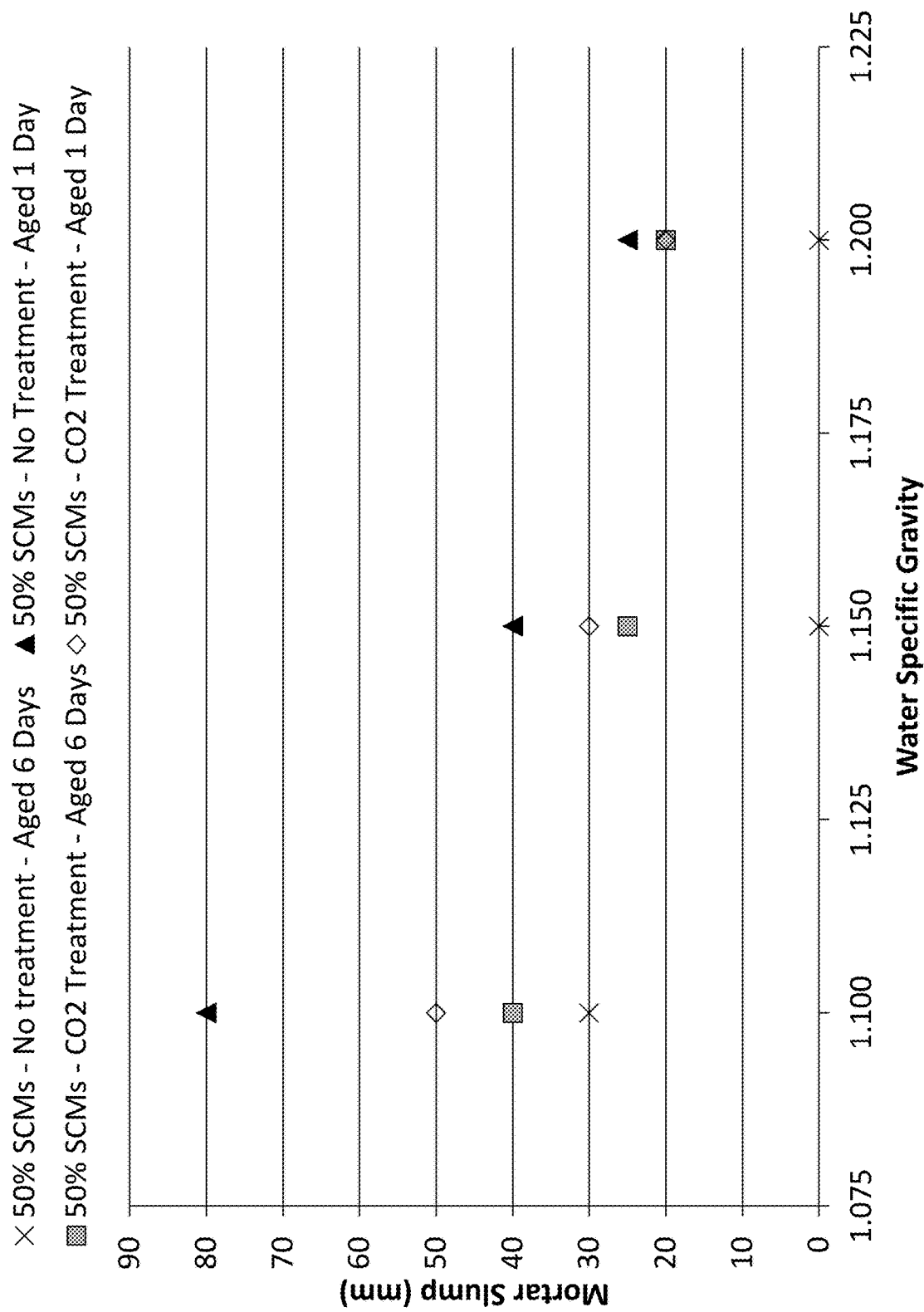
FIG. 3 shows workability (slump) in concrete produced with wash (grey) water produced with Ordinary Portland Cement (OPC, 50%) and supplementary cementitious materials (SCM, 50%), where the water was treated and untreated with carbon dioxide, and aged 1 or 6 days.
Figure 5:
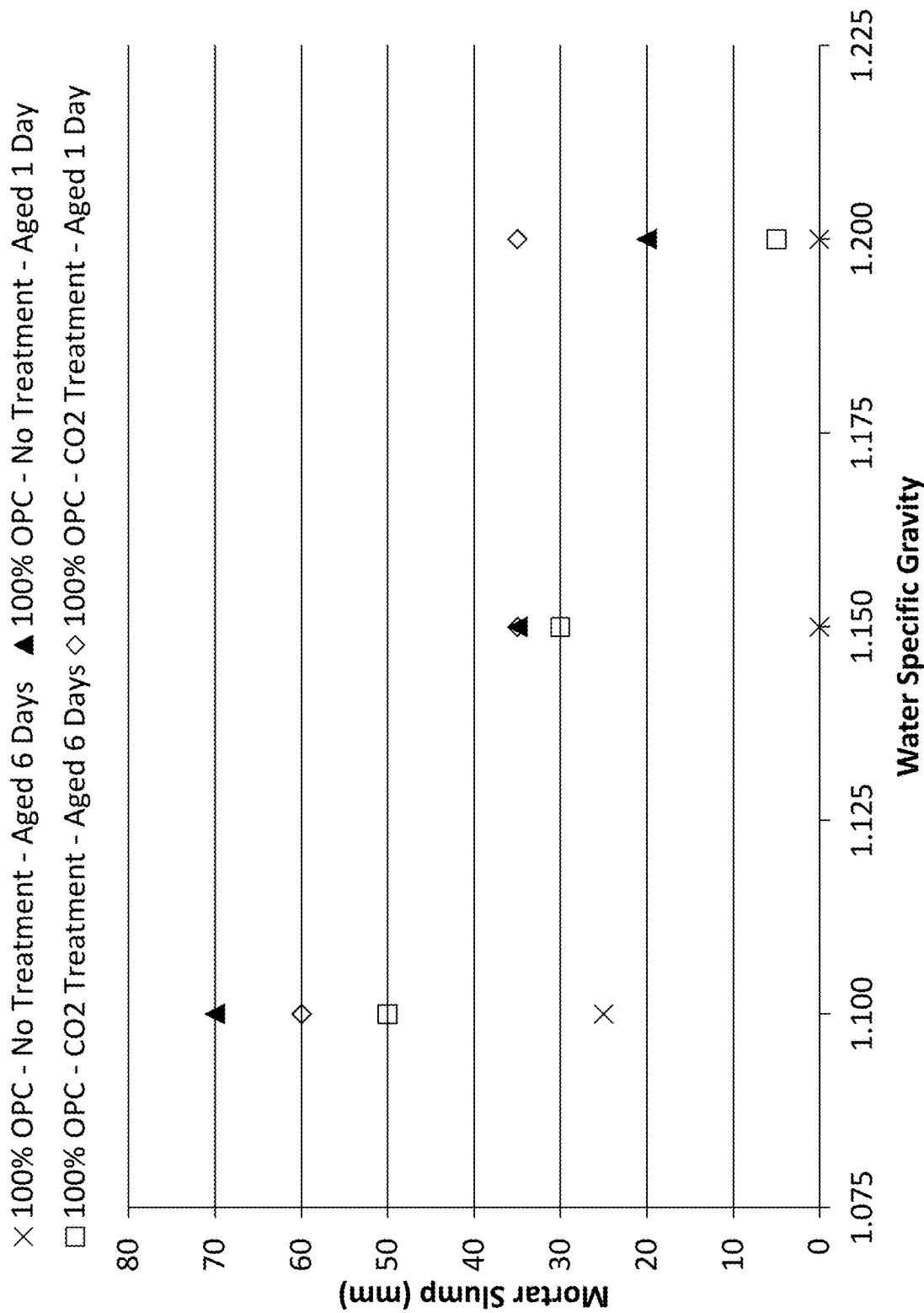
FIG. 5 shows workability (slump) in concrete produced with wash (grey) water produced with Ordinary Portland Cement (OPC, 100%), where the water was treated and untreated with carbon dioxide, and aged 1 or 6 days.

Workability. In all cases the CO2 treatment greatly reduced the loss of workability caused by increases aging of the wash water (FIGS. 3 and 5).

Calorimetry.

Figure 7:
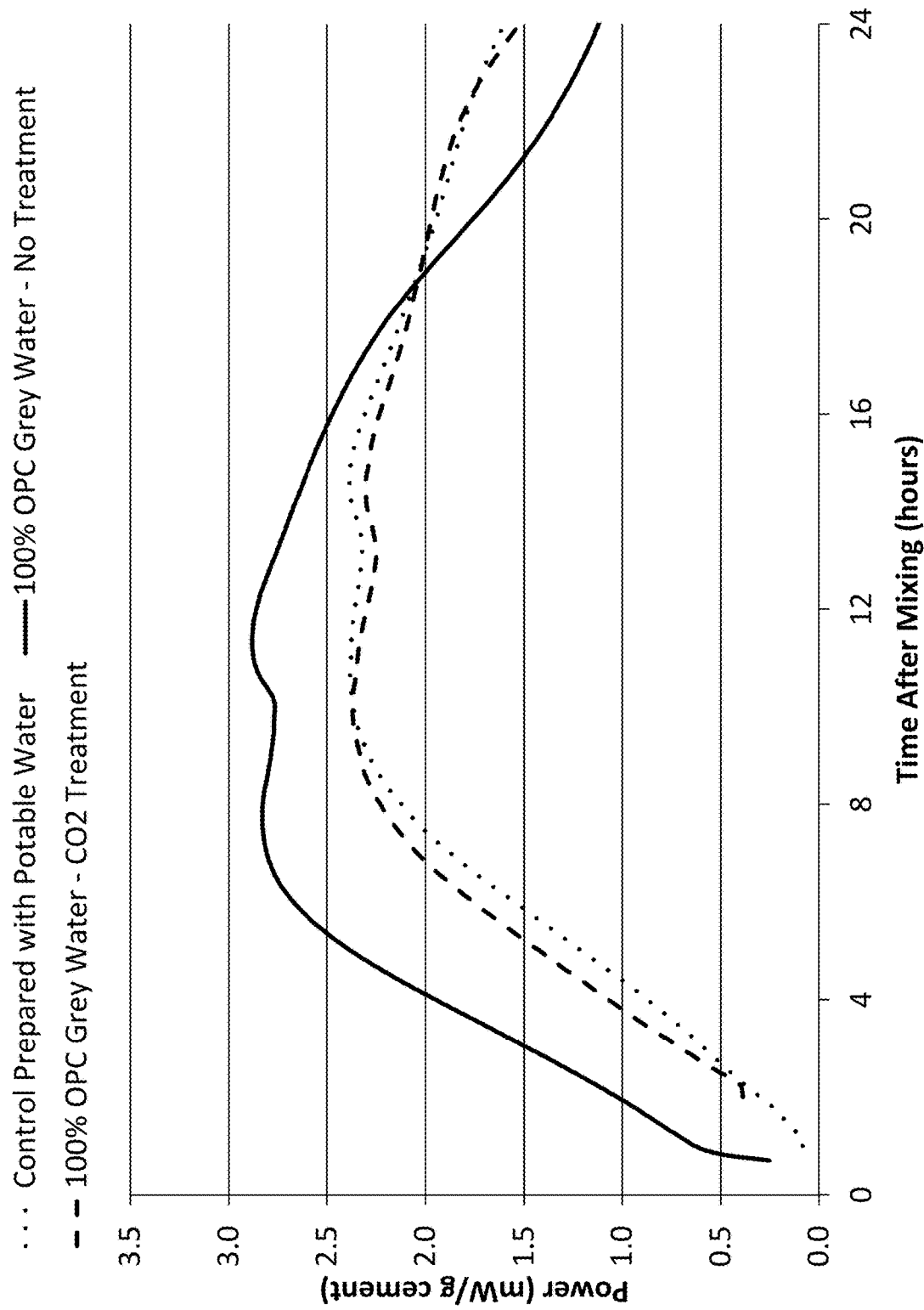
FIG. 7 shows calorimetry, as power vs. time, for concrete produced with wash (grey) water produced with Ordinary Portland Cement (OPC, 100%), where the water was treated and untreated with carbon dioxide, and for concrete prepared with potable water.
Figure 8:
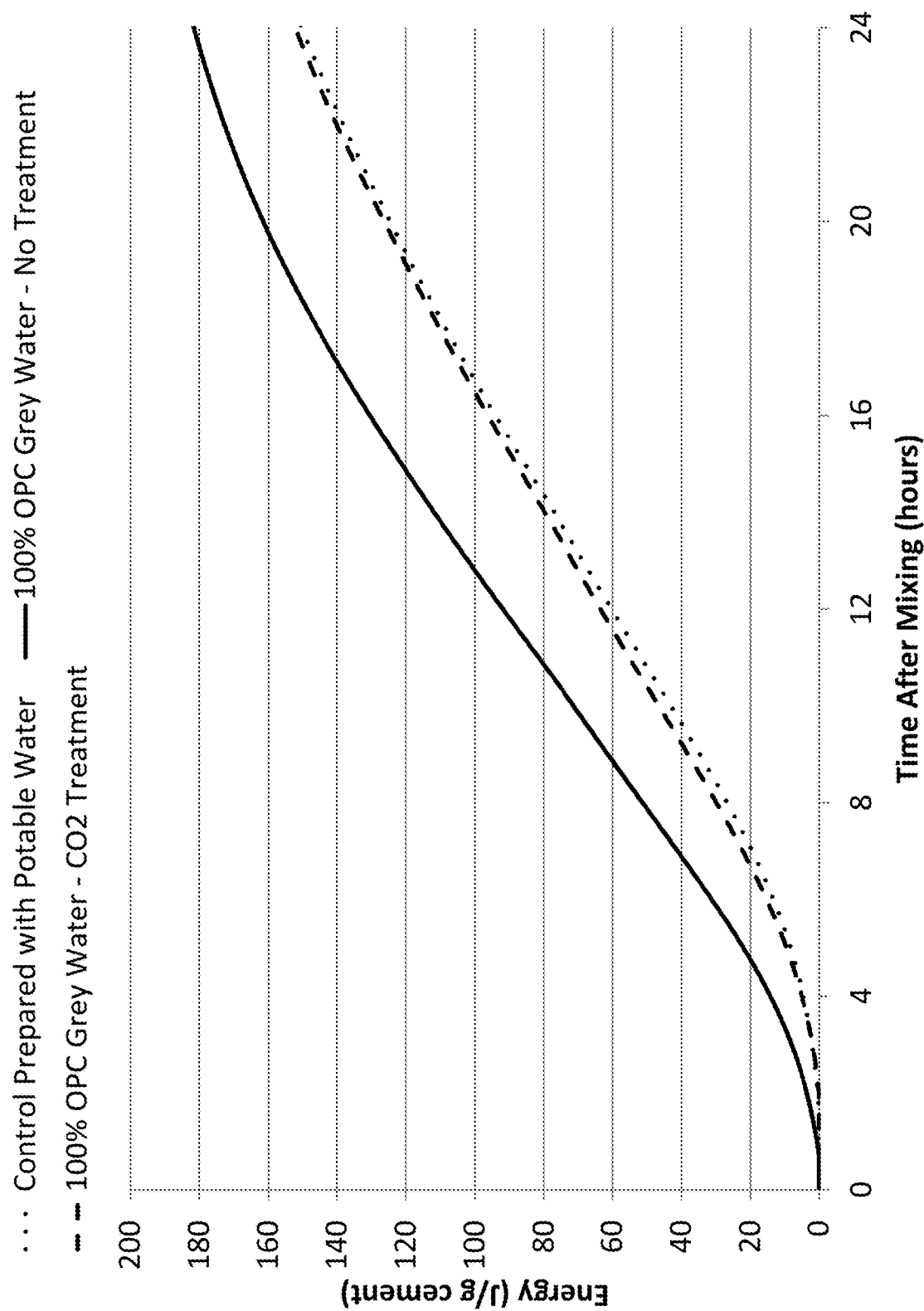
FIG. 8 shows calorimetry, as energy vs. time, for concrete produced with wash (grey) water produced with Ordinary Portland Cement (OPC, 100%), where the water was treated and untreated with carbon dioxide, and for concrete prepared with potable water.

The CO2 treatment has a marked impact on the hydration of cement in mortars prepared with grey water, returning the onset and intensity of features to the same region as the control sample made with potable water. FIGS. 7-8 are representative calorimetry curves as observed from the previously presented experiments. In all cases the grey water was prepared with 100% OPC to have a specific gravity of 1.1 and aged for 1 day. The curves presented compare the calorimetry response for three cases: 100% OPC grey water without CO2 treatment; 100% OPC grey water with CO2 treatment; a control produced with potable water. From both power (FIG. 7) and energy (FIG. 8) perspective it can be observed that the CO2 treatment allows the hydration of cement in the mortar samples to proceed normally: when using the CO2 treatment the onset and intensity of features is in-line with those observed for the control produced with potable water Carbon Dioxide Exposure Variables.

In a second set of tests, three different modes of CO2 exposure were tested: Continuous—the grey water was exposed to CO2 starting at approximately 2 hours after mixing until use; Treatment at 2 hours—the grey water was exposed to CO2 once at approximately 2 hours after mixing and untreated until use as mix water; Treatment before use—the grey water was untreated until approximately 15 minutes before use. These three variations were meant to mimic timeframes when CO2 could foreseeably be applied to grey water in an industrial setting. The choice of 2 hours was meant to begin the CO2 treatment after the grey water had been prepared, but before any significant cement hydration had occurred. In practice this timeframe could be anywhere from 15-180 minutes.

Figure 9:
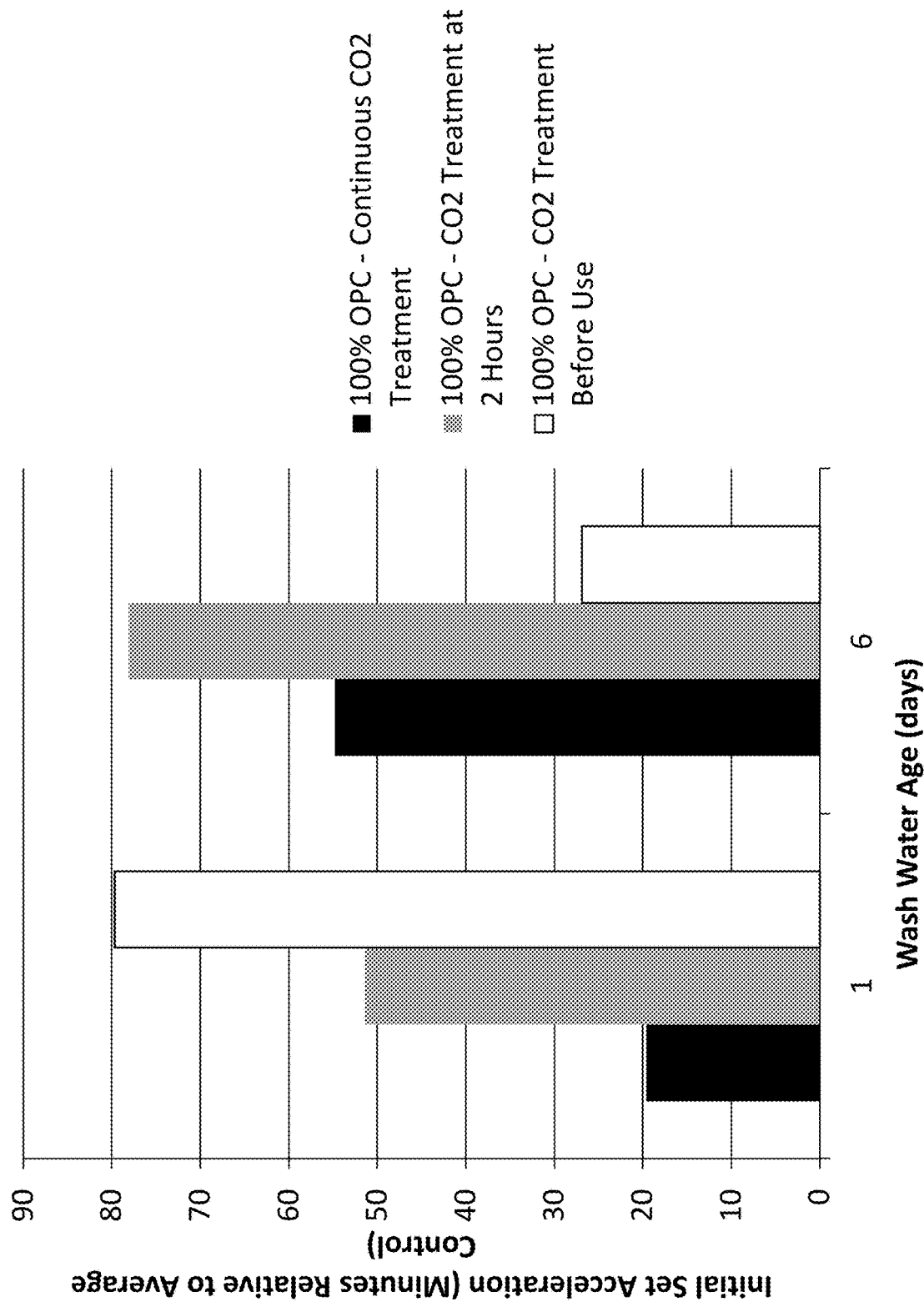
FIG. 9 shows set acceleration in concrete produced with wash (grey) water produced with Ordinary Portland Cement (OPC, 100%), where the wash water was treated with carbon dioxide continuously, at 2 hours after preparation of wash water, or just prior to use in the concrete.
Figure 10:
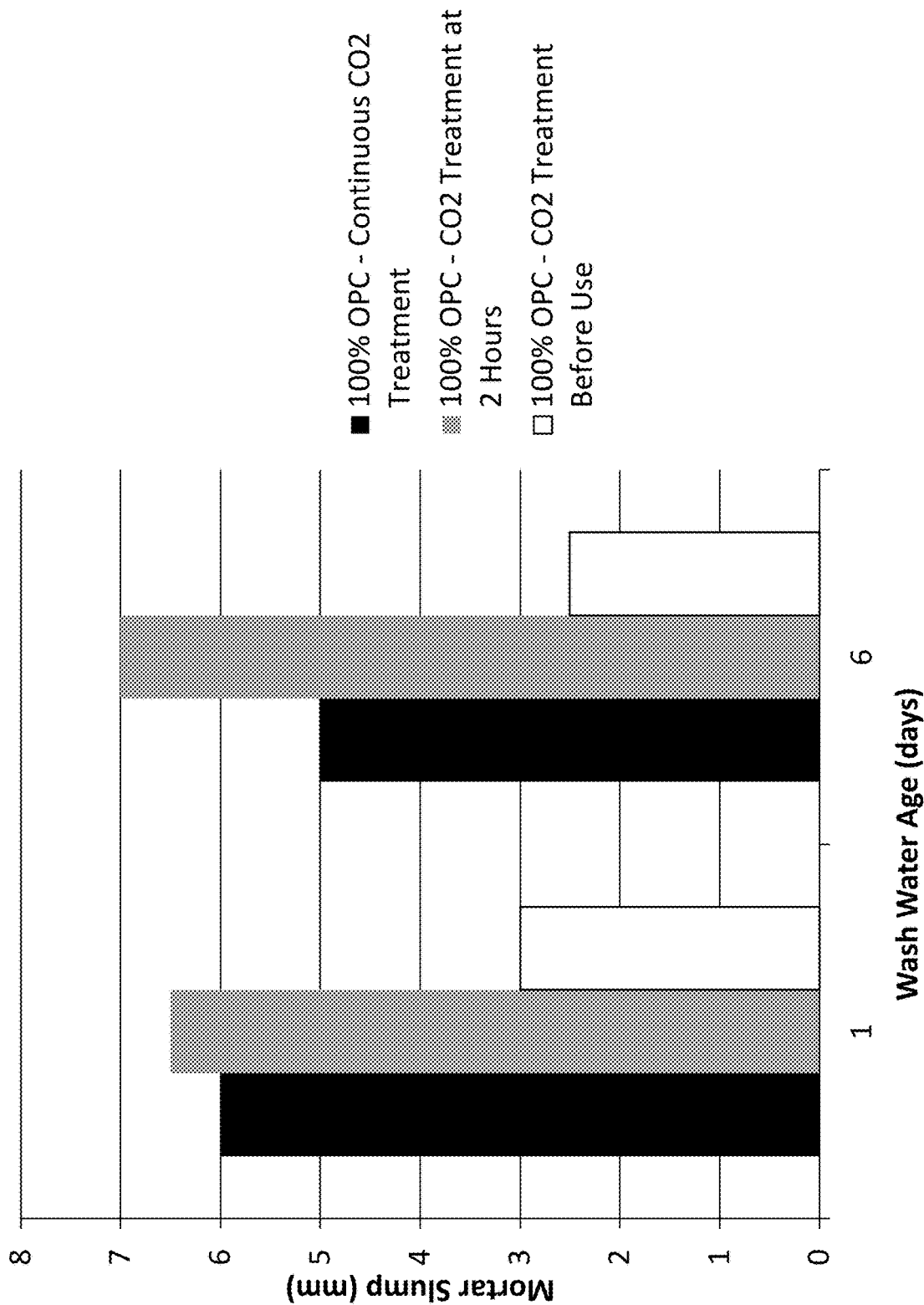
FIG. 10 shows workability (slumpP in concrete produced with wash (grey) water produced with Ordinary Portland Cement (OPC, 100%), where the wash water was treated with carbon dioxide continuously, at 2 hours after preparation of wash water, or just prior to use in the concrete.

Continuous treatment offered the best improvement of set time after 1 day of aging while CO2 treatment before use offered the best improvement after 6 days of aging (FIG. 9). In general treatment at 2 hours provided the best slump impact (FIG. 10).

Strength Assessment.

Figure 11:
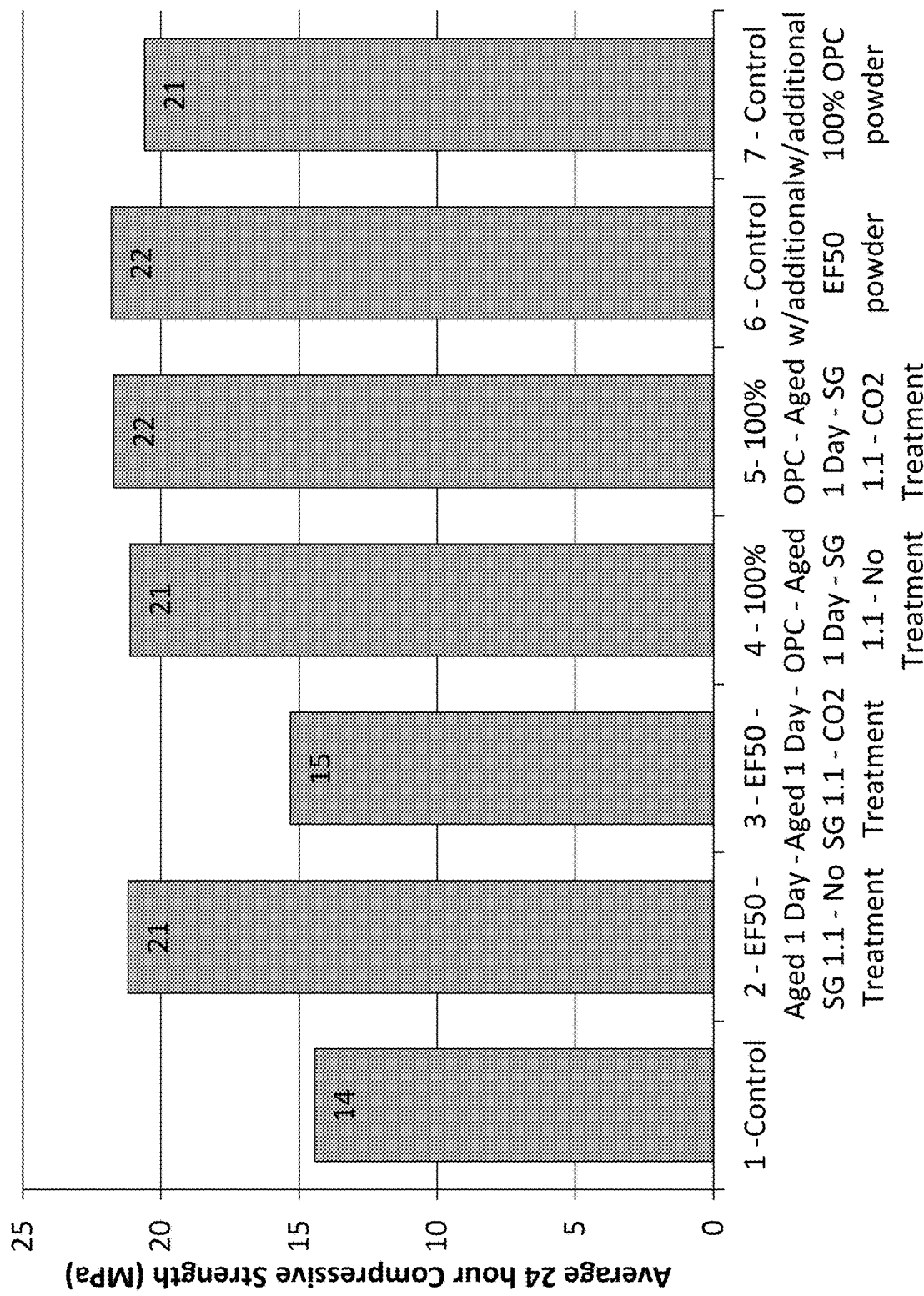
FIG. 11 shows 24-hour compressive strengths for concrete produced with various wash waters, where the wash water was treated or not treated with carbon dioxide.

See FIG. 11

Sample of grey water were used to prepare 2"×2"×2" mortar cubes for assessment of compressive strength development. All grey water was aged for 1 day and prepared at a specific gravity of 1.1. Compressive strength tests were performed at 24 hours after mixing. The samples were prepared as follows: A control made with potable water; EF50 grey water without CO2 treatment; EF50 grey water with CO2 treatment; 100% OPC grey water without CO2 treatment; 100% OPC grey water with CO2 treatment; Control with additional EF50 powder; Control with additional 100% OPC powder. Where the additional solids in the grey water are cementitious in nature samples 6 and 7 were prepared with the same amount of solids as in the grey water. In all cases this was introduced as additional anhydrous binder.

Figure 13:
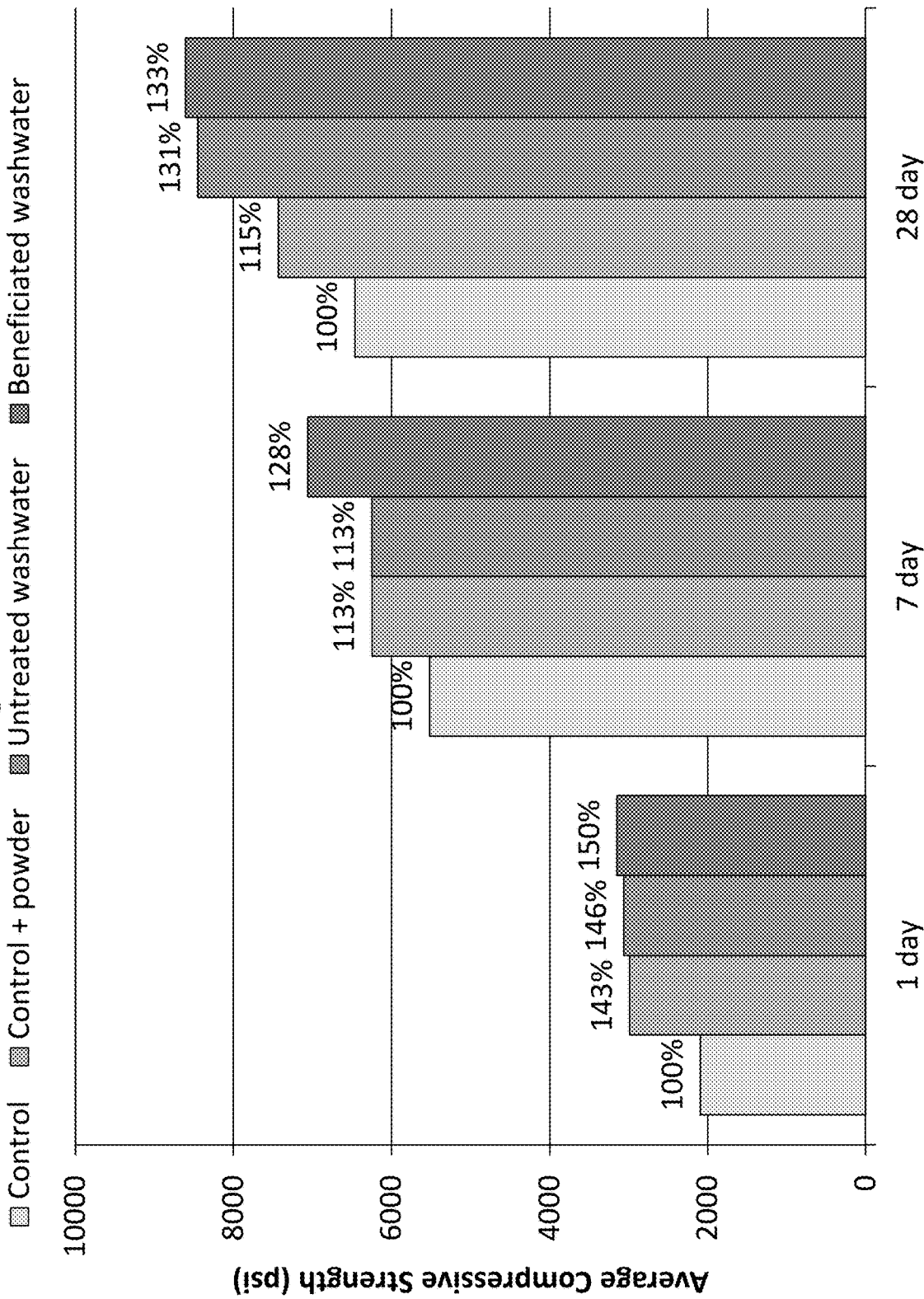
FIG. 13 shows strength enhancement at 7 days for concrete produced with various wash waters, where the wash water was treated or not treated with carbon dioxide.
Figure 14:
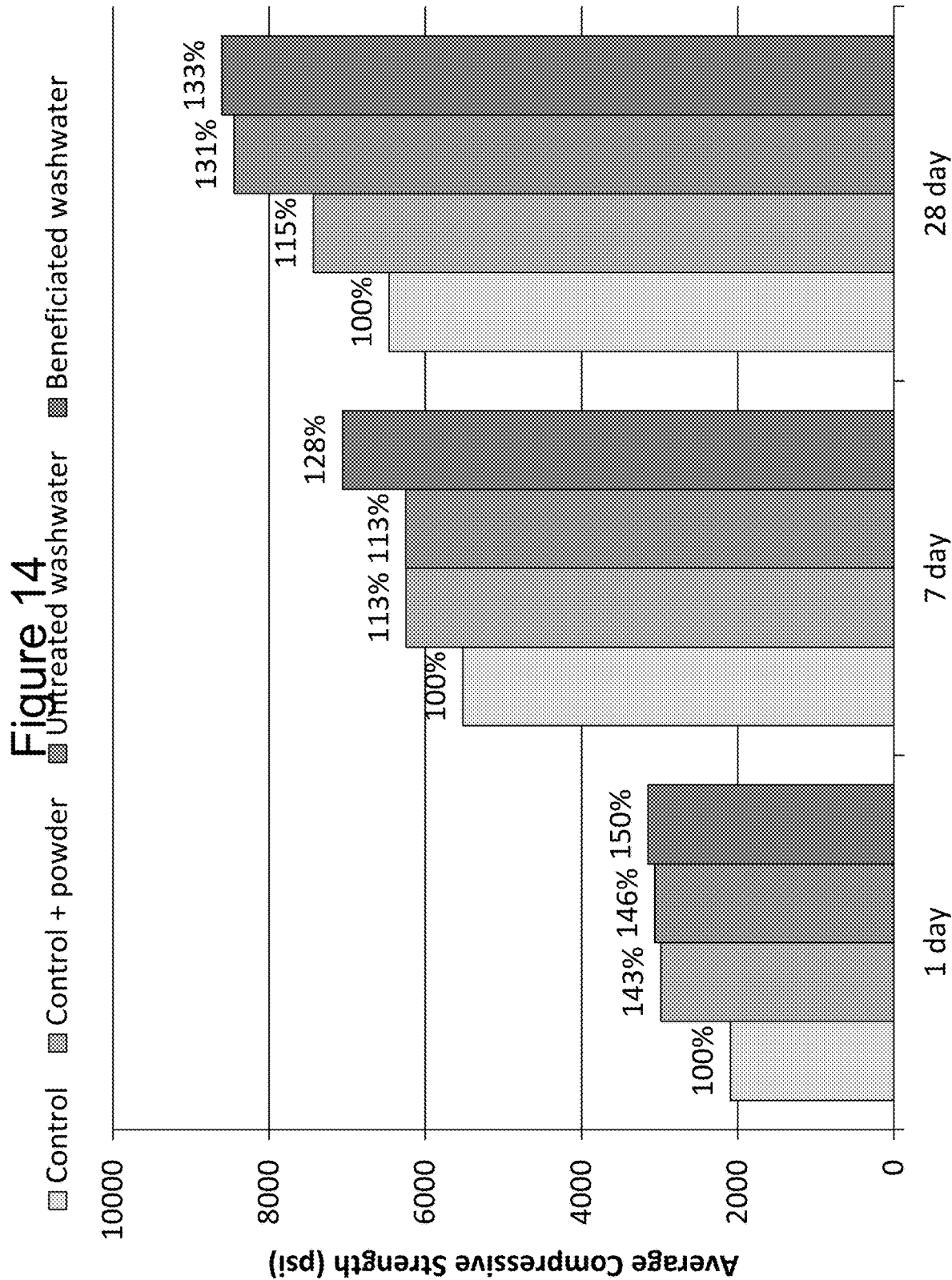
FIG. 14 shows strength enhancement at 28 days for concrete produced with various wash waters, where the wash water was treated or not treated with carbon dioxide.

In all cases the samples performance was equivalent or better than a control produced with potable water (FIG. 11). There was also a strength enhancement at later time points, for example, 7 and/or 28 days. See FIG. 13 (Washwater of 100% OPC, SG 1.1) and 14 (Washwater 50% cement, 30% slag, 20% class F fly ash).

Cooling.

Figure 12:
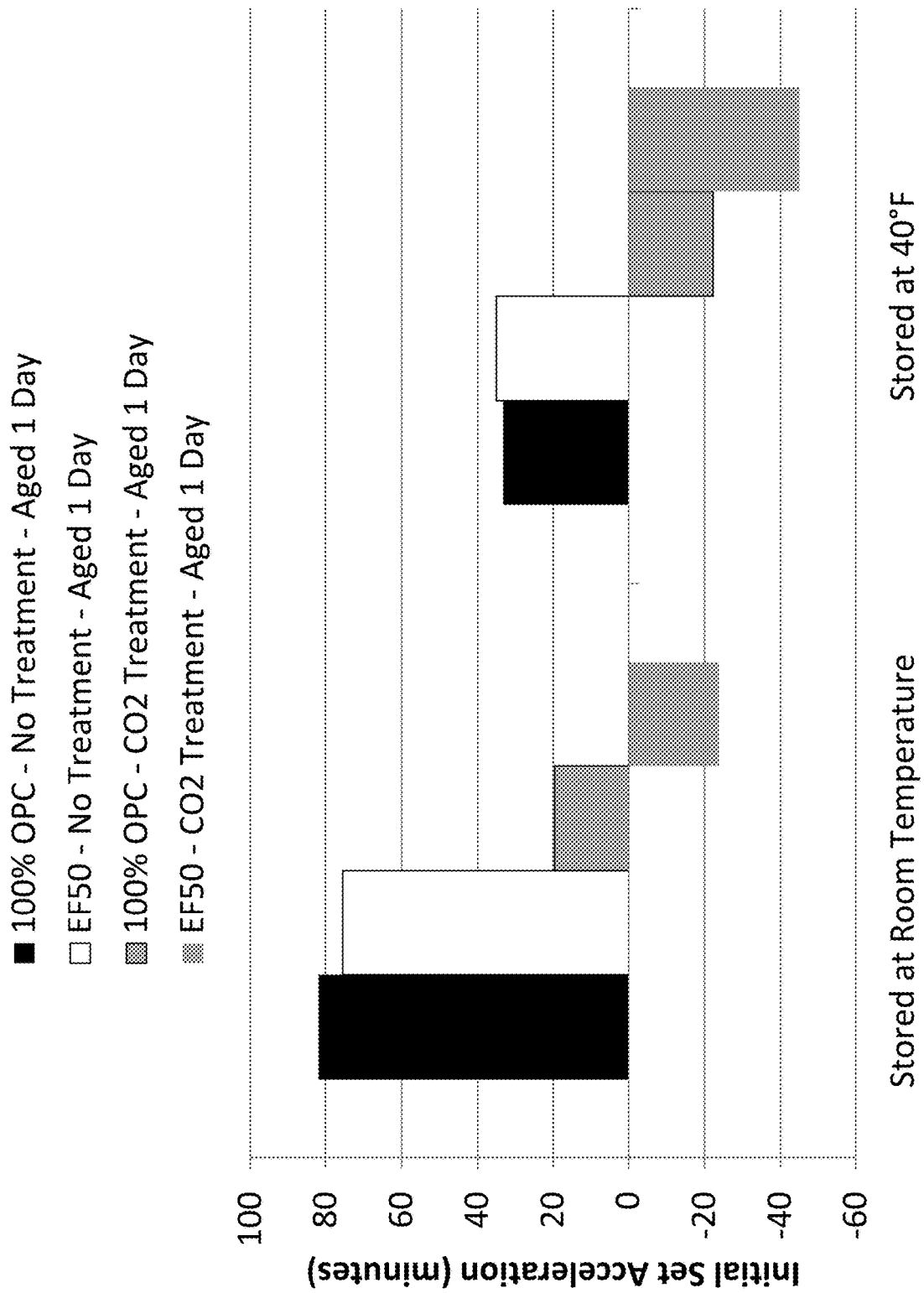
FIG. 12 shows set acceleration in concrete prepared with wash water treated or not treated with carbon dioxide and held at two different temperatures.

Samples of grey water with two different compositions (EF50 and 100% OPC) were prepared at a specific gravity of 1.1 and stored at one of two temperatures: Low temperature=40° F.; Room temperature=approximately 65° F. A combination of cooling and CO2 treatment provided a synergistic improvement in mortar set time, see FIG. 12.

Example 3

Binder powder was added to samples of water and allowed to age either 1 or 7 days. The binder powder for a given water sample matched the composition of the binder for the mortar later produced from the water; e.g., if the mortar were to be made with 100% OPC, binder powder for wash water was 100% OPC; if the mortar were to be made with 75/25 OPC/class F fly ash, a 75/25 OPC/class F fly ash was used. Water was either left untreated, or treated with $CO_2$ consistently over the aging period. An excess of $CO_2$ was supplied to allow thorough carbonation. Following aging of the mix water mortar samples were prepared according to the following recipe: 1350 g EN Sand, 535 g cement. Set time was measured from calorimetry as the thermal indicator of set (the hydration time to reach a thermal power of 50% of the maximum value of the main hydration peak, ASTM C1679).

Figure 15:
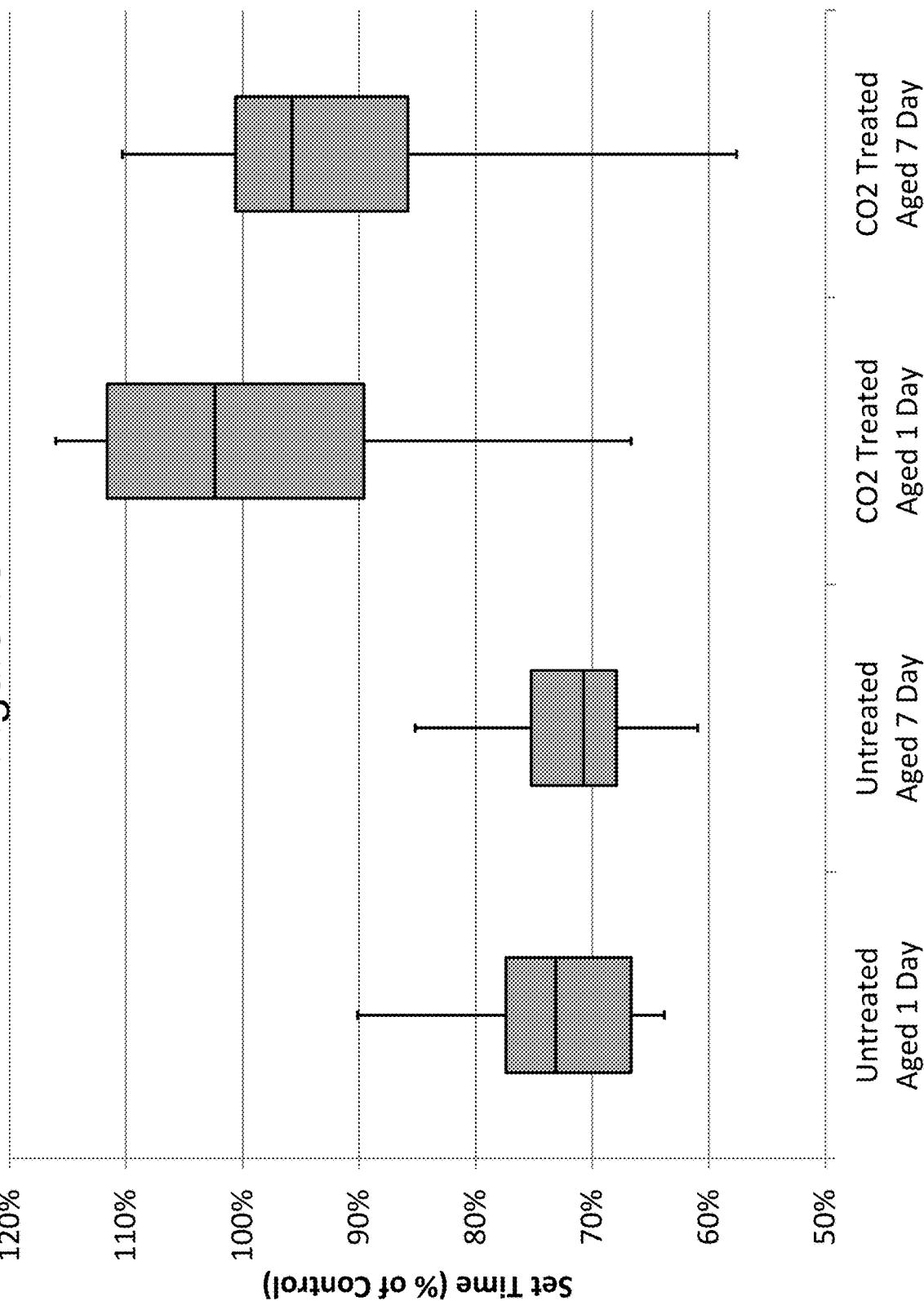
FIG. 15 shows set times for mortar cubes made with wash water treated or untreated with carbon dioxide, and sitting for 1 day or 7 days.
Figure 16:
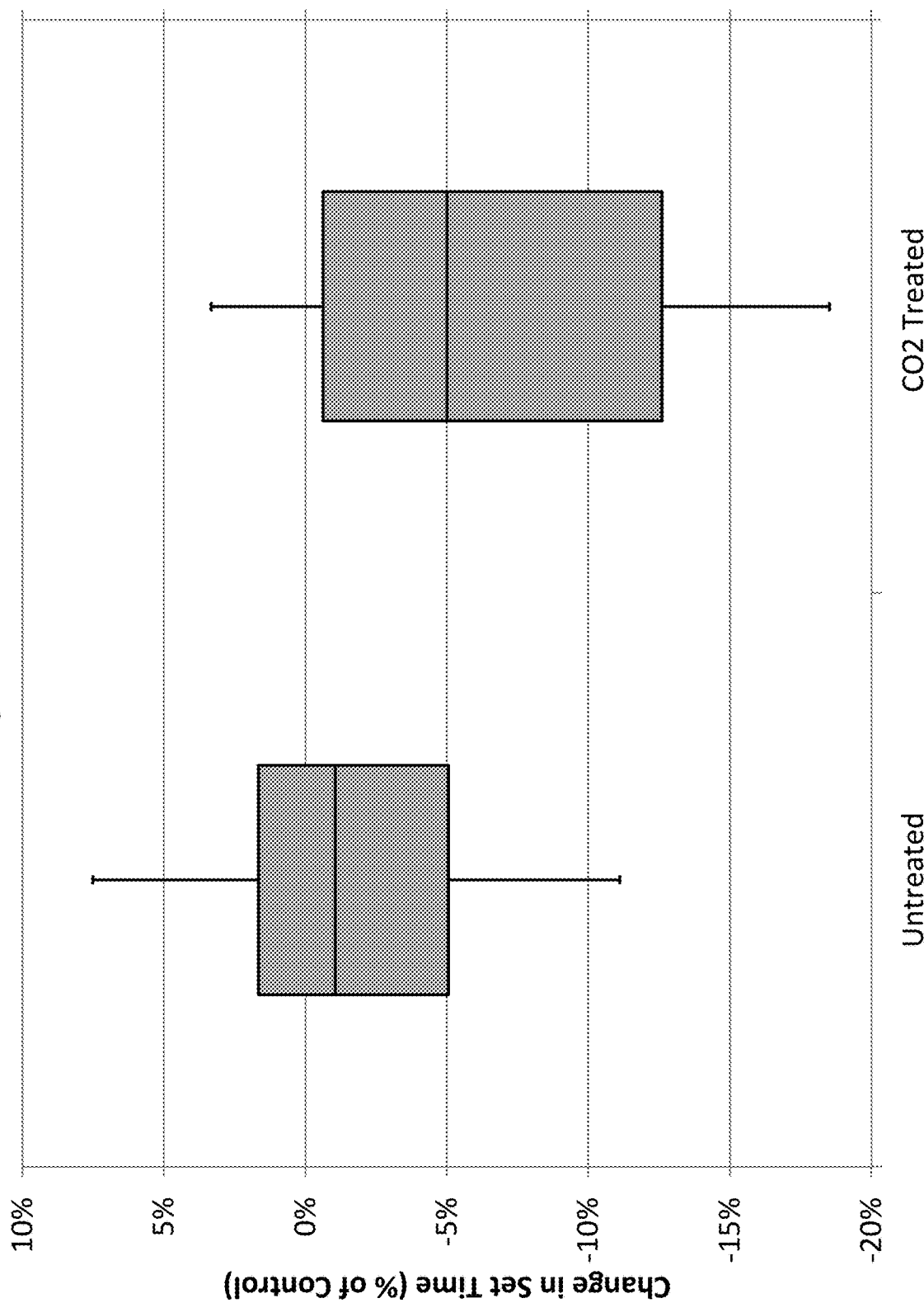
FIG. 16 shows set times at 1 day relative to 7 days.
Figure 17:
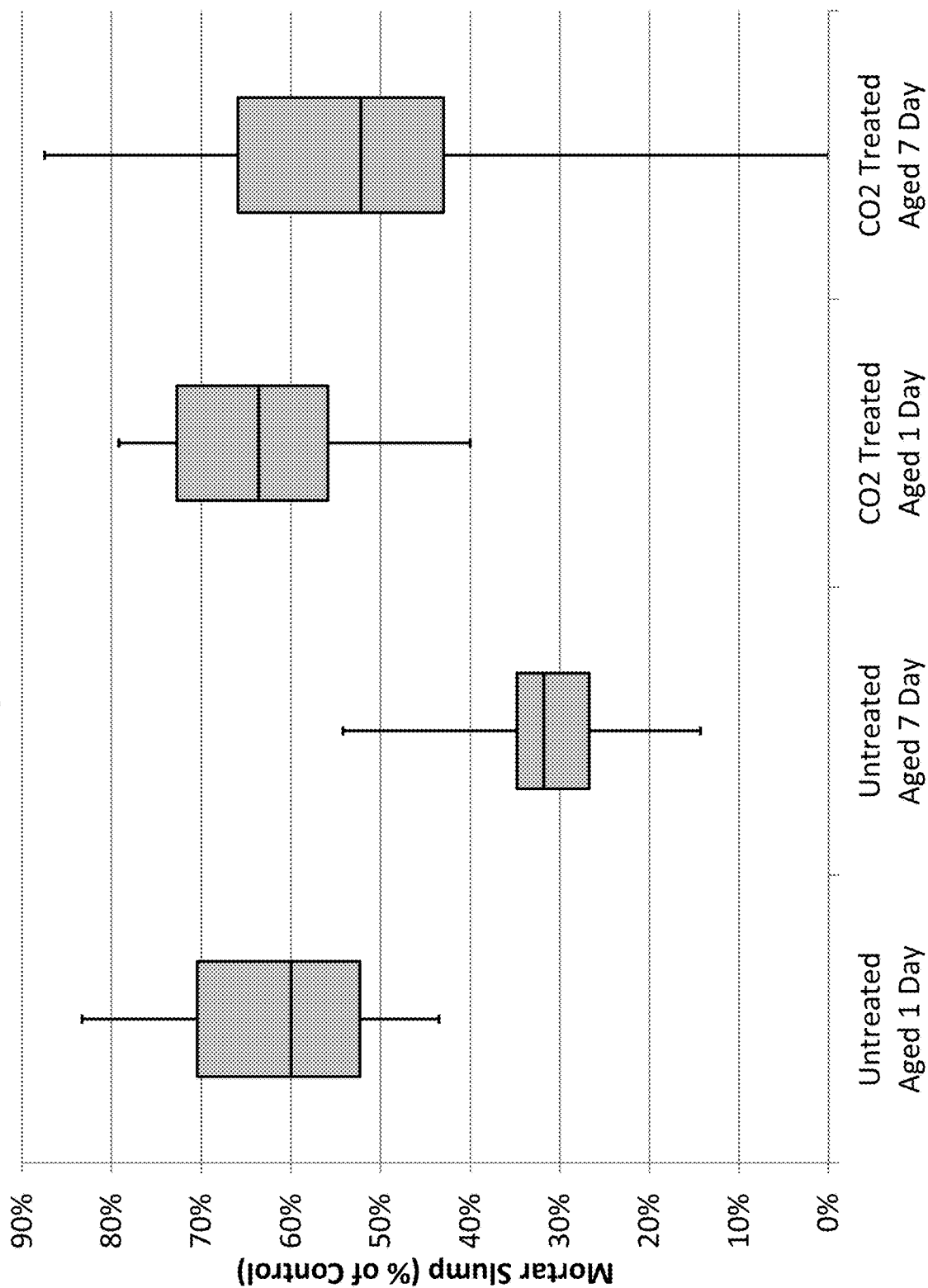
FIG. 17 shows set mortar slump mortar cubes made with wash water treated or untreated with carbon dioxide, and sitting for 1 day or 7 days.
Figure 18:
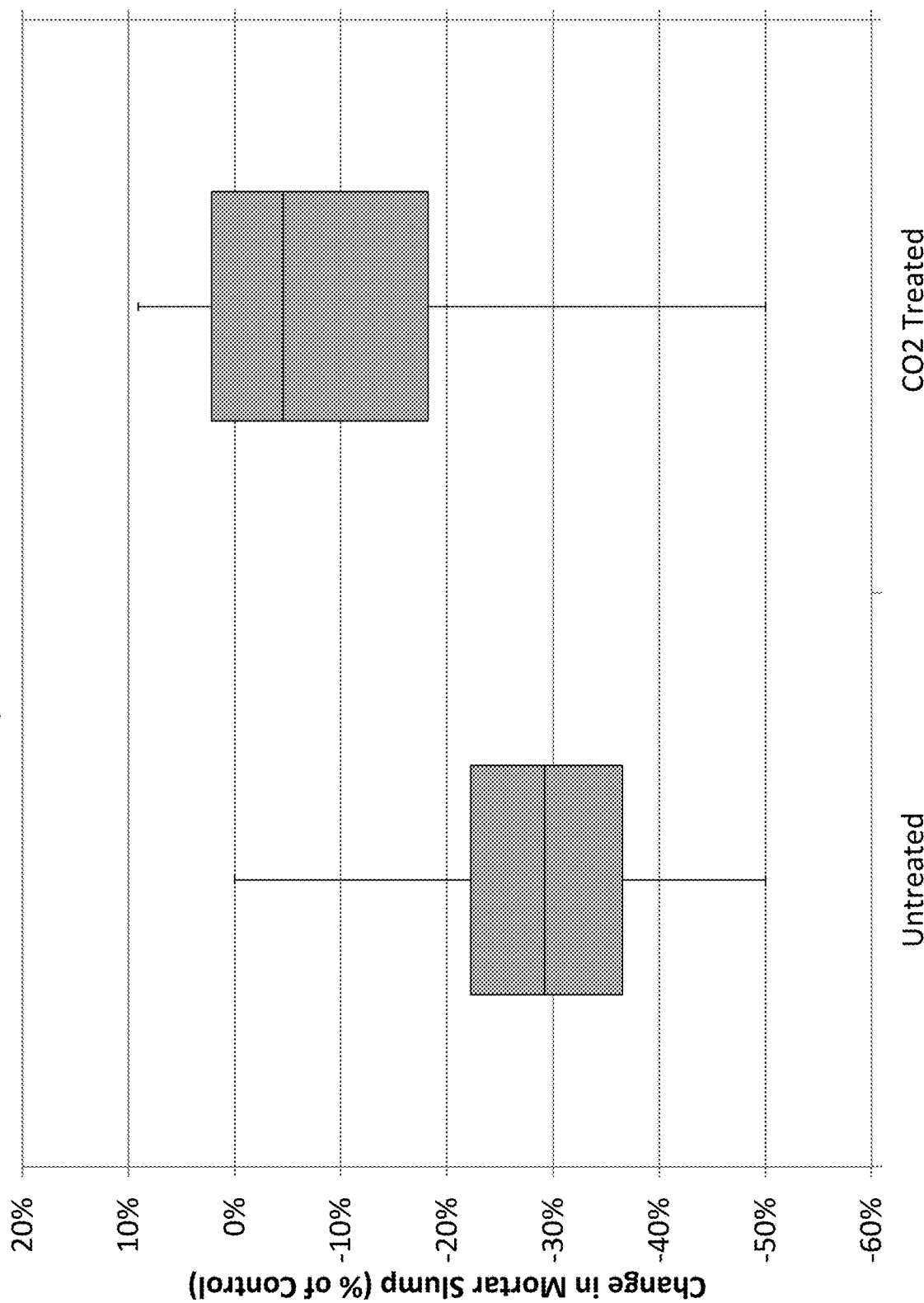
FIG. 18 shows mortar slump for water held at 7 days relative to slump for water held at 1 day.

The results are shown in FIGS. 15-18 and TABLE 2. 15 different batches were aggregated for each condition, and results are shown as BOX PLOTS showing $1^{st}$ quartile, median, and $3^{rd}$ quartile. Whiskers show max and min. FIG. 15 shows set time relative to a potable water control with the same binder composition and w/b. Set time is reduced in untreated water (average 73% to 71%). Set time is improved to neutral if CO2 treatment is used (Average is 98% at 1 day, 91% at 7 days). FIG. 16 shows set time at 7 days relative to set time at 1 day. Water aging did not have a large effect on set time for either case (decline in average by 2% for untreated and 6% in CO2 treated water). FIG. 17 shows mortar slump (workability) relative to a potable water control with the same binder composition and w/b. Slump was compromised when using wash water, and became worse with age if the water was not treated. The average declined from 62% to 32% in the untreated water, and 63% to 51% in the treated water; thus, carbon dioxide treatment mitigated the further decrease in slump in aging wash water compared to untreated. FIG. 18 shows mortar slump at 7 days relative to mortar slump at 1 day. Workability was worse for 7 day wash water than 1 day was water if it is untreated, but, as noted, there was small to no change observed if CO2 treatment was applied. The results are also summarized in TABLE 2.

TABLE 2

Effect of CO2 treatment of wash water on set time and workability

| | Slump Summary vs Potable Water Reference | | | | | |
|---|---|---|---|---|---|---|
| Metric | Untreated Aged 1 Day | Untreated Aged 7 Days | CO2 Treated Aged 1 Day | CO2 Treated Aged 7 Days | Relative Change in Slump Untreated | CO2 Treated |
| Average | 62% | 32% | 63% | 51% | −29% | −11% |
| Median | 60% | 32% | 64% | 52% | −29% | −5% |
| Min | 43% | 14% | 40% | 0% | −50% | −50% |
| Max | 83% | 54% | 79% | 88% | 0% | 9% |
| 1st Quartile | 52% | 27% | 56% | 43% | −37% | −18% |
| 3rd Quartile | 70% | 35% | 73% | 66% | −22% | 2% |

| | Set Time Summary vs Potable Water Reference | | | | | |
|---|---|---|---|---|---|---|
| Metric | Untreated Aged 1 Day | Untreated Aged 7 Days | CO2 Treated Aged 1 Day | CO2 Treated Aged 7 Days | Relative Change in Set Time Untreated | CO2 Treated |
| Average | 73% | 71% | 98% | 91% | −2% | −6% |
| Median | 73% | 71% | 102% | 96% | −1% | −5% |
| Min | 64% | 61% | 67% | 58% | −11% | −19% |
| Max | 90% | 85% | 116% | 110% | 8% | 3% |
| 1st Quartile | 67% | 68% | 90% | 86% | −5% | −13% |
| 3rd Quartile | 77% | 75% | 112% | 101% | 2% | −1% |

Example 4

This Example describes the effects of duration of exposure of wash water to carbon dioxide.

Binder powder was added to samples of water to create simulated wash water at specific gravity of 1.1. The water samples were mixed for varying durations, starting about 30 minutes after they were first produced. The water was either left untreated, or treated with $CO_2$ consistently over the mixing period. An excess of $CO_2$ was supplied to allow thorough carbonation. The pH of the water and $CO_2$ uptake of the solids was measured. Water samples were allowed to age either 1 or 7 days. Following aging of the mix water mortar samples were prepared according to the standard recipe. 1350 g EN Sand, 535 g cement.

Figure 19:
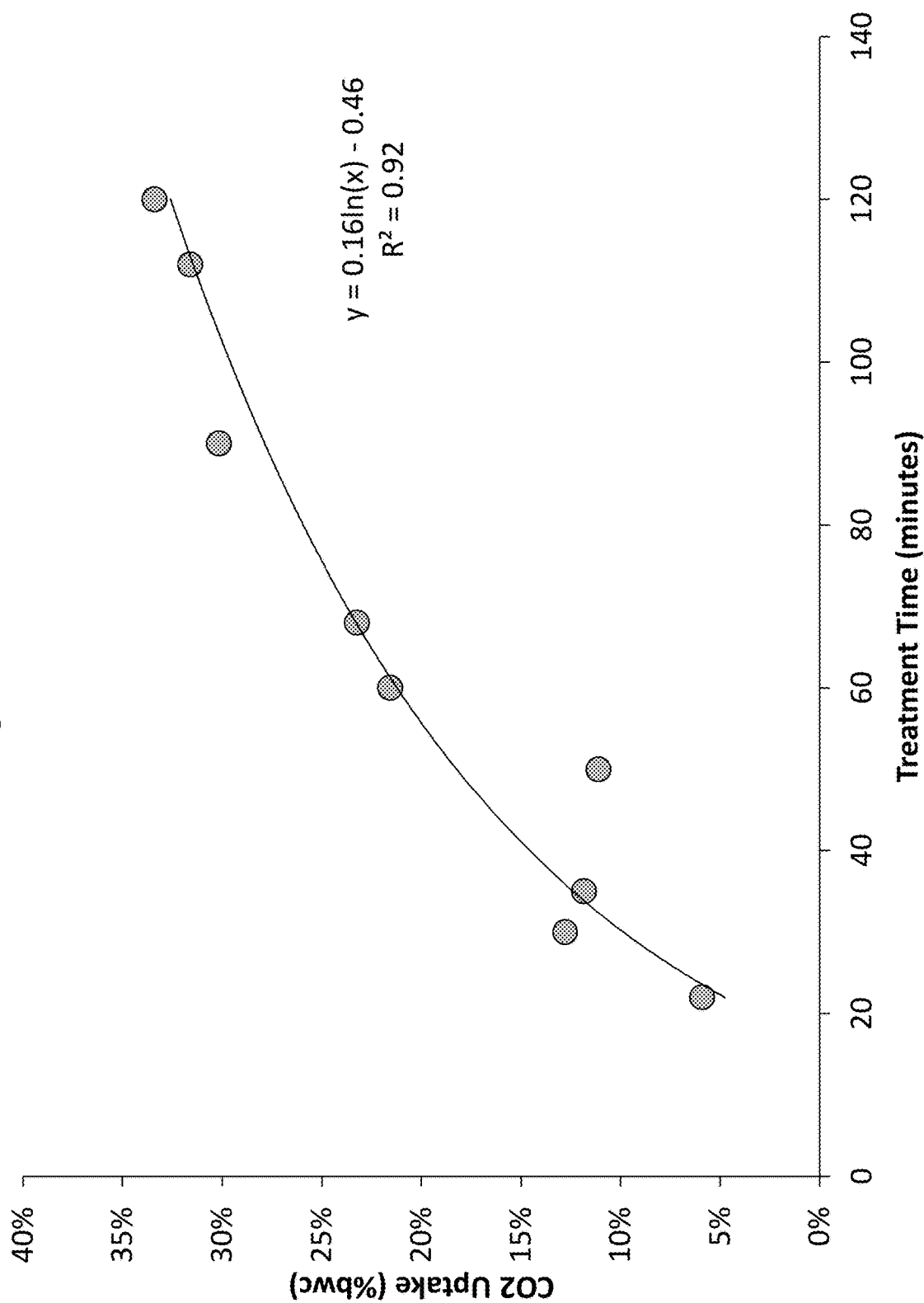
FIG. 19 shows carbon dioxide uptake of solids in wash water relative to time of treatment with carbon dioxide.
Figure 20:
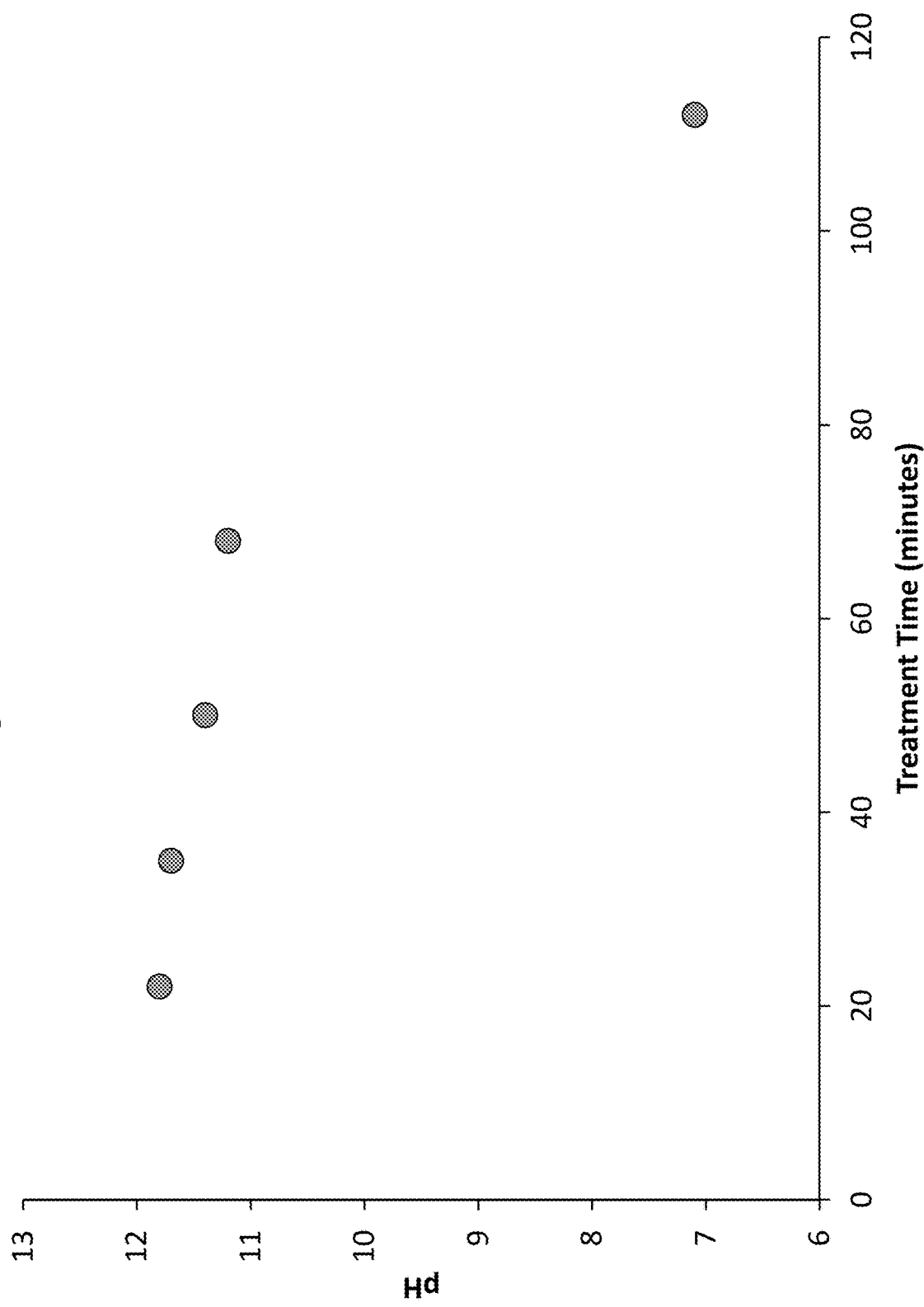
FIG. 20 shows pH of wash water relative to time of treatment with carbon dioxide.
Figure 21:
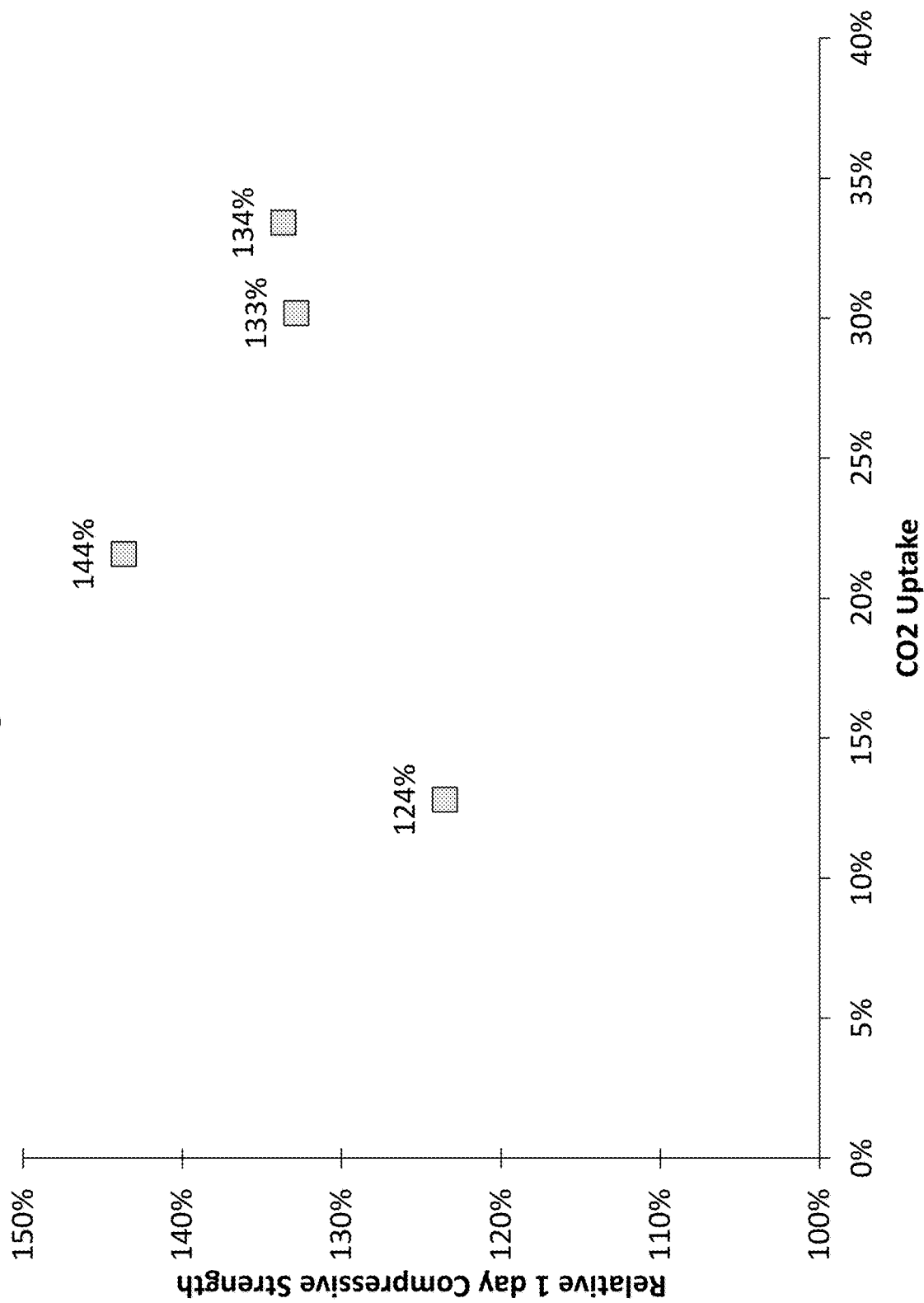
FIG. 21 shows one-day strength of mortar cubes made with wash water treated with carbon dioxide for various times and aged 1 day.
Figure 22:
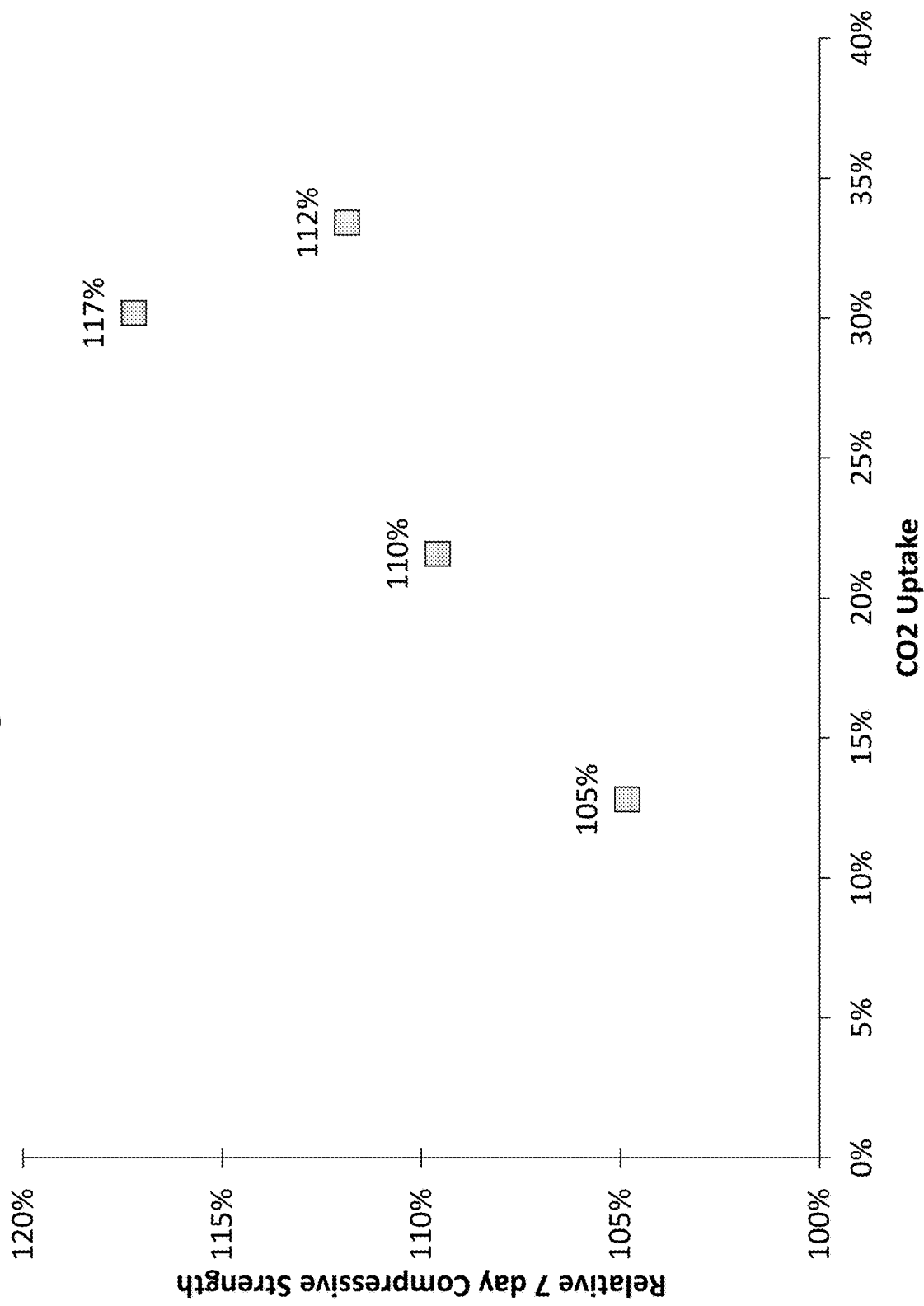
FIG. 22 shows 7-day strength of mortar cubes made with wash water treated with carbon dioxide for various times and aged 1 day.
Figure 23:
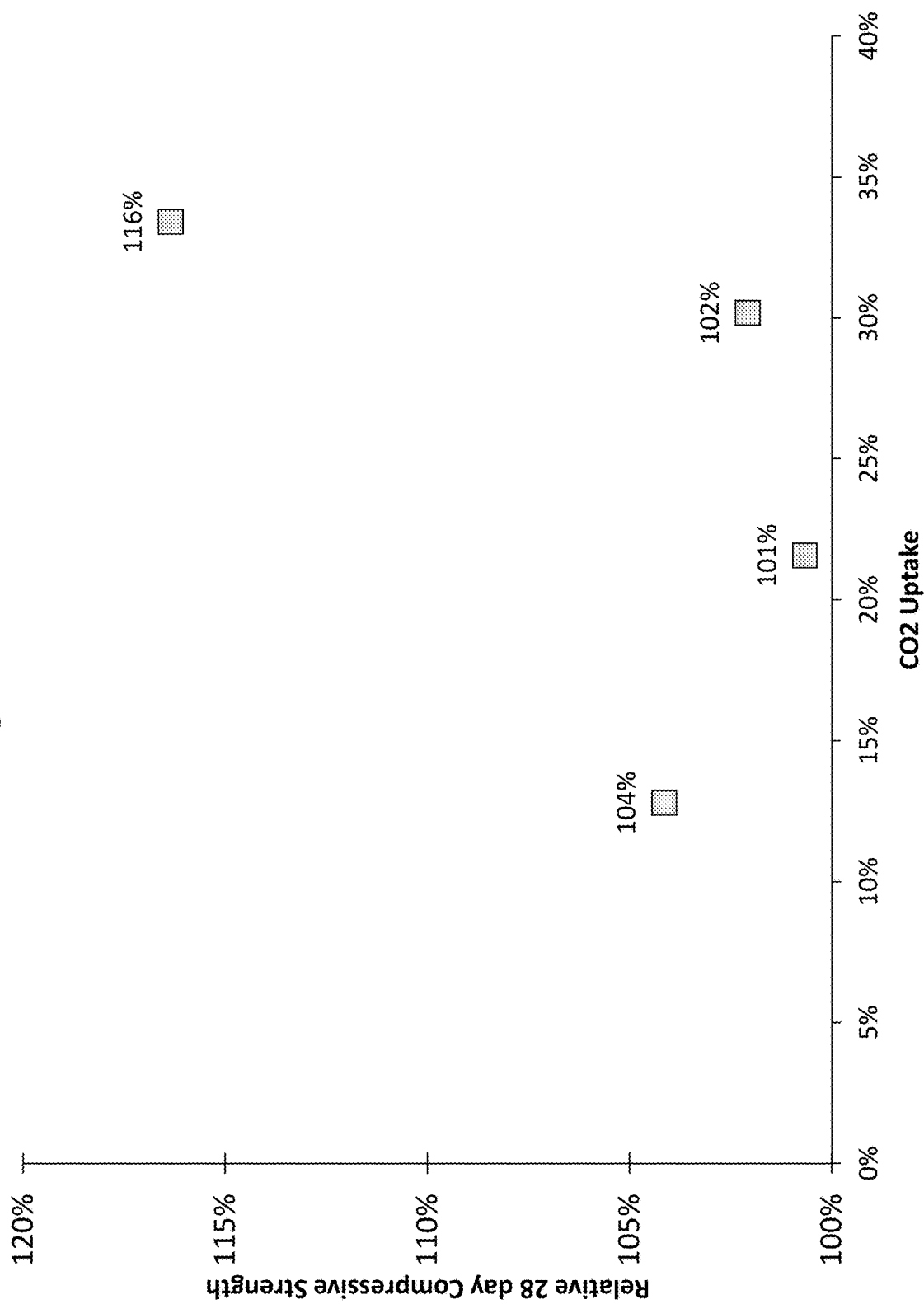
FIG. 23 shows 28-day strength of mortar cubes made with wash water treated with carbon dioxide for various times and aged 1 day.
Figure 24:
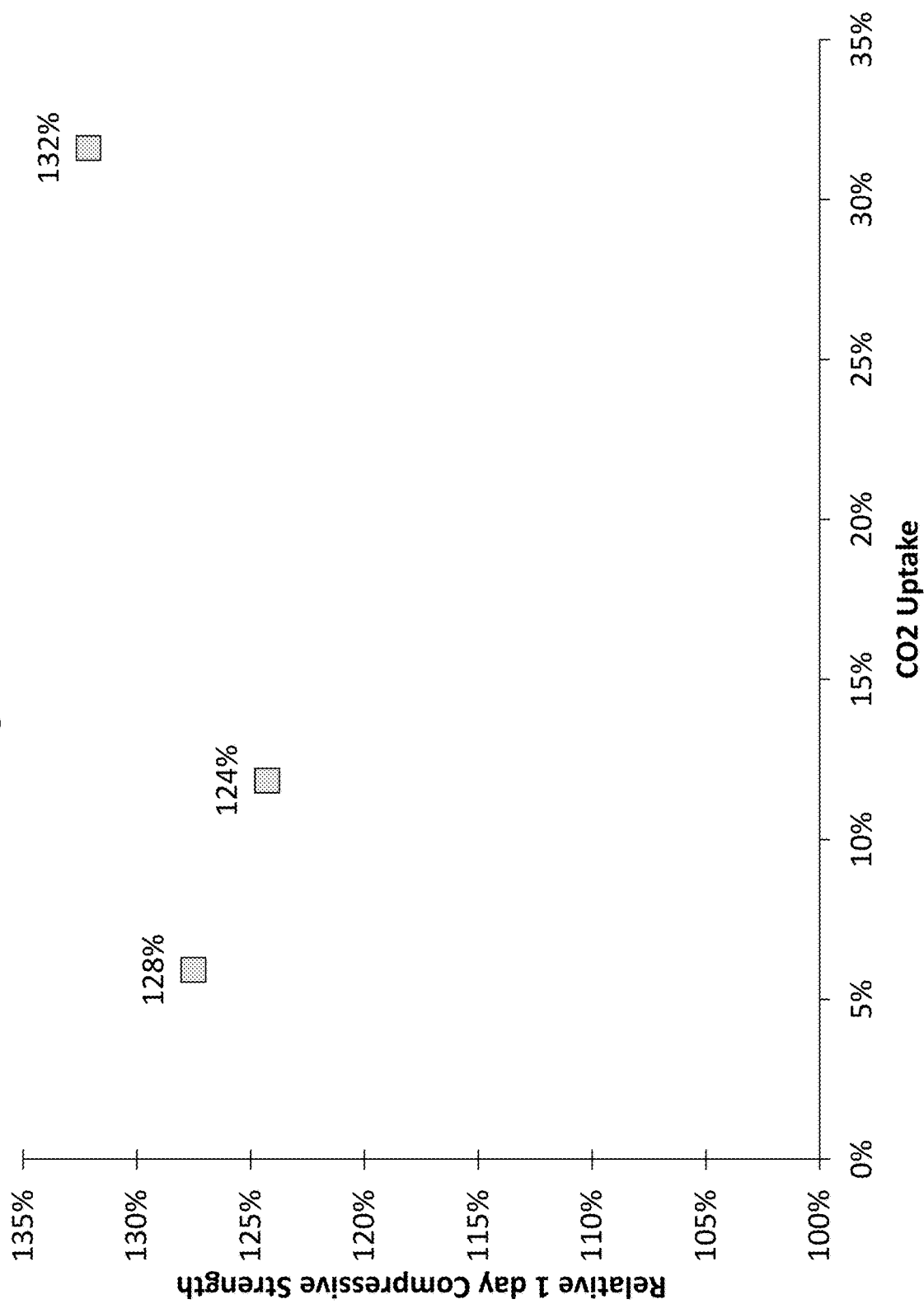
FIG. 24 shows one-day strength of mortar cubes made with wash water treated with carbon dioxide for various times and aged 7 days.
Figure 25:
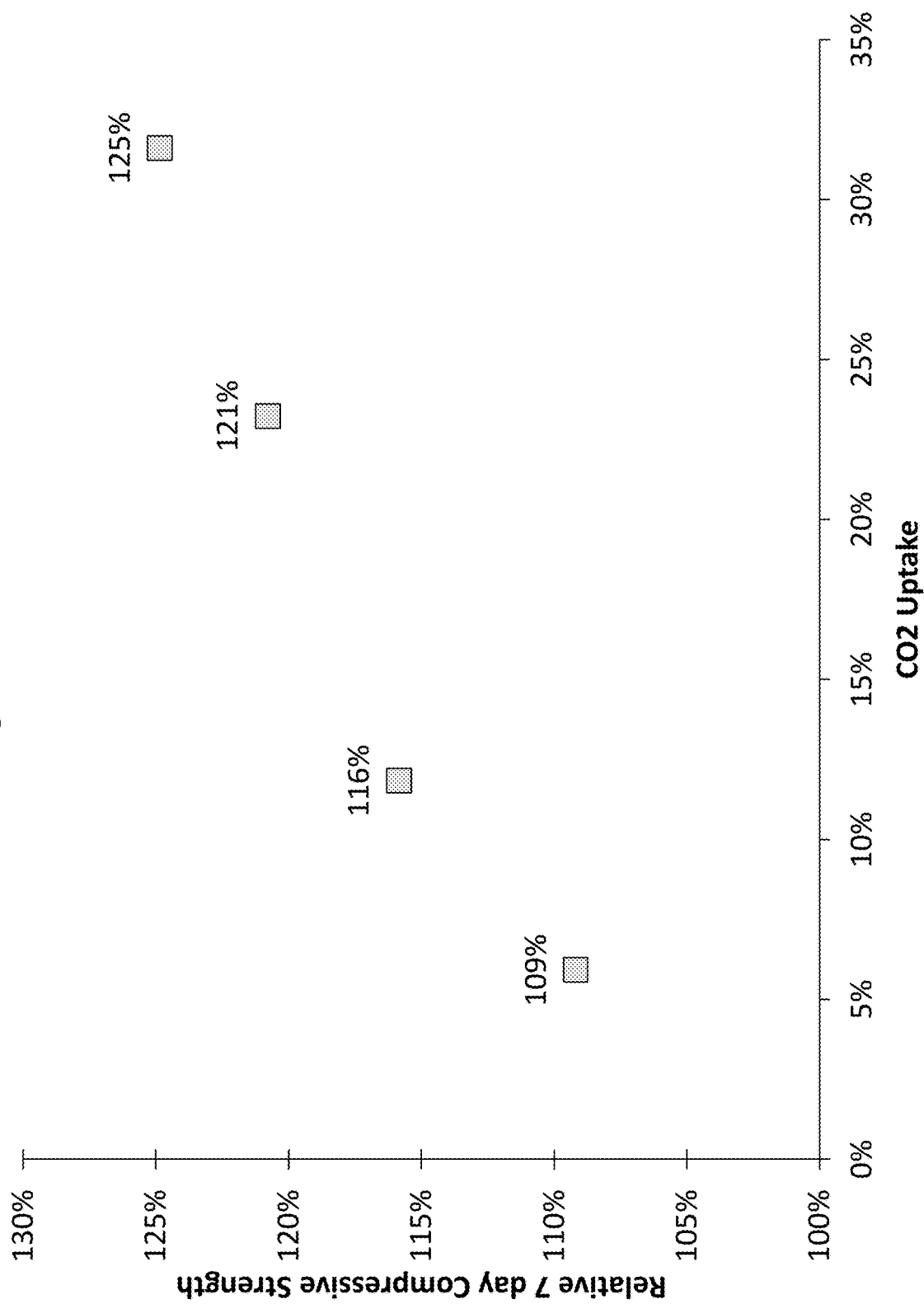
FIG. 25 shows 7-day strength of mortar cubes made with wash water treated with carbon dioxide for various times and aged 7 days.
Figure 26:
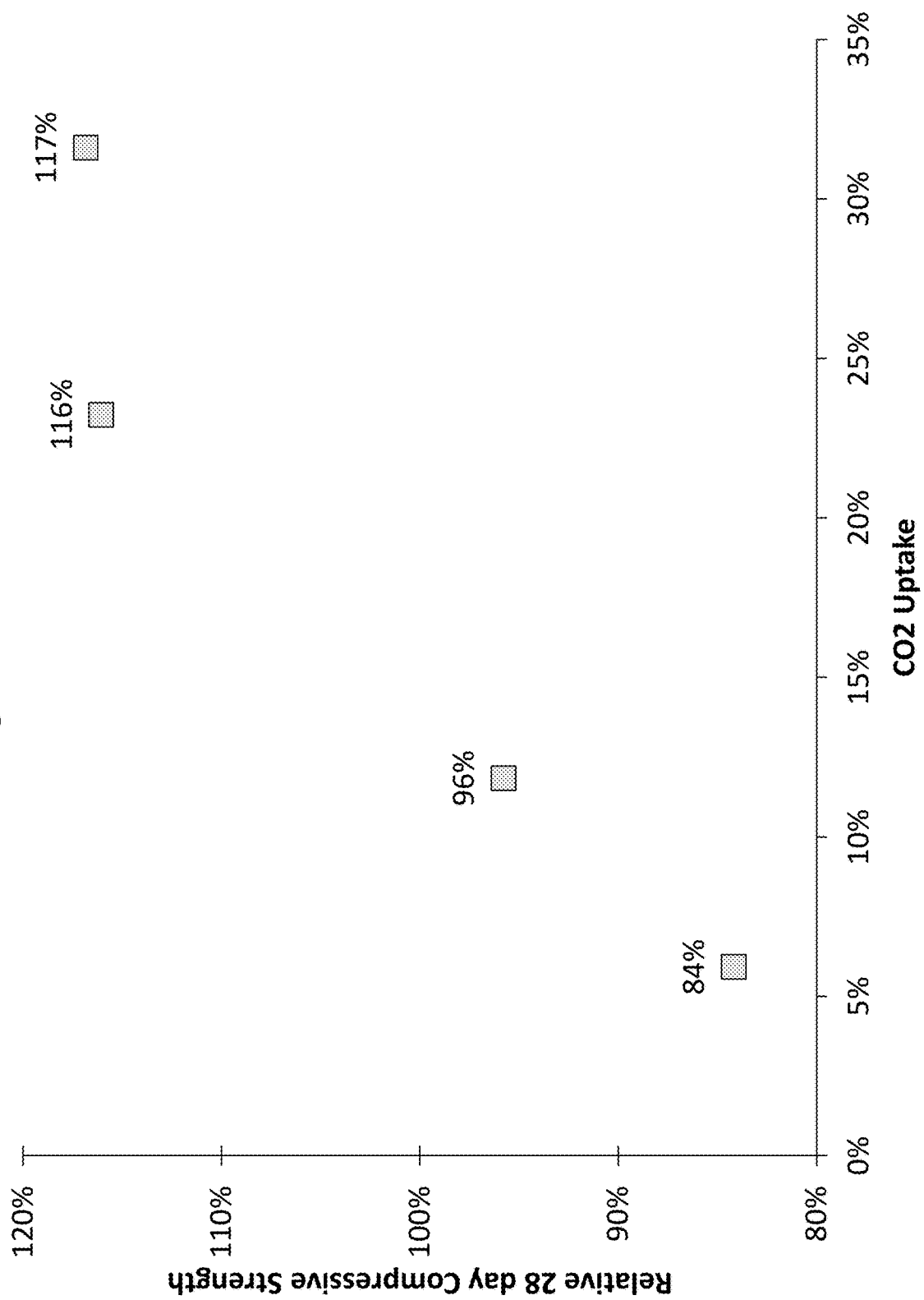
FIG. 26 shows 28-day strength of mortar cubes made with wash water treated with carbon dioxide for various times and aged 7 days.

As expected, CO2 uptake of wash water solids increased with treatment time (FIG. 19), with a corresponding decrease in the pH of the wash water (FIG. 20). One-day (FIG. 21), 7-day (FIG. 22), and 28-day strength (FIG. 23) were all increased in mortar cubes made with wash water aged 1 day that had been treated with carbon dioxide compared to cubes made with untreated wash water. One-day (FIG. 24) and 7-day strength (FIG. 25) were increased in mortar cubes made with wash water aged 7 days that had been treated with carbon dioxide compared to cubes made with untreated wash water; 28-day strength decreased for cubes made with wash water with lower carbon dioxide uptake but increased for those made with wash water with higher carbon dioxide uptake (FIG. 26).

Example 5

Cemex Demopolis cement was used as wash water solids (100% cement), added to potable water until specific gravity 1.10, then aged 1 or 7 days, with and without CO2 treatment. Control mortar cubes were produced using potable water, reference cubes were produced using potable water and additional cement equivalent to the solids contained within the wash water.

Figure 27:
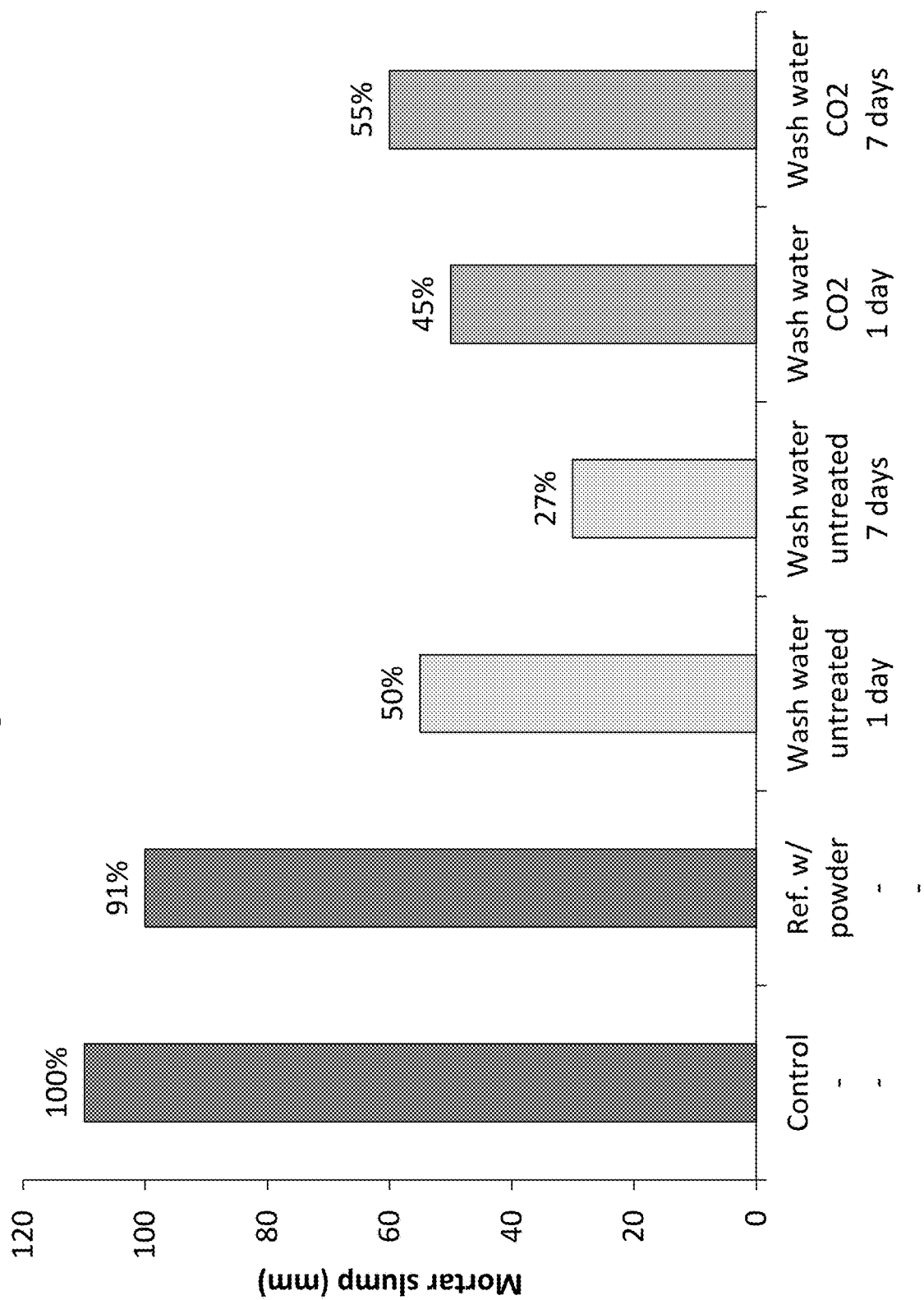
FIG. 27 shows slump in mortar cubes made with wash waters treated or untreated with carbon dioxide.
Figure 28:
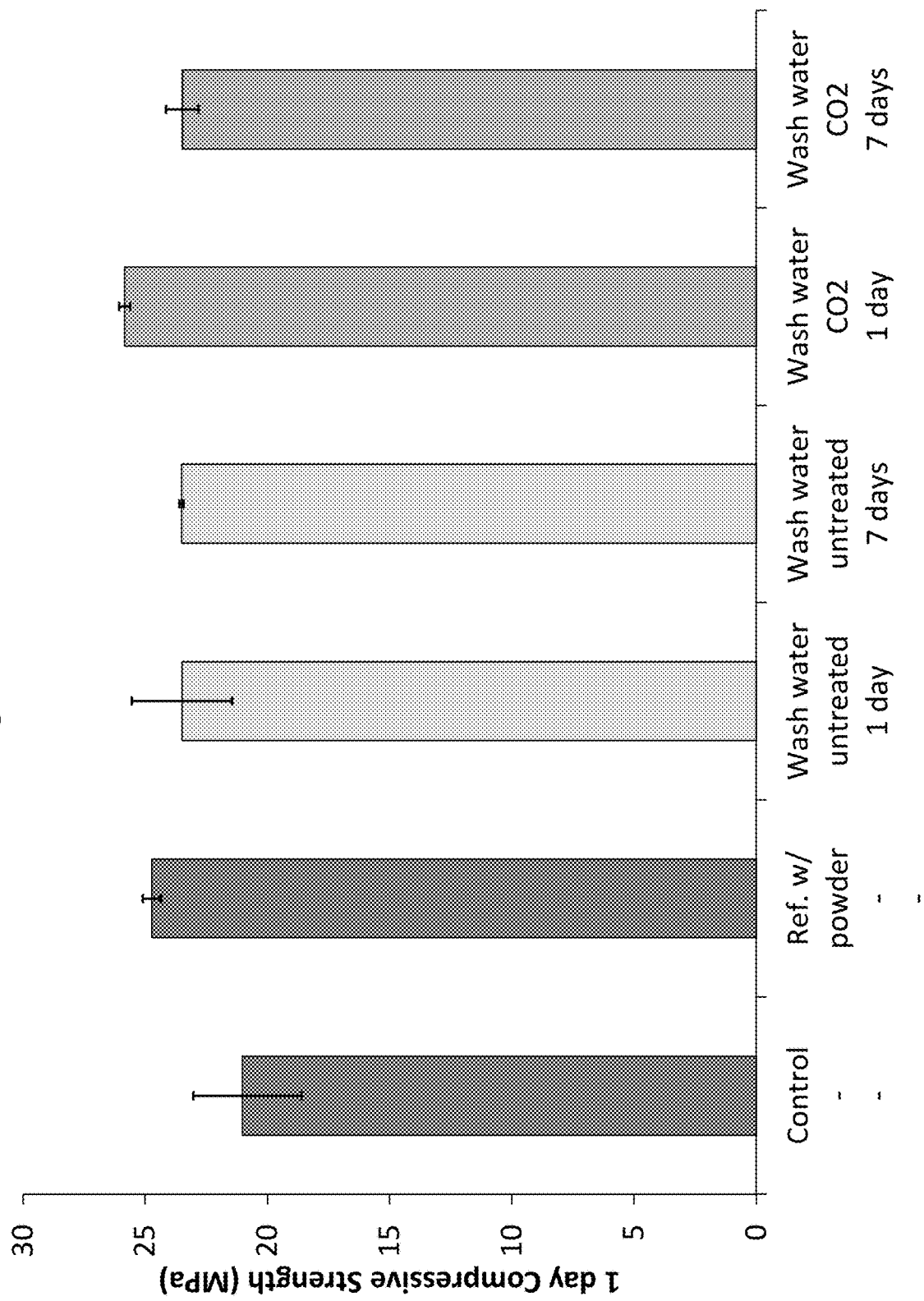
FIG. 28 shows 1-day compressive in mortar cubes made with wash waters treated or untreated with carbon dioxide.
Figure 29:
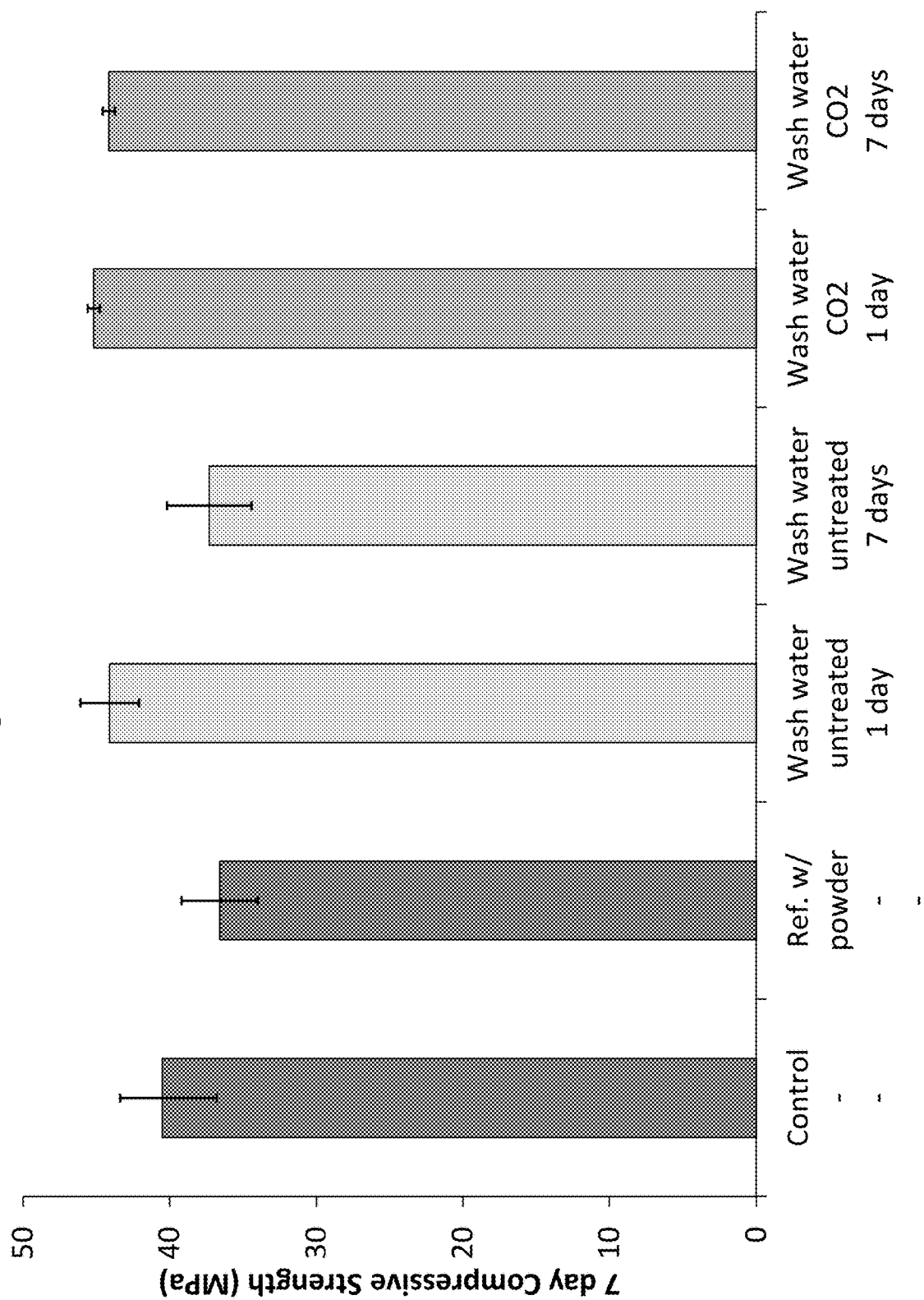
FIG. 29 shows 7-day compressive in mortar cubes made with wash waters treated or untreated with carbon dioxide.
Figure 30:
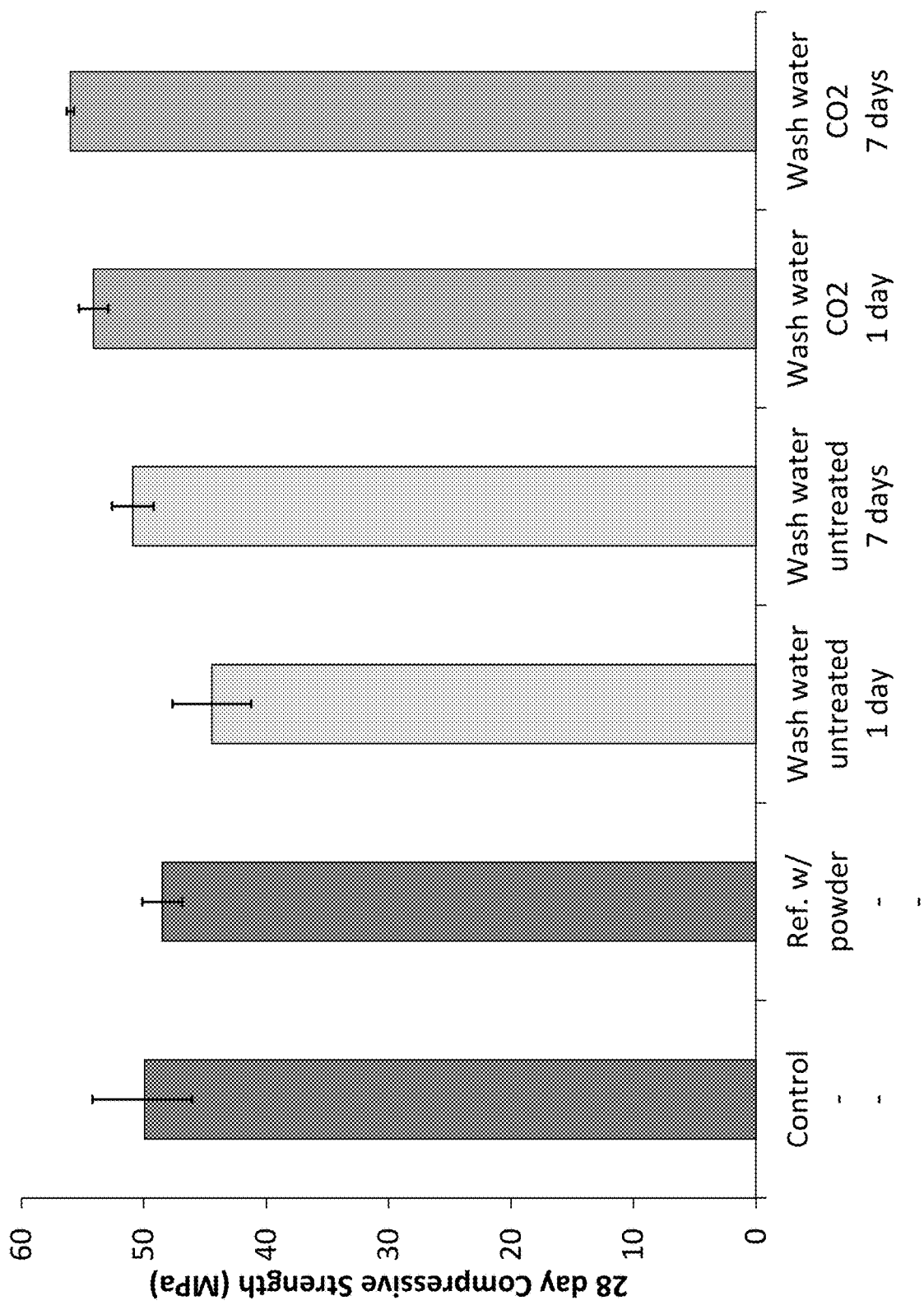
FIG. 30 shows 28-day compressive in mortar cubes made with wash waters treated or untreated with carbon dioxide.
Figure 31:
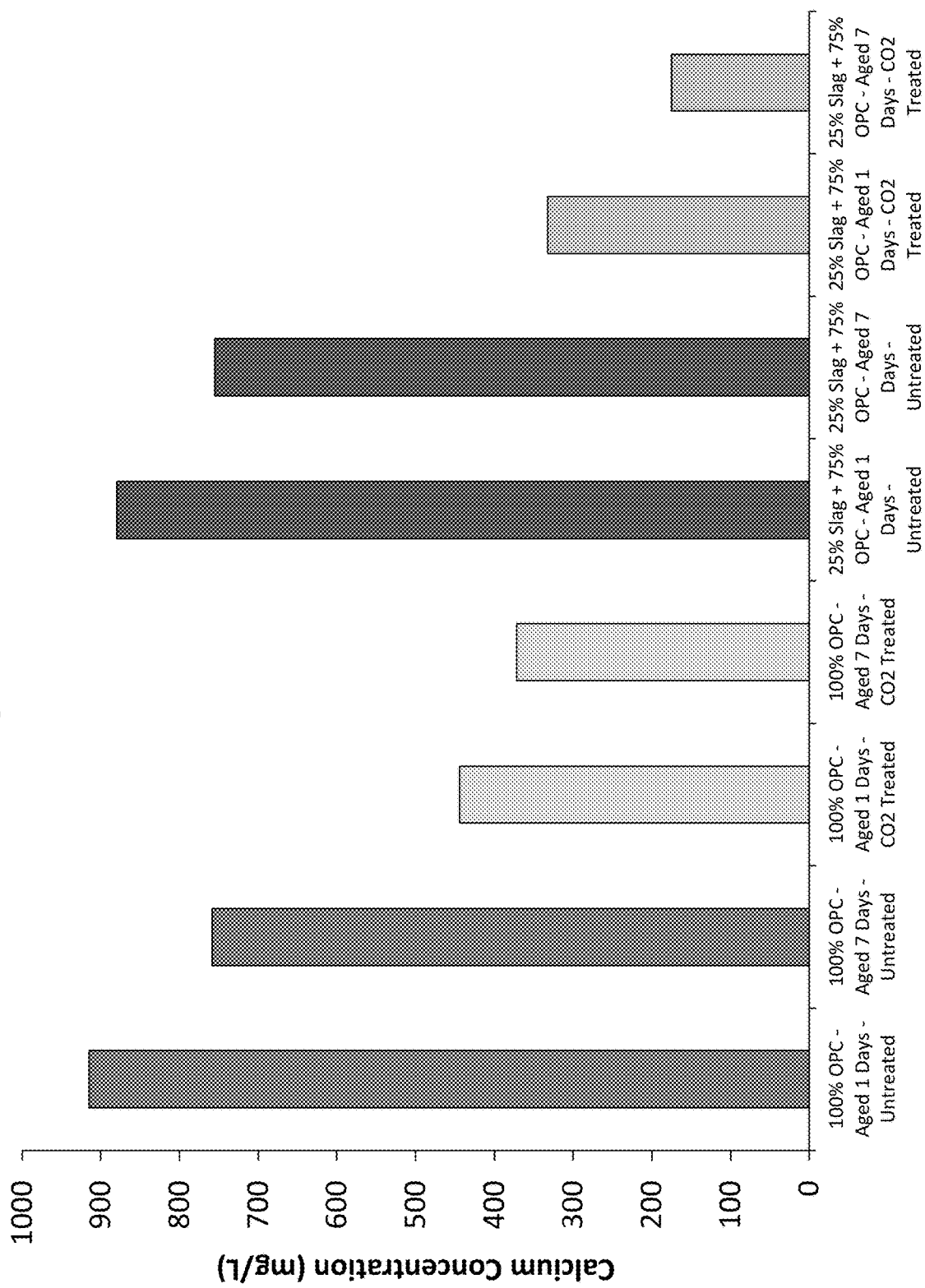
FIG. 31 shows calcium ICP-OES analysis of filtrate of wash waters treated or untreated with carbon dioxide
Figure 32:
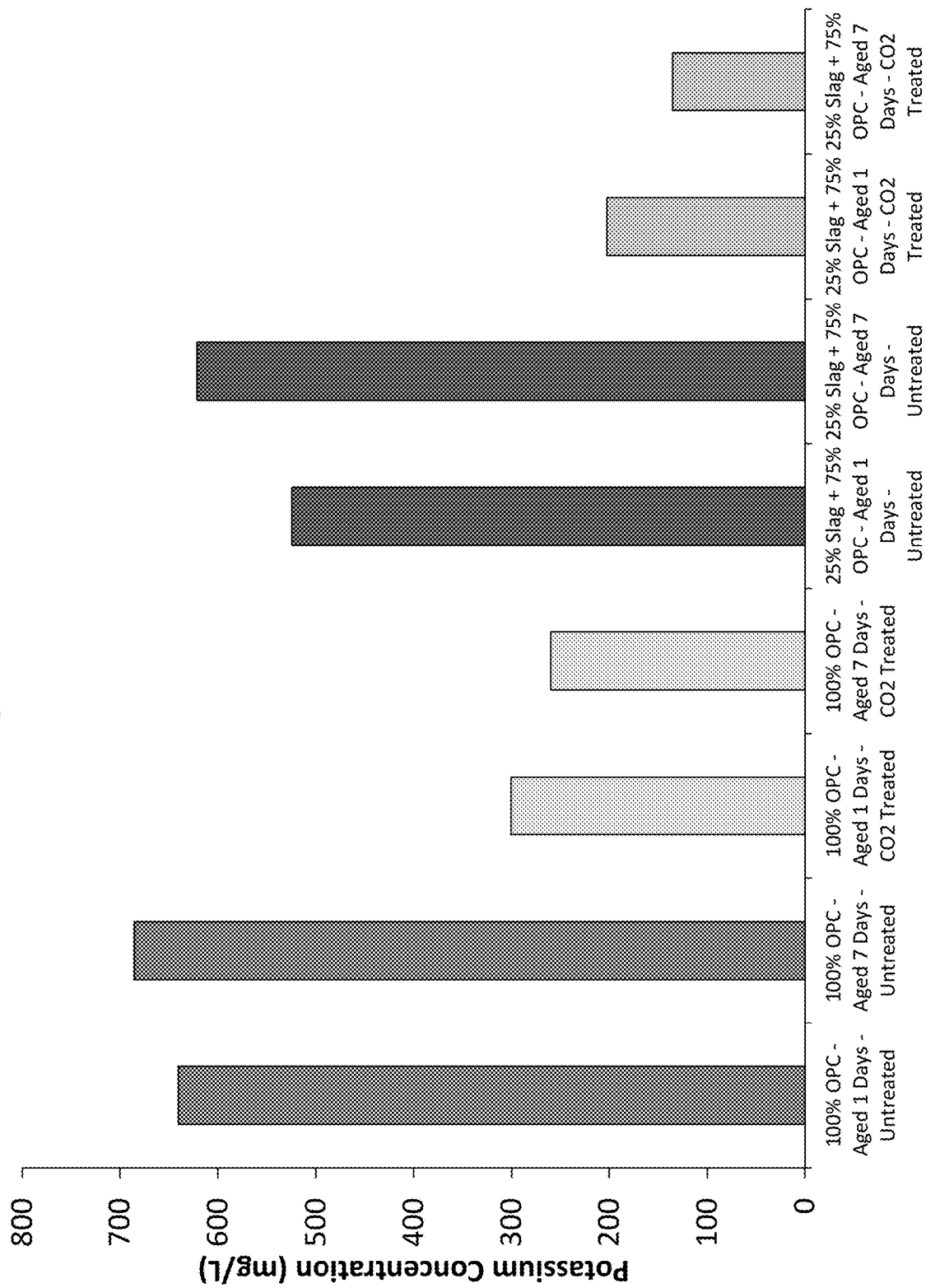
FIG. 32 shows potassium ICP-OES analysis of filtrate of wash waters treated or untreated with carbon dioxide
Figure 33:
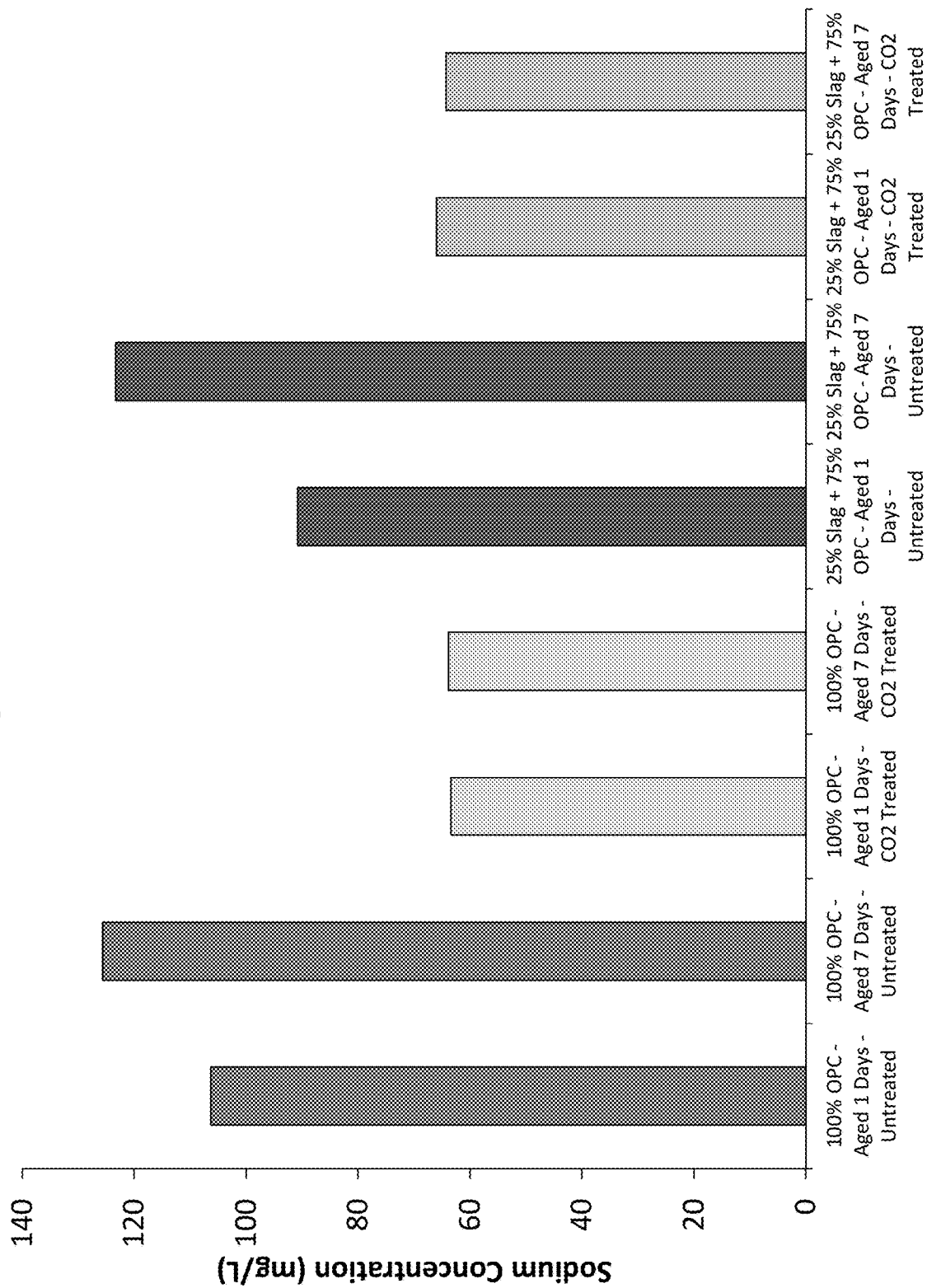
FIG. 33 shows sodium ICP-OES analysis of filtrate of wash waters treated or untreated with carbon dioxide
Figure 34:
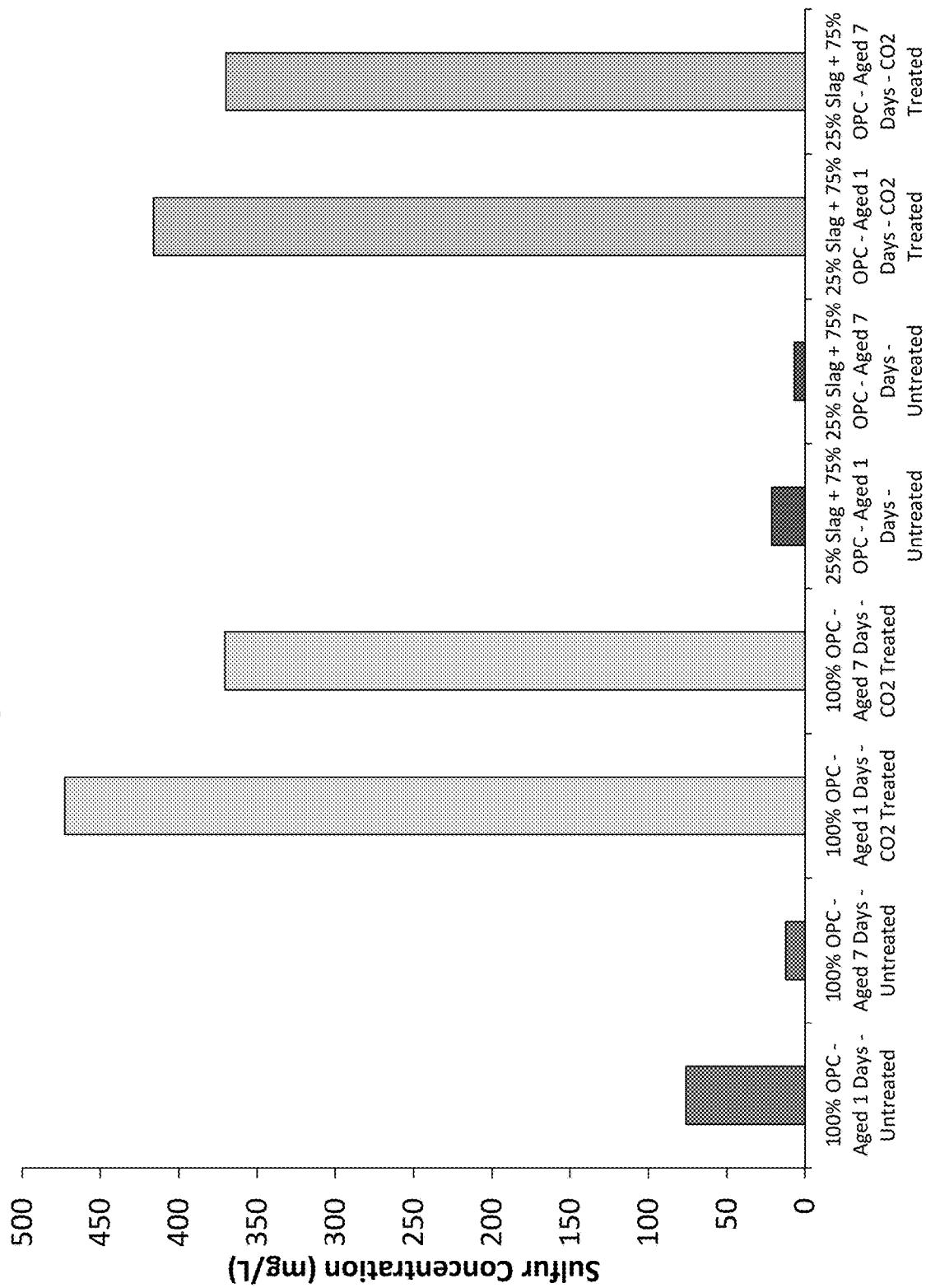
FIG. 34 shows strontium ICP-OES analysis of filtrate of wash waters treated or untreated with carbon dioxide

FIG. 27 shows that adding more cement to the control reduced the workability (slump). If that same amount of cement was present in one day old wash water the workability was reduced by about 50%. If the wash water was untreated and used at 7 days aging then the workability decreased further, but if treated with CO2 the performance at 7 days aging was no worse than at 1 day. FIGS. 28-30 show 1-, 7-, and 28-day compressive strengths for mortar cubes made with the wash waters. In sum, in 5 of 6 comparisons (two of the one day wash water samples and all three of the 7 day wash water samples) mortar made with the wash water treated with CO2 was stronger than a mortar made with an equivalent amount of extra cement. Samples made with CO2 treated wash water were equivalent or better strength than those with the untreated wash water at any sample age and any wash water age.

Example 6

Lab wash water samples were produced through additions of neat cement and slag into potable water. After aging for 1 or 7 days the solids and liquids were separated via suction filtration for further analysis. Solids were rinsed with isopropyl alcohol to remove any residual water and allowed to dry. Dried solids were submitted for analysis via X-ray diffraction (XRD), nuclear magnetic resonance (NMR) and scanning electron microscopy (SEM). Filtrate was passed through a 0.20 μm filter and submitted for chemical analysis via ICP-OES.

ICP-OES

Figure 35:
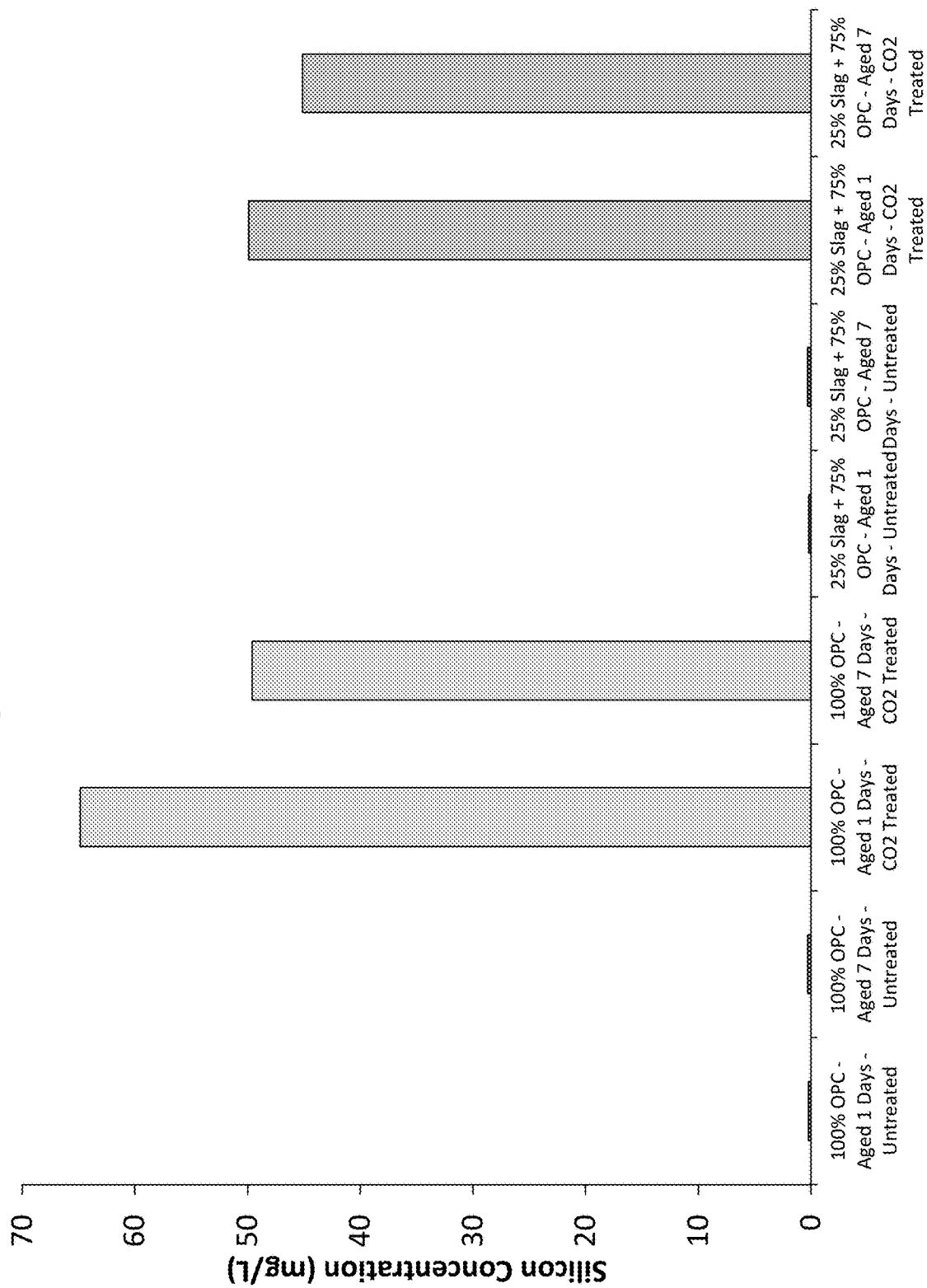
FIG. 35 shows sulfur ICP-OES analysis of filtrate of wash waters treated or untreated with carbon dioxide
Figure 36:
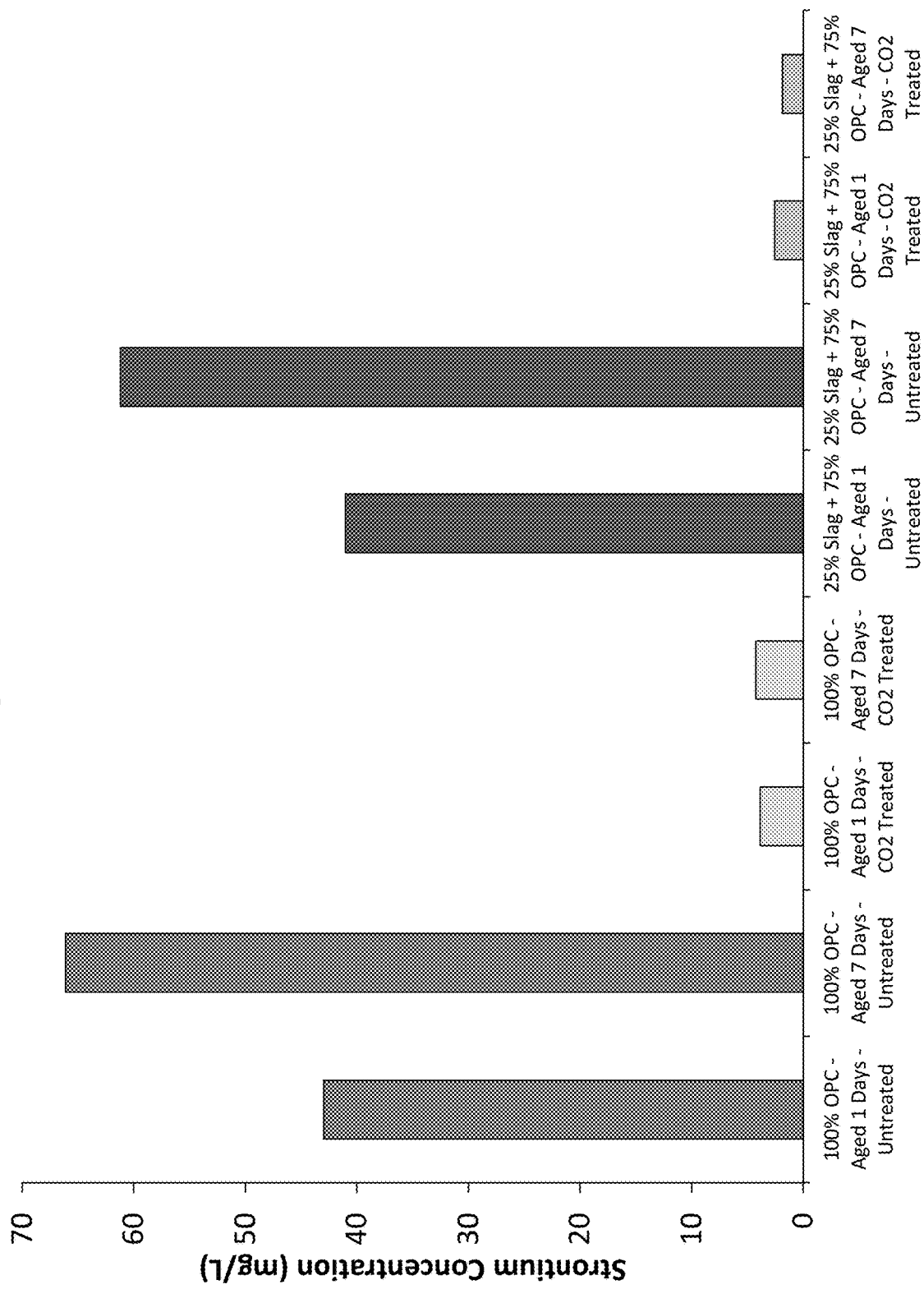
FIG. 36 shows silicon ICP-OES analysis of filtrate of wash waters treated or untreated with carbon dioxide
Figure 37:
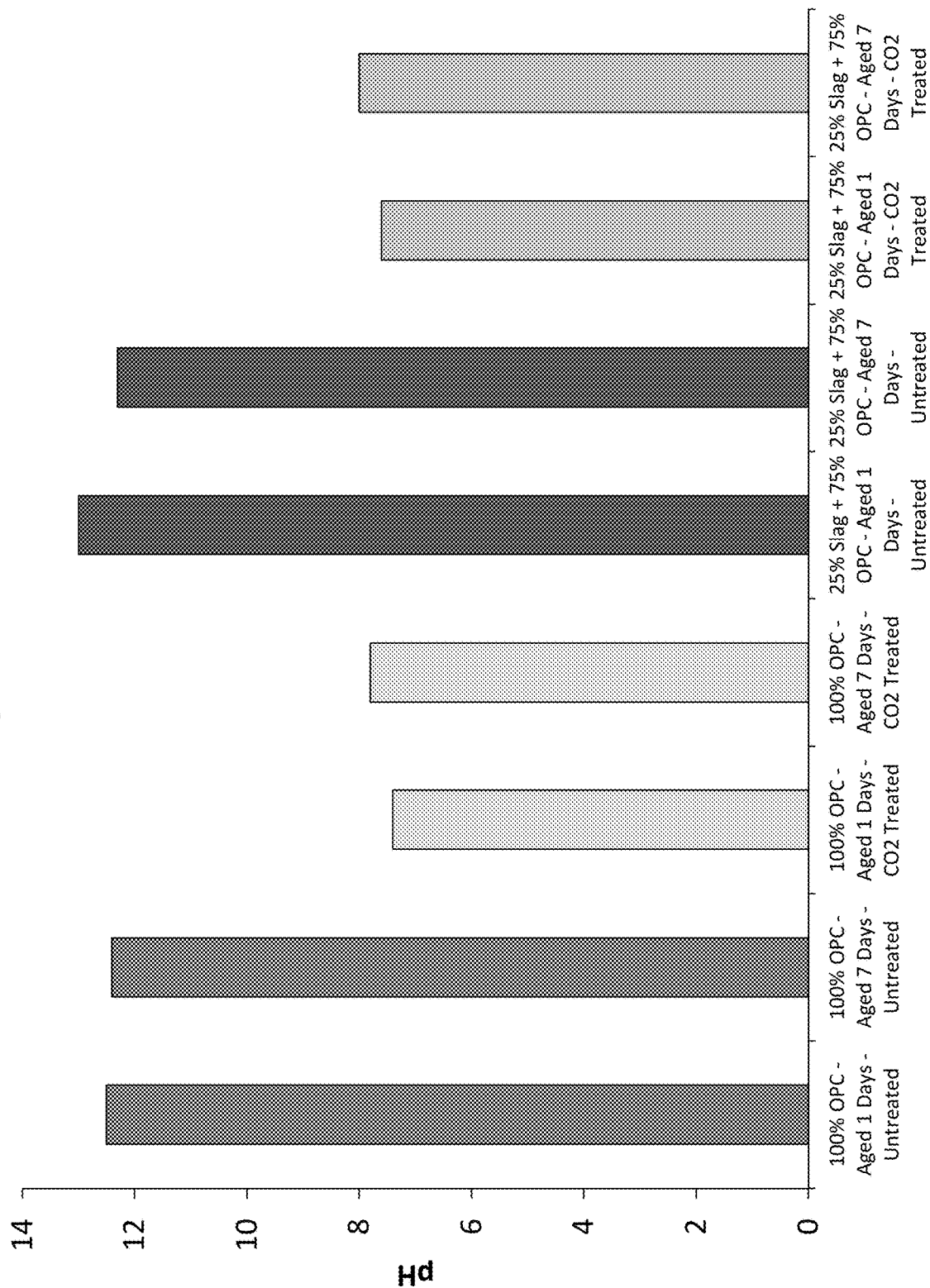
FIG. 37 shows CO2 treatment decreased pH of filtrate of wash waters.

Analysis of filtrate passing 0.20 μm filter shows distinct changes in ions concentrations depending on the water treatment. The following ions were found to be present in lower concentrations following $CO_2$ treatment of the lab-produced wash water: Calcium, Potassium, Sodium, Strontium (FIGS. 31-34). The following ions were found to be present in greater concentrations following $CO_2$ treatment of the lab-produced wash water: Sulfur, Silicon (FIGS. 35 and 36). The $CO_2$ treatment was found to decrease the pH of wash water filtrate (FIG. 37). Data are shown in tabular form in FIGS. 38 and 39.

SEM.

Figure 40:
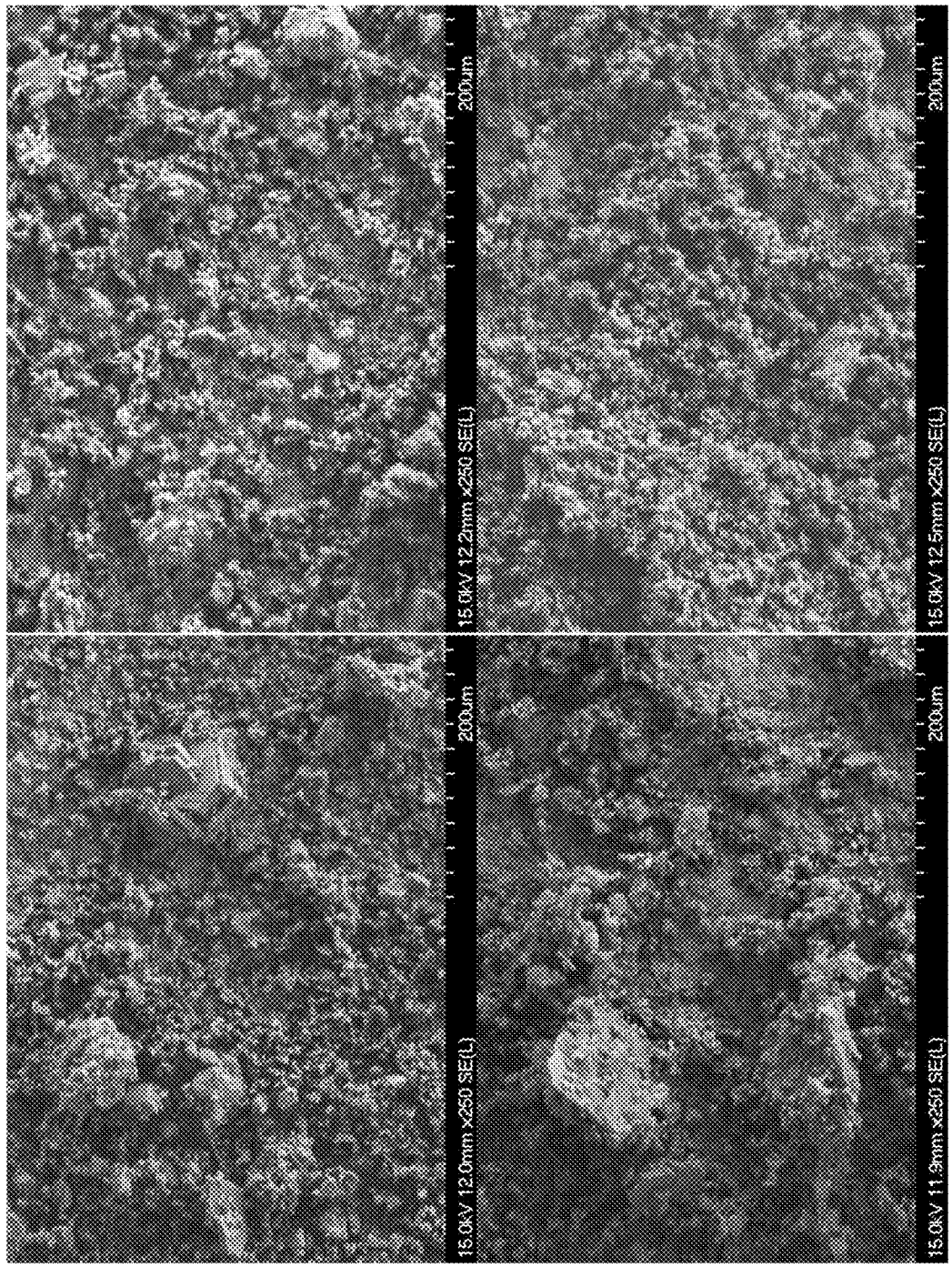
FIG. 40 shows scanning electron micrographs (SEM) for particles in wash waters (100% OPC) treated or untreated with carbon dioxide, 250× magnification.
Figure 41:
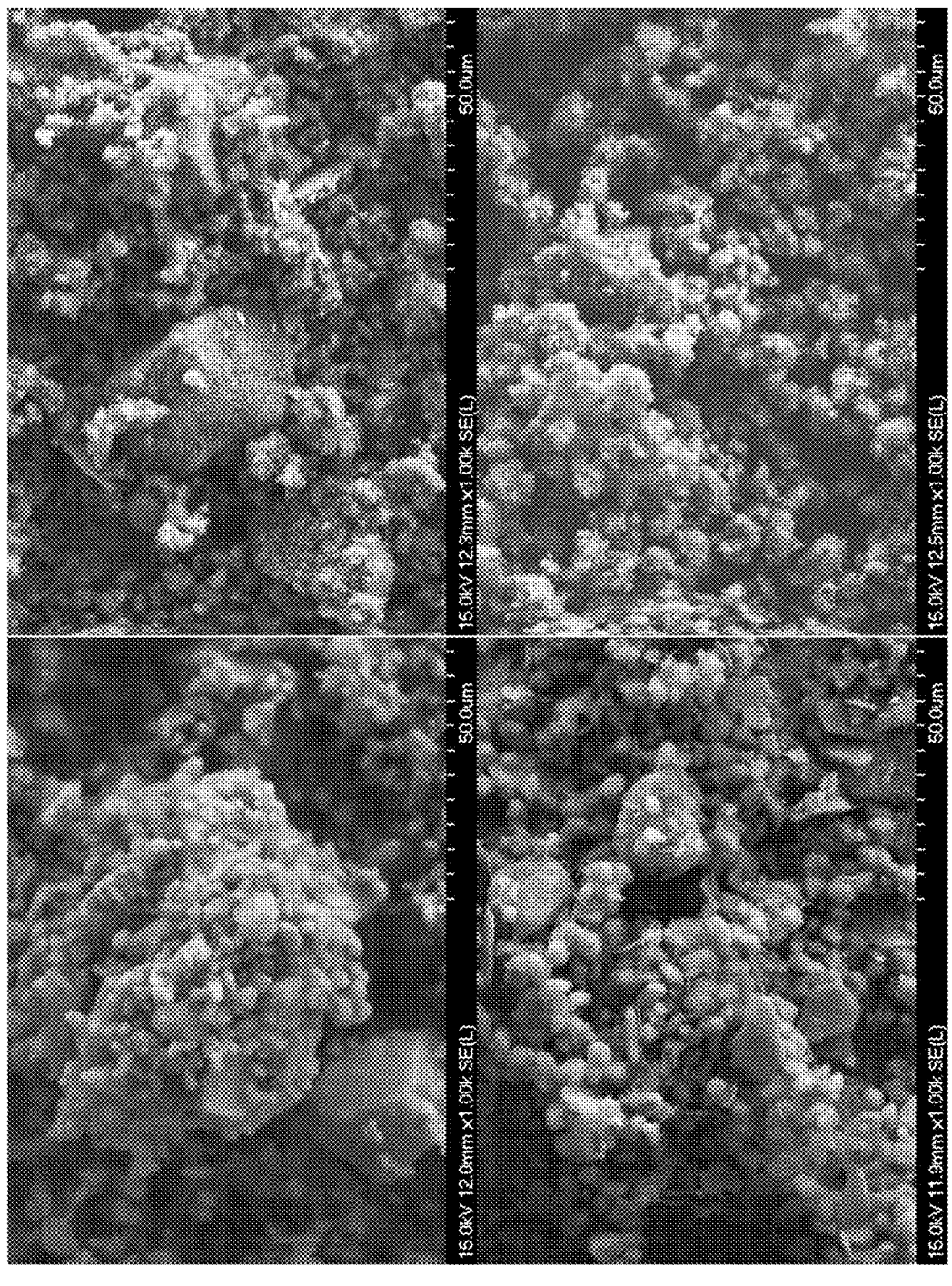
FIG. 41 shows scanning electron micrographs (SEM) for particles in wash waters (100% OPC) treated or untreated with carbon dioxide, 1000× magnification.
Figure 42:
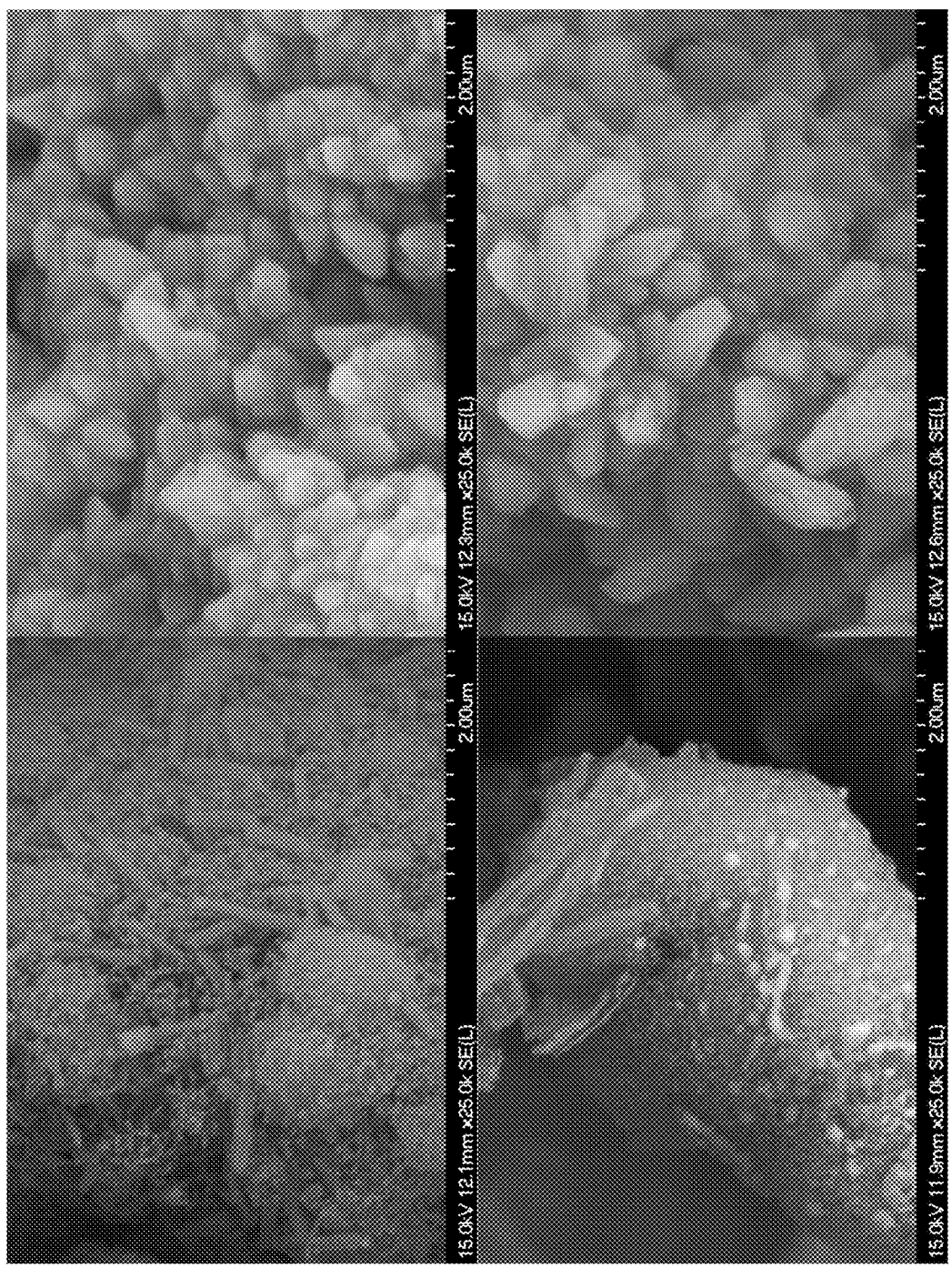
FIG. 42 shows scanning electron micrographs (SEM) for particles in wash waters (100% OPC) treated or untreated with carbon dioxide, 25,000× magnification.

For 100% OPC wash water, at 250 magnification (FIG. 40): Hexagonal particles in untreated cases characteristic of portlandite. At 1000 magnification (FIG. 41): Untreated WW: Observe needle morphology at 1 days and presence of at 7 days suggests ongoing precipitation and growth of hydration products. At 25,000 magnification (FIG. 42): Untreated WW: mixture of fuzzy and needle-like hydration products characteristic of normal cement hydration. Features mature and become larger by 7-days, hence less detail at 25 k magnification in 7-day versus 1-day. CO2 Treated WW: Abundance of small box-like products characteristic of calcite observable at 25 k mag. Microstructure of CO2 treated case appears generally the same between 1 and 7 days of aging.

Figure 43:
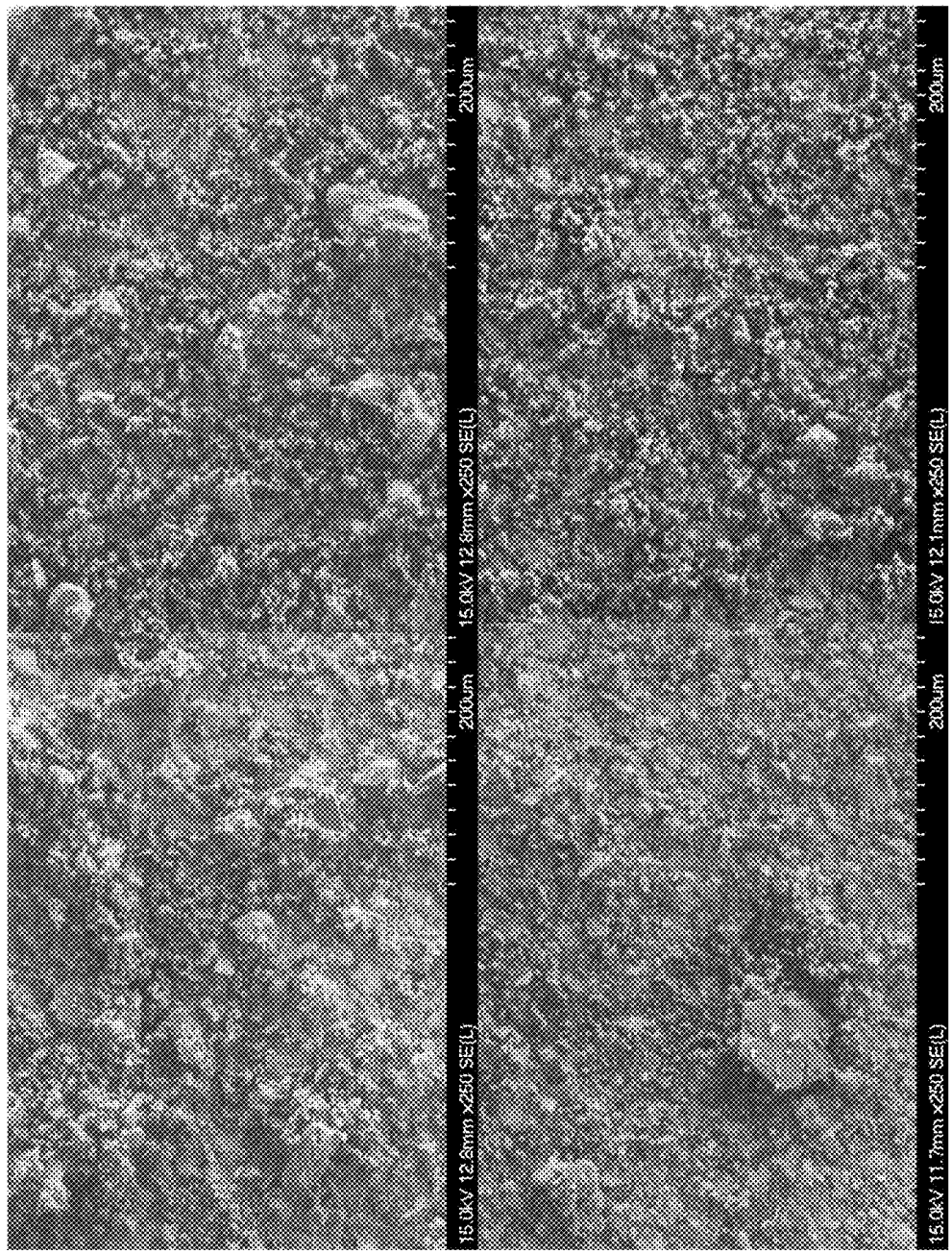
FIG. 43 shows scanning electron micrographs (SEM) for particles in wash waters (75% OPC/25% slag) treated or untreated with carbon dioxide, 250× magnification.
Figure 44:
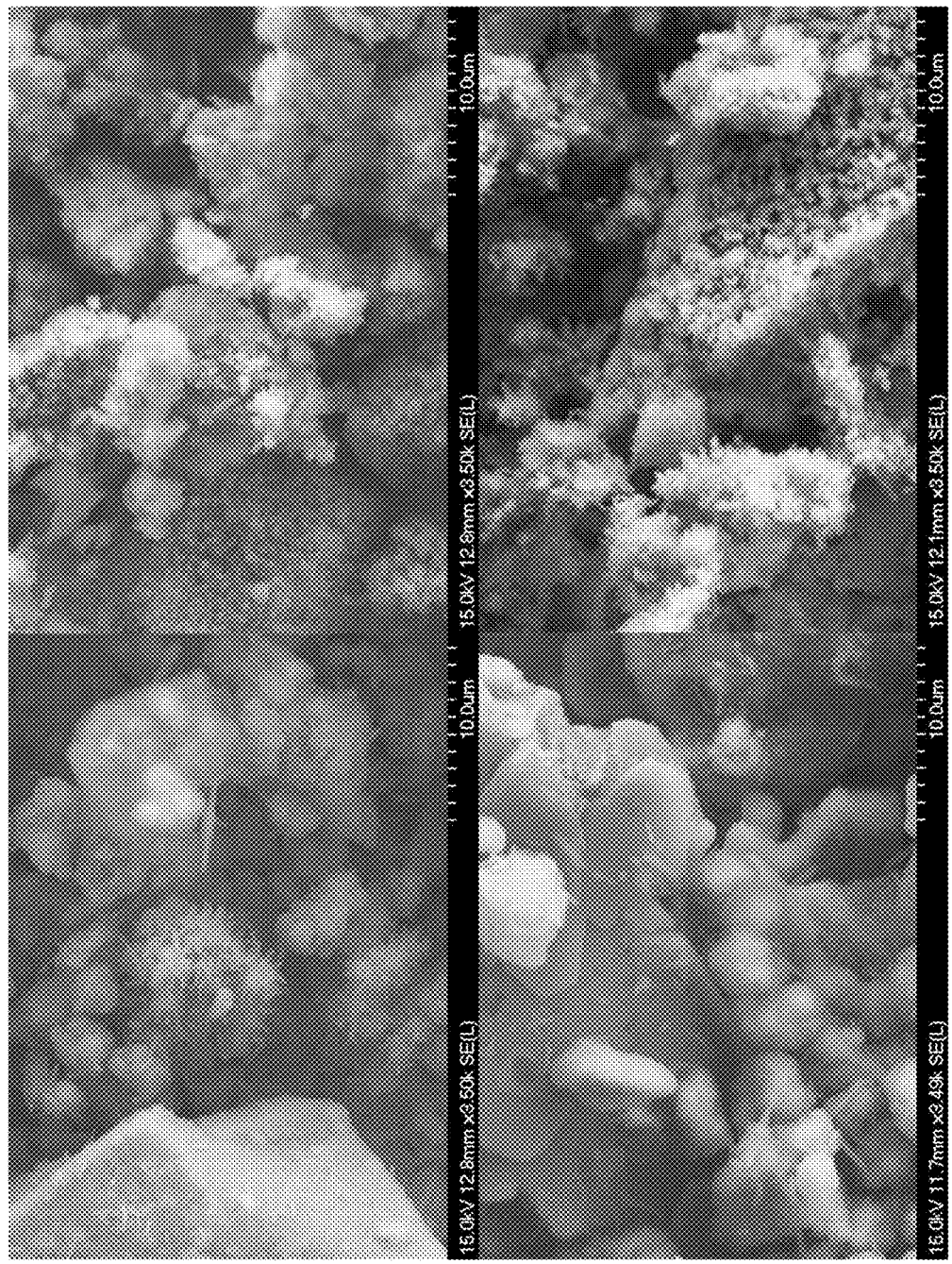
FIG. 44 shows scanning electron micrographs (SEM) for particles in wash waters (75% OPC/25% slag) treated or untreated with carbon dioxide, 3500× magnification.
Figure 45:
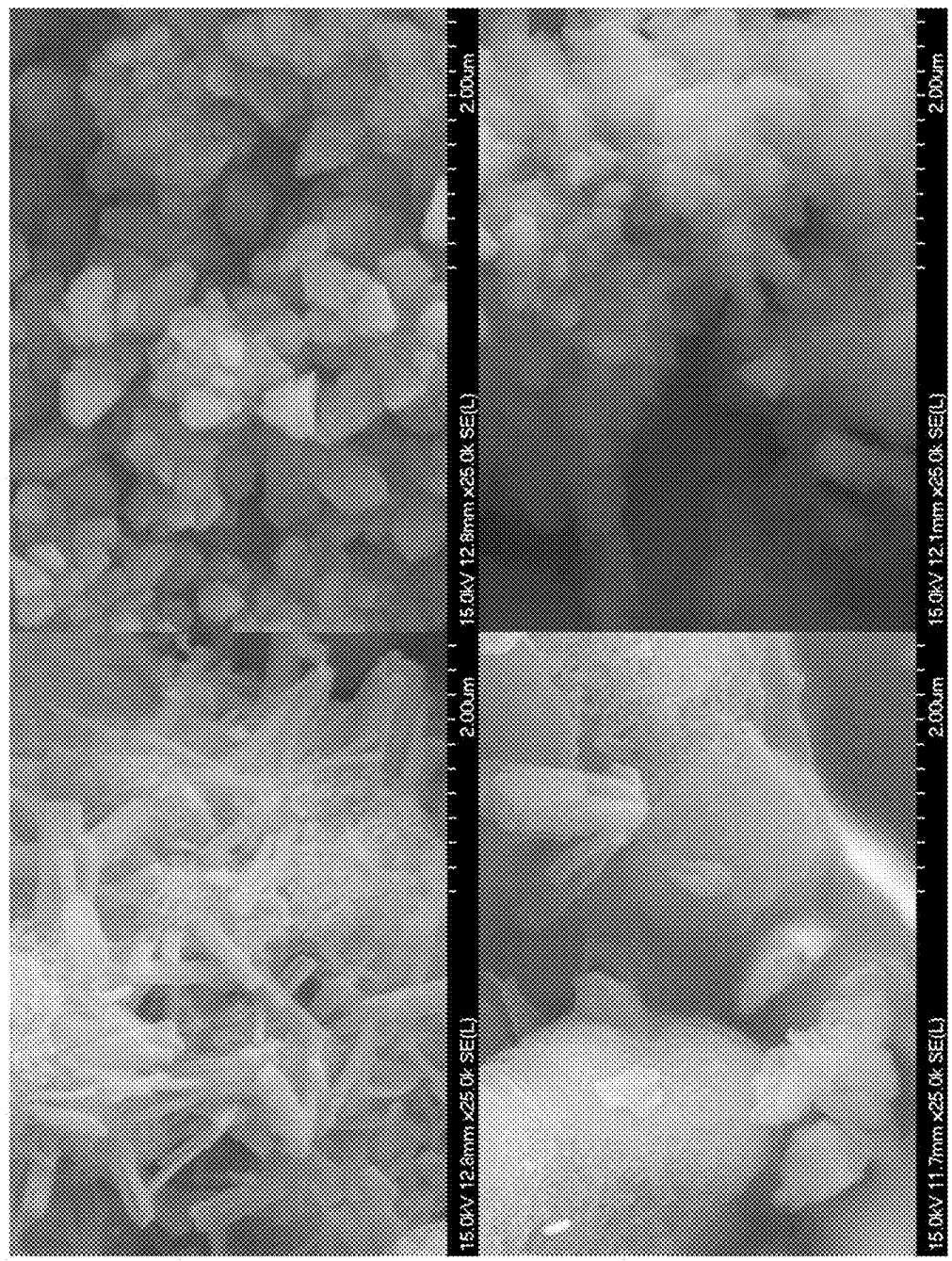
FIG. 45 shows scanning electron micrographs (SEM) for particles in wash waters (75% OPC/25% slag) treated or untreated with carbon dioxide, 25,000× magnification

For 75% OPC+25% Slag wash water: At 250 magnification (FIG. 43): Hexagonal particles in untreated cases characteristic of portlandite. Large, faceted, unreacted particles characteristic of slag At 3500 magnification (FIG. 44): Untreated WW: Observe of fuzzy/needle morphology at 1 days which becomes more smooth by 7 days. Additional smaller plat-like morphologies observable at 7 days. Suggests ongoing maturation of the reaction products. At 25,000 magnification (FIG. 45): Untreated WW: mixture of fuzzy and needle-like hydration products characteristic of normal cement hydration. Features mature and become larger by 7-days, hence less detail at 25 k magnification in 7-day versus 1-day. CO2 Treated WW: Abundance of small box-like products characteristic of calcite observable at 25 k mag. Microstructure of CO2 treated case appears generally the same between 1 and 7 days of aging.

Figure 46:
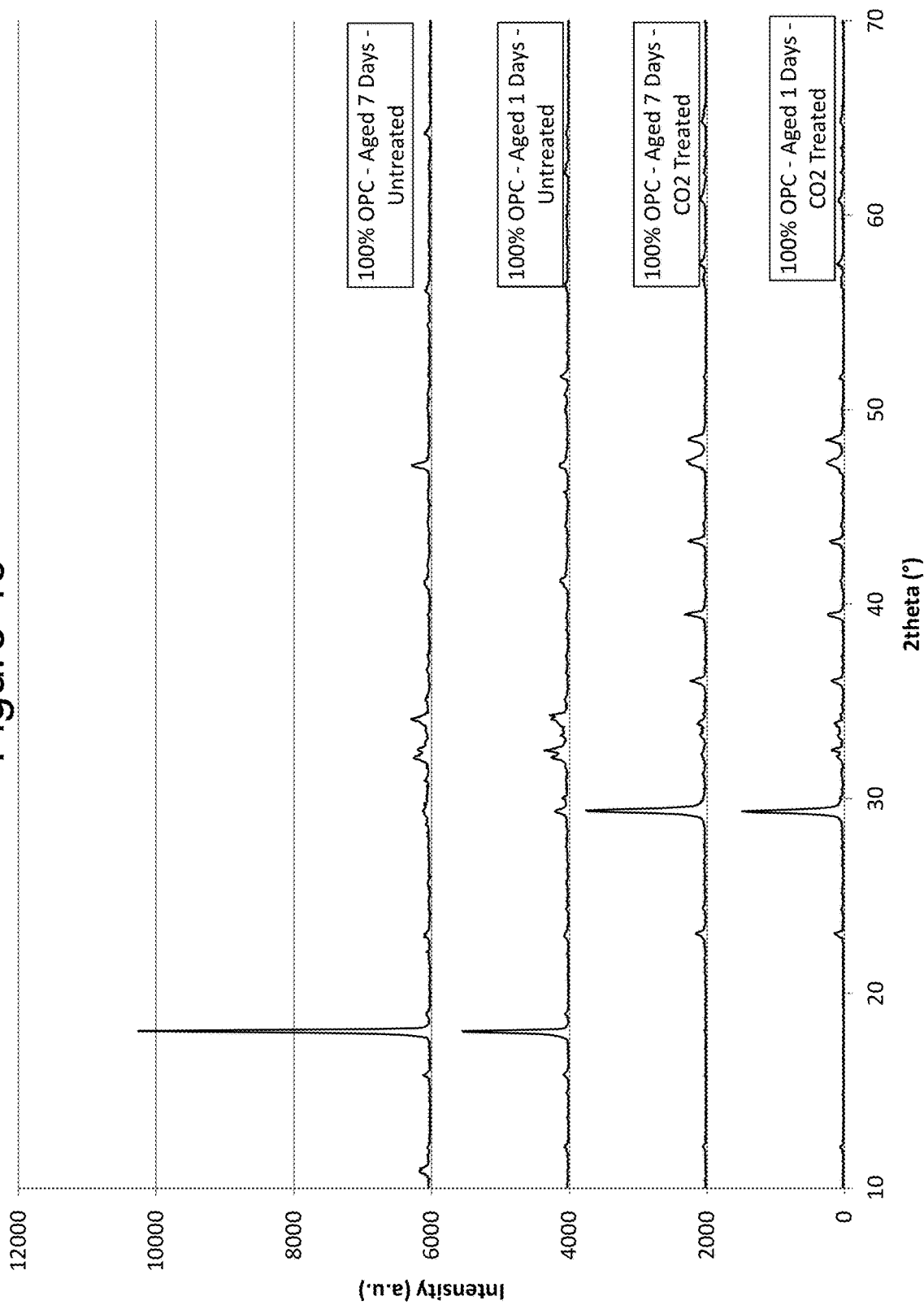
FIG. 46 shows X-ray diffraction (XRD) patterns from wash waters treated or untreated with carbon dioxide.
Figure 47:
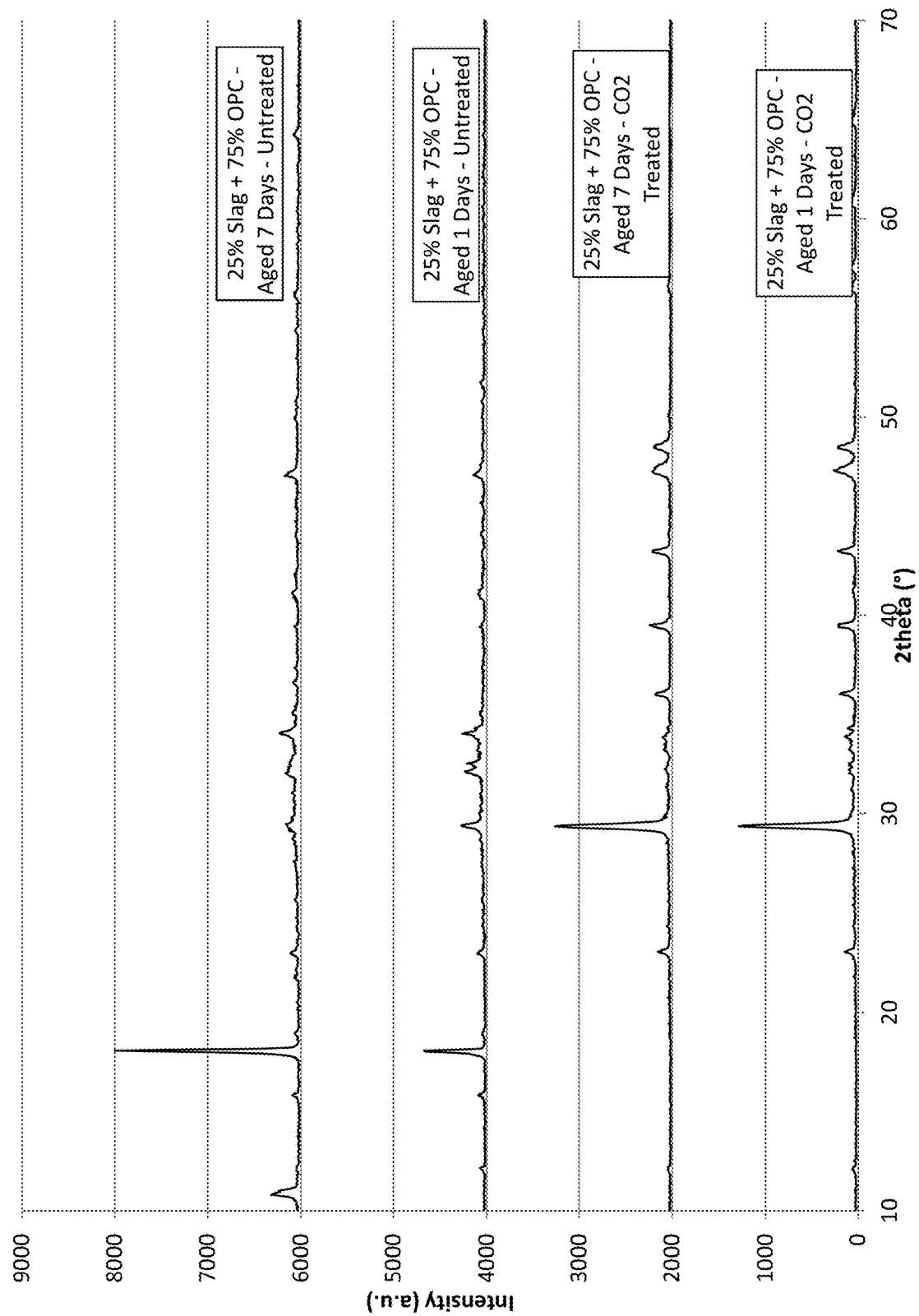
FIG. 47 shows X-ray diffraction (XRD) patterns from wash waters treated or untreated with carbon dioxide.

XRD:

Untreated WW—Large contribution in the XRD pattern from $Ca(OH)_2$ with smaller contributions from various calcium silicates and hydration product. $CO_2$ treated Wash Water—Large contribution in the XRD pattern from $CaCO_3$ with smaller contributions from various calcium silicates and hydration products. No contribution from $Ca(OH)_2$. All $CaCO_3$ is present as calcite, as indicated by large contribution at ~29° All $Ca(OH)_2$ is present as portlandite, as indicated by large contribution at ~18°. See FIGS. 46 and 47.

Figure 48:
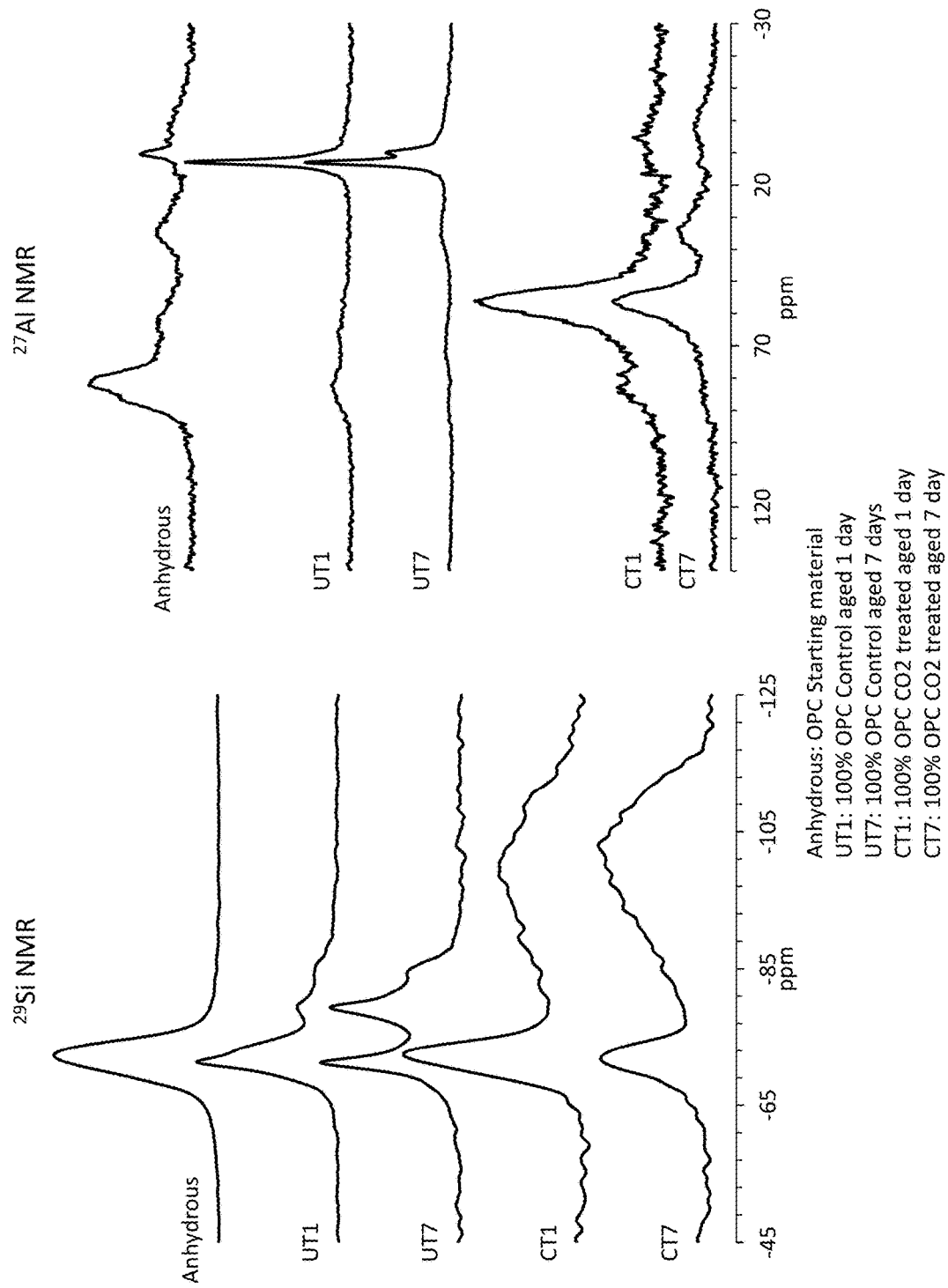
FIG. 48 shows nuclear magnetic resonance (NMR) patterns from wash waters treated or untreated with carbon dioxide.
Figure 49:
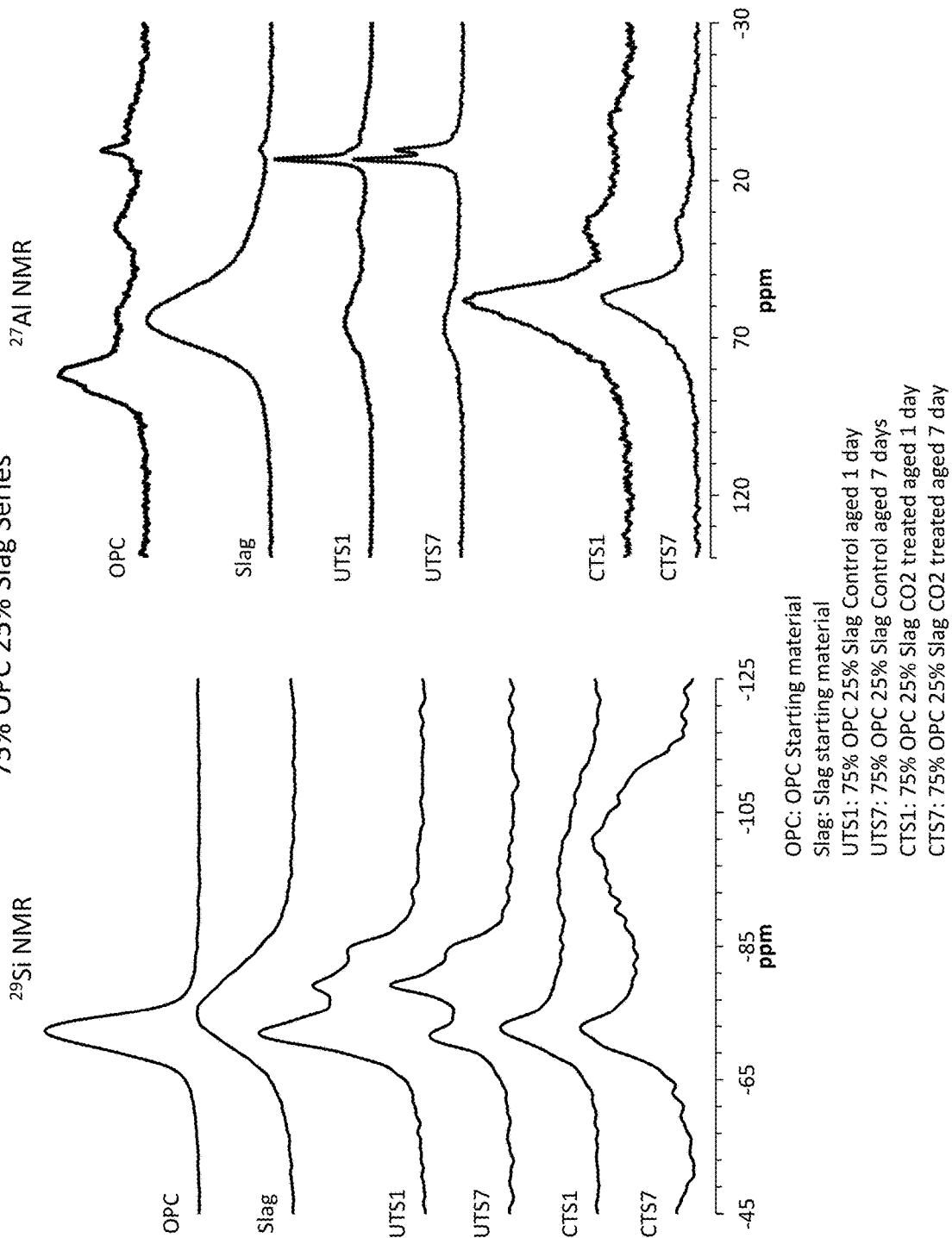
FIG. 49 shows nuclear magnetic resonance (NMR) patterns from wash waters treated or untreated with carbon dioxide.

NMR (FIGS. 48 and 49): Silicon:

Silicon is present in cement and slag. Unreacted cement phases present in all samples, giving peaks around −70 ppm. Unreacted slag phases are present in all samples, giving peaks around −75 ppm. As the silicates react the silicon signal shifts to more negative values due to polymerization. Untreated WW: Silicon environment in untreated WW changes giving more contribution to signal from −75 to −90, increasing with age. This suggests a microstructure that is changing with time. $CO_2$ Treated WW: Silicon environment in $CO_2$ treated WW changes dramatically, giving more contribution to signal from −80 to −120, centered around −100

CO2 treated silicon environment displays less change from 1-7 days as compared to untreated case. This suggests different levels of Si polymerization in the $CO_2$ treated case and less "change" from 1-7 days in the $CO_2$ treated case.

Aluminum:

Aluminum is present in cement and slag. Untreated WW: Al environment in untreated WW produces sharp peak around 10 ppm that changes with sample age. Some signal from unreacted cement Al is visible at 1 day in the 100% OPC case. This suggests a microstructure that is changing with time. $CO_2$ Treated WW: $CO_2$ treatment completely modifies Al environment. $CO_2$ treated Al environment displays less change from 1-7 days as compared to untreated case. This suggests different Al local environment in the $CO_2$ treated case compared to the untreated case. The untreated case has Al in normal hydration products, like ettringite, while the $CO_2$ treatment seems to incorporate Al ions into amorphous C-A-S-H phases. The $CO_2$ treated case demonstrates less "change" in the Al local environment from 1-7 days.

Example 7

Various wash waters that matched the corresponding mortar mix were either untreated or subject to continuous agitation, with and without carbon dioxide treatment, and the performance of mortar cubes made with the wash water, as described elsewhere herein, was measured.

Figure 50:
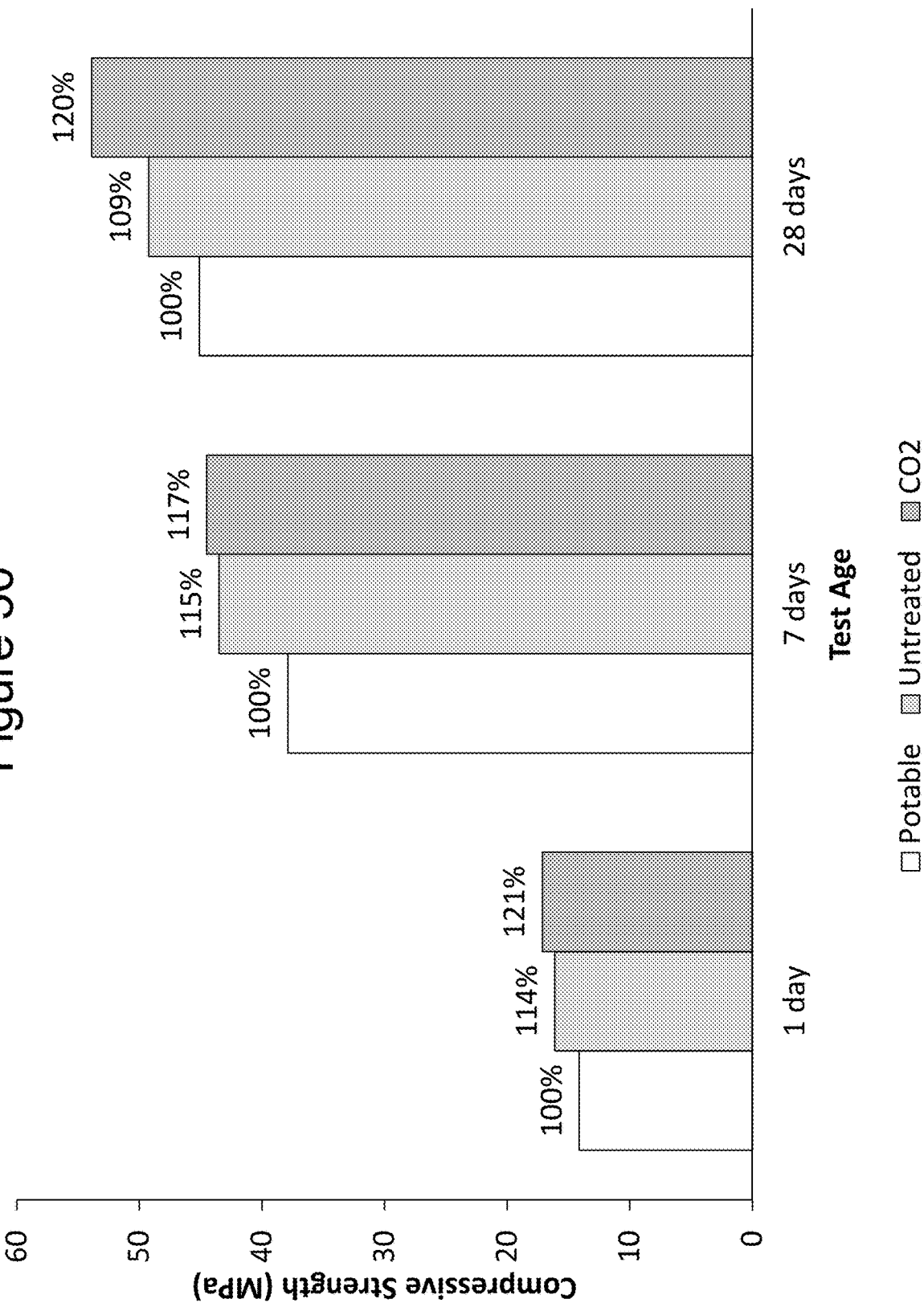
FIG. 50 shows the results for compressive strength of mortar cubes made with one-day old wash water subject to continuous agitation, wash water solids and mortar at 25% slag/75% OPC (Cemex Cemopolis cement).

FIG. 50 shows the results for compressive strength of mortar cubes made with one-day old wash water subject to continuous agitation, wash water solids and mortar at 25% slag/75% OPC (Cemex Cemopolis cement). Wash water increased strength compared to control (potable), and carbon dioxide-treated wash water increased strength even more. Slumps were control: 108, Untreated wash water: 45; CO2-treated wash water, 45 (all slumps in mm).

Figure 51:
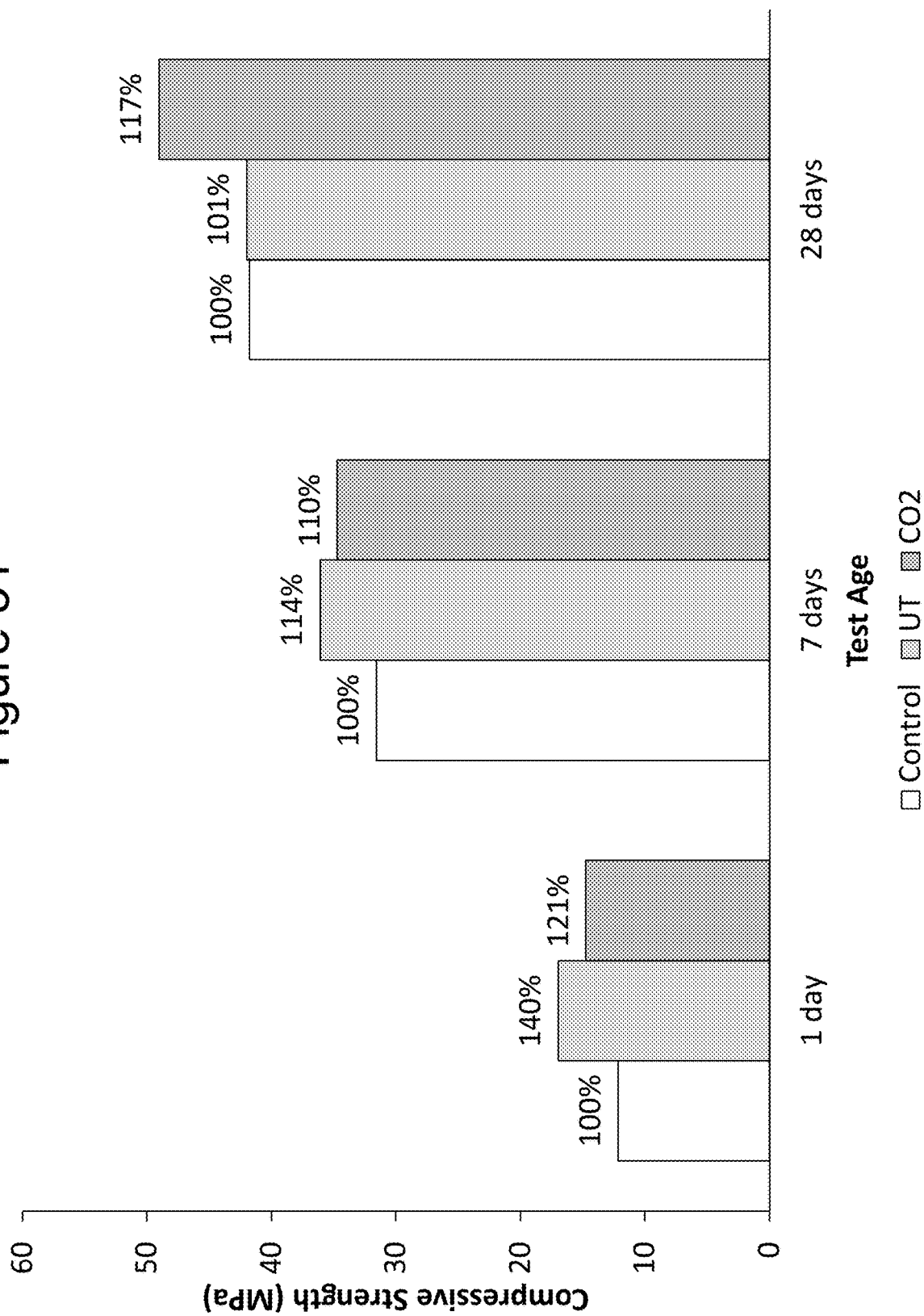
FIG. 51 shows the results for compressive strength of mortar cubes made with one-day old wash water subject to continuous agitation, wash water solids and mortar at 25% class C fly ash/75% OPC (Cemex Cemopolis cement).

FIG. 51 shows the results for compressive strength of mortar cubes made with one-day old wash water subject to continuous agitation, wash water solids and mortar at 25% class C fly ash/75% OPC (Cemex Cemopolis cement). Wash water increased strength, Untreated wash water was better than CO2 treated wash water at 1 and 7 days, but only the CO2 treated water imparted a strength benefit at 28 days. Slumps were control: 125, Untreated wash water: 90; CO2-treated wash water, 90.

Figure 52:
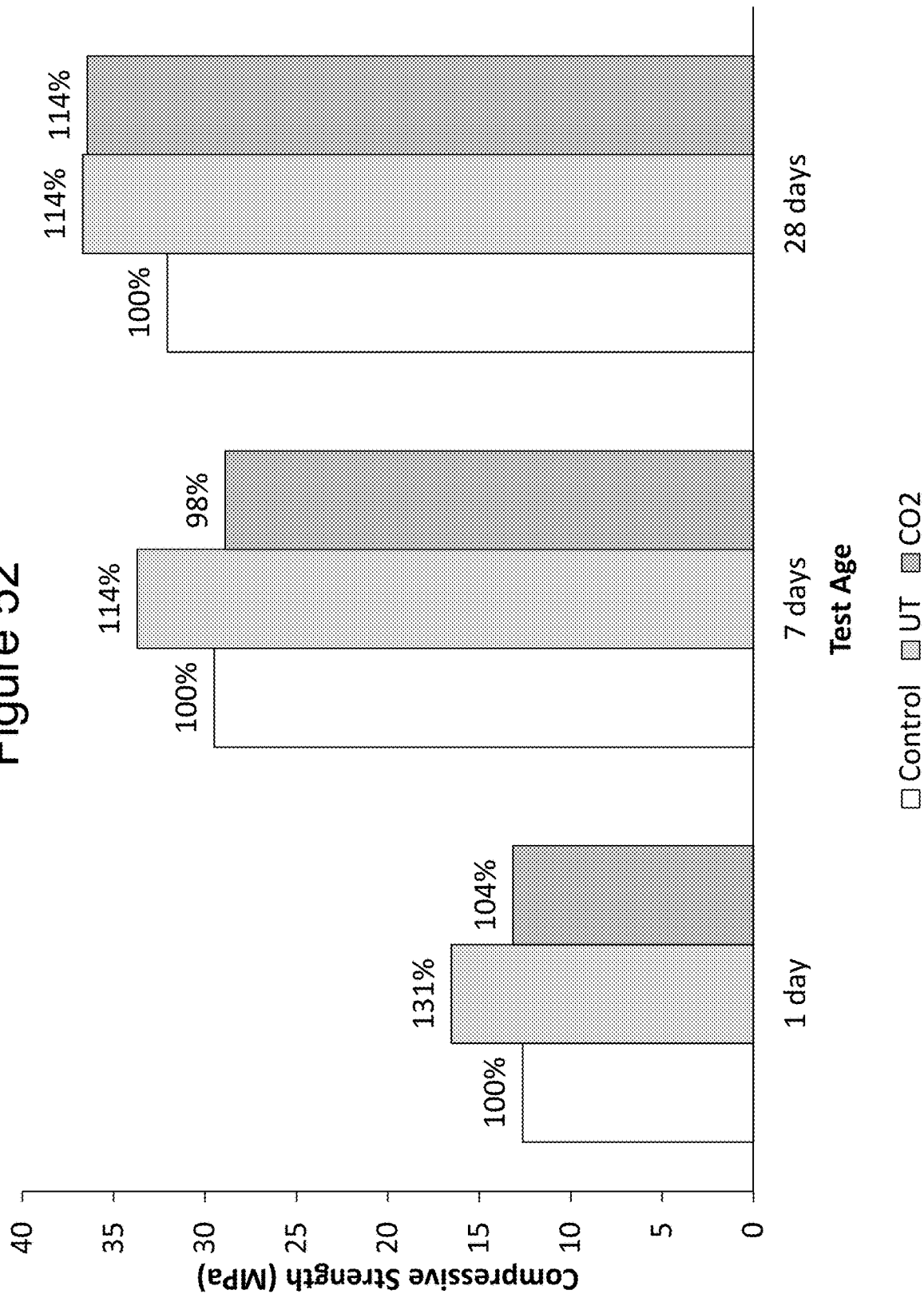
FIG. 52 shows the results for compressive strength of mortar cubes made with one-day old wash water subject to continuous agitation, wash water solids and mortar at 25% class F fly ash/75% OPC (Cemex Cemopolis cement).

FIG. 52 shows the results for compressive strength of mortar cubes made with one-day old wash water subject to continuous agitation, wash water solids and mortar at 25% class F fly ash/75% OPC (Cemex Cemopolis cement). Wash water increased strength, Untreated wash water was better than CO2 treated wash water at 1 and 7 days, but both showed equal benefit at 28 days. Slumps were control: 118, Untreated wash water: 70; CO2-treated wash water, 90.

Figure 53:
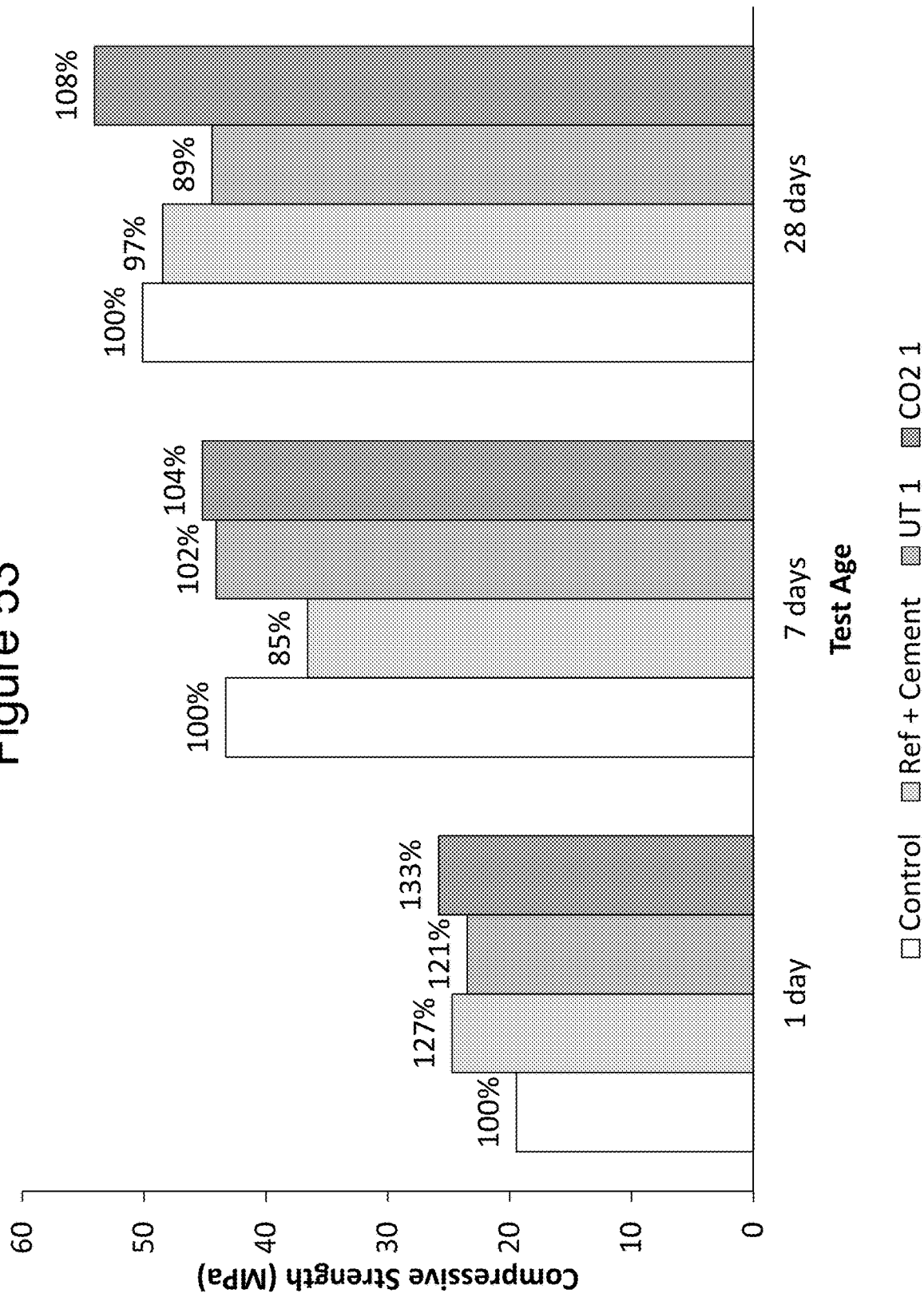
FIG. 53 shows the results for compressive strength of mortar cubes made with one-day old wash water subject to continuous agitation, wash water solids and mortar at 100% OPC (Cemex Cemopolis cement).

FIG. 53 shows the results for compressive strength of mortar cubes made with one-day old wash water subject to continuous agitation, wash water solids and mortar at 100% OPC (Cemex Cemopolis cement). Reference was extra cement equivalent to the mass of the suspended solids in the wash water. Increased cement improved early but not late strength. CO2 wash water was better than untreated wash water at all ages. CO2 wash water was better than extra cement addition at all ages Slumps were control: 110, Reference with cement: 100; Untreated wash water: 55; CO2-treated wash water, 50.

Figure 54:
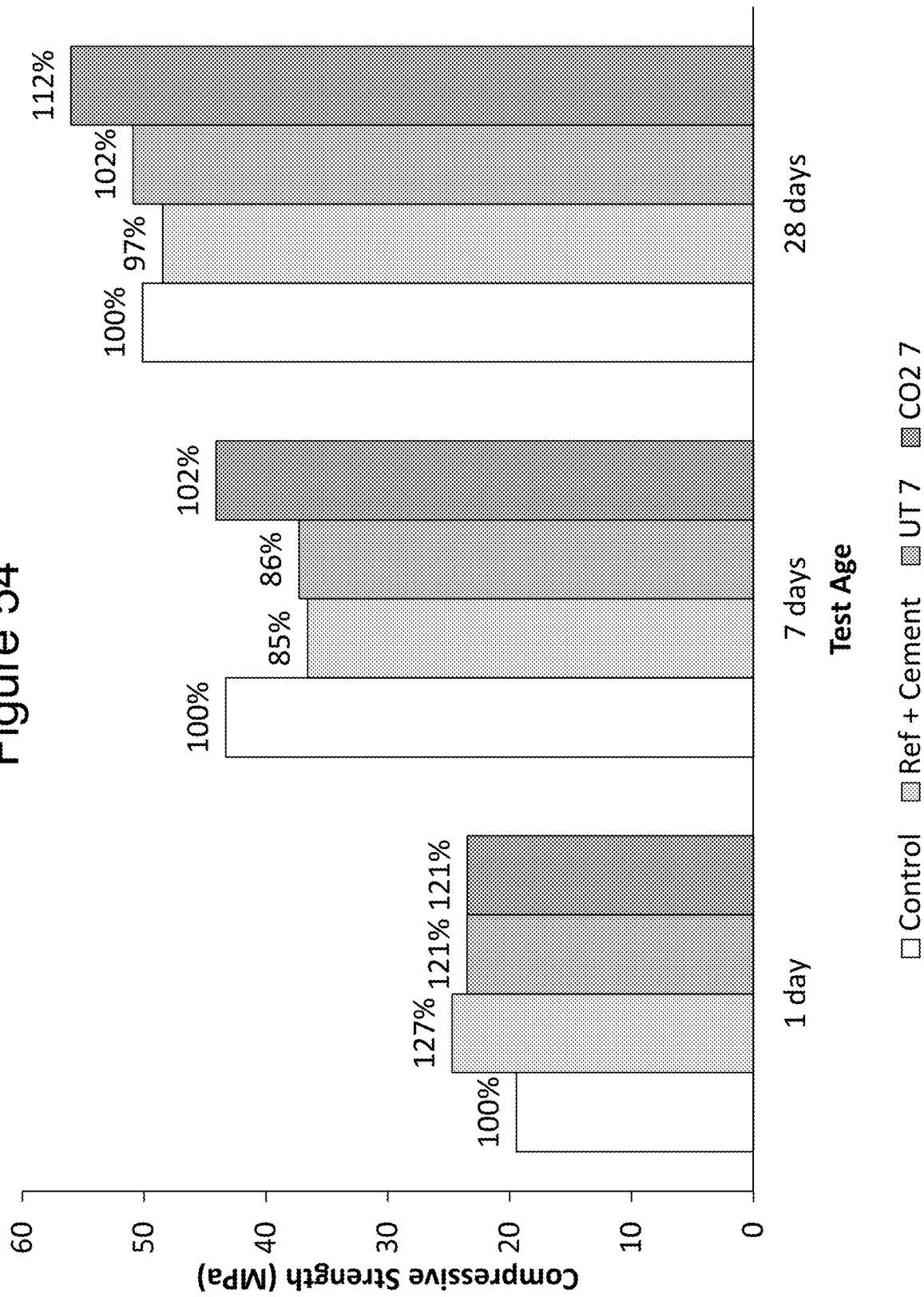
FIG. 54 shows the results for compressive strength of mortar cubes made with seven-day old wash water subject to continuous agitation, wash water solids and mortar at 100% OPC (Cemex Cemopolis cement).

FIG. 54 shows the results for compressive strength of mortar cubes made with seven-day old wash water subject to continuous agitation, wash water solids and mortar at 100% OPC (Cemex Cemopolis cement). Reference was extra cement equivalent to the mass of the suspended solids in the wash water. Increased cement improved early but not late strength. CO2 wash water was equivalent to or better than untreated wash water at all ages. CO2 wash water was better than extra cement addition at later ages, and better than potable water control at 1 and 28 days. Slumps were control: 110, Reference with cement: 100; Untreated wash water: 30; CO2-treated wash water, 60.

Example 8

Lab scale concrete production compared concrete batches made with potable water, untreated wash water and wash water treated with carbon dioxide. The wash water was used at two ages (1 day and 5 days old). The sample production included three different control batches, each at a different w/c. This allows for interpretations of compressive strength if there is a variation in w/b among the test batches.

TABLE 3

Description of water in batches

| Sample | Mix water | Water Age | Batch |
|---|---|---|---|
| Control L, w/b = 0.56 | Potable water | n/a | 1 |
| Control M, w/b = 0.67 | Potable water | n/a | 4 |
| Control H, w/b = 0.75 | Potable water | n/a | 7 |
| Reference UT1 | Untreated | 1 day | 2 |
| Reference UT5 | Untreated | 5 day | 6 |
| CO2-1 | CO2 treated | 1 day | 3 |
| CO2-5 | CO2 treated | 5 day | 5 |

The wash water was sourced from a ready mixed truck through washing it after it had emptied its load. The collected wash water was sieved past a 80 μm screen and then was bottled (2 L plastic bottles). If appropriate, the wash waster was carbonated in the same manner as wash water for the mortar testing (given an excess of $CO_2$ achieved through periodic topping up and under agitation). The specific gravity of the wash water during carbonation was between 1.20 and 1.25. When used in concrete the water was diluted to a specific gravity of about ~1.08.

The batches were produced with a total binder loading of 307 kg/m$^3$ including the cement, fly ash, and solids contained within the wash water. The batches with lower and higher w/b ratios deviated from this binder loading. In terms of w/b the binder fraction included the cement, fly ash and solids contained in the wash water. The binder batches was 80% cement and 20% fly ash. Batch comparisons are made relative to the baseline of the Control M batch.

TABLE 4

Concrete mix designs in kg/m$^3$

|  | Control L | Control M | Control H | UTWW 1 | UTWW 5 | CO2WW 1 | CO2WW 5 |
|---|---|---|---|---|---|---|---|
| Cement | 258 | 246 | 221 | 231 | 231 | 231 | 231 |
| Fly Ash | 64 | 61 | 55 | 58 | 58 | 58 | 58 |

TABLE 4-continued

Concrete mix designs in kg/m³

|  | Control L | Control M | Control H | UTWW 1 | UTWW 5 | CO2WW 1 | CO2WW 5 |
|---|---|---|---|---|---|---|---|
| WW Solids | 0 | 0 | 0 | 17 | 18 | 18 | 18 |
| Total Binder | 322 | 307 | 276 | 306 | 307 | 307 | 307 |
| Sand | 847 | 822 | 882 | 822 | 822 | 822 | 822 |
| Stone | 1025 | 995 | 964 | 995 | 995 | 995 | 995 |
| Batch Water | 181 | 207 | 207 | 211 | 207 | 207 | 207 |
| Rel % cement | 105% | 100% | 90% | 94% | 94% | 94% | 94% |
| Rel % fly ash | 105% | 100% | 90% | 94% | 94% | 94% | 94% |
| Rel % binder | 105% | 100% | 90% | 100% | 100% | 100% | 100% |

The wash water batches included less cement and fly ash (each reduced 6%) in a proportion equivalent to the suspended solids contained within the wash water.

The fresh properties were measured and compared relative to the Control M batch.

TABLE 5

Concrete fresh properties

|  | Control L | Control M | Control H | UTWW 1 | UTWW 5 | CO2WW 1 | CO2WW 5 |
|---|---|---|---|---|---|---|---|
| Temperature (° C.) | 20.1 | 20.3 | 19.4 | 19.8 | 19 | 19.7 | 19.8 |
| Slump (in) | 6.0 | 6.5 | 5.0 | 6.0 | 4.5 | 6.0 | 6.0 |
| Air (%) | 1.8% | 1.5% | 1.1% | 1.6% | 1.1% | 1.6% | 1.2% |
| Unit Mass (kg/m3) | 2410 | 2373 | 2381 | 2373 | 2390 | 2376 | 2373 |
| Norm Unit Mass (kg/m3) | 2454 | 2409 | 2408 | 2411 | 2416 | 2414 | 2402 |
| Rel. slump | 92% | 100% | 77% | 92% | 69% | 92% | 92% |
| Relative air | 120% | 100% | 73% | 107% | 73% | 107% | 80% |
| Rel. unit mass | 101% | 100% | 100% | 100% | 101% | 100% | 100% |

Figure 55:
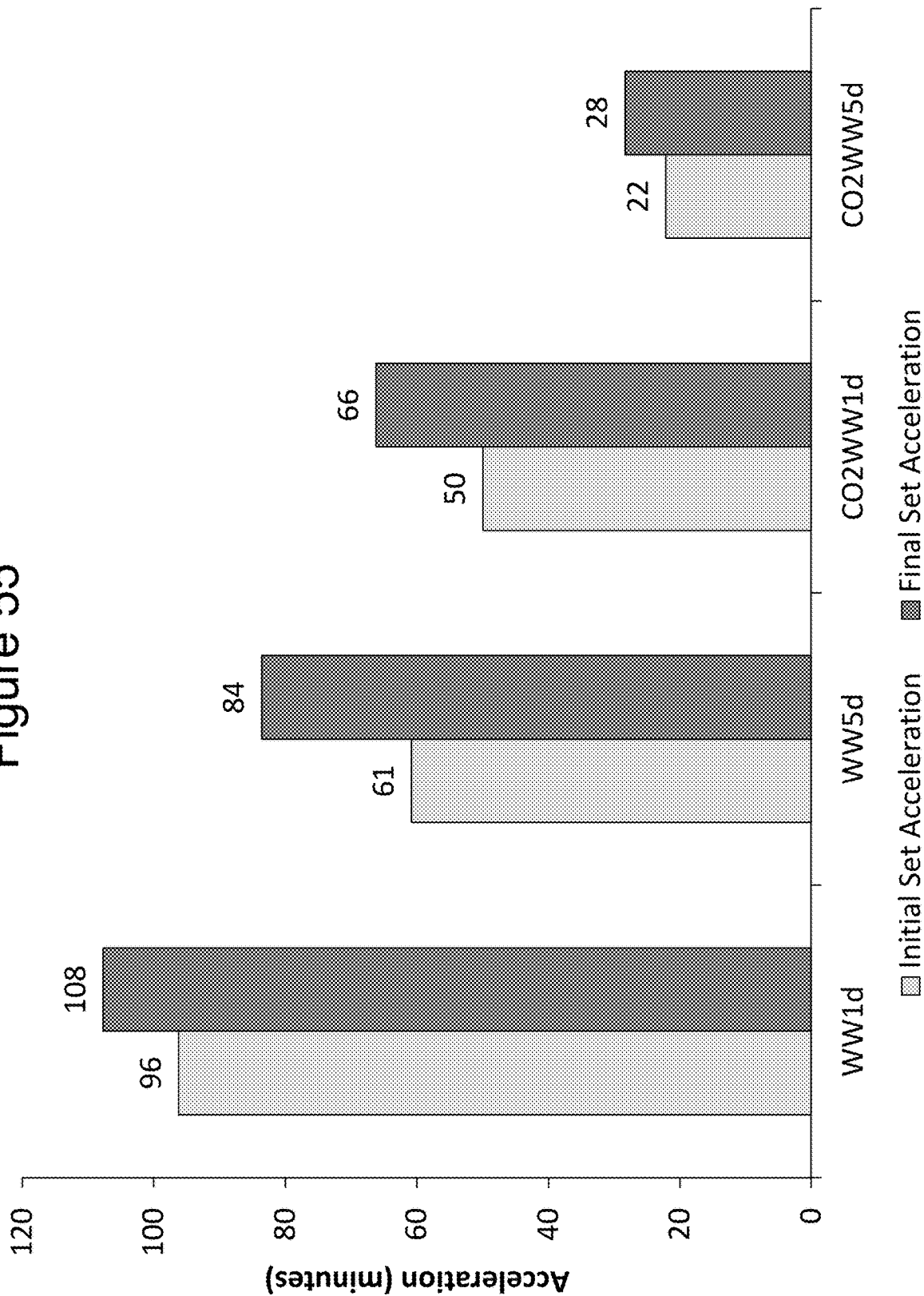
FIG. 55 shows effects of untreated and carbon dioxide-treated wash water used in mortar cubes on set times of the mortar cubes.

The effects of various treatments on set acceleration of mortar cubes made with the wash waters are shown in FIG. 55. The CO2 reduced the set acceleration. The CO2 reduced the Initial set acceleration by 48% for 1 day wash water, and 64% for 5 day old wash water. The CO2 reduced the Final set acceleration by 39% for 1 day wash water, and 66% for 5 day old wash water.

Figure 56:
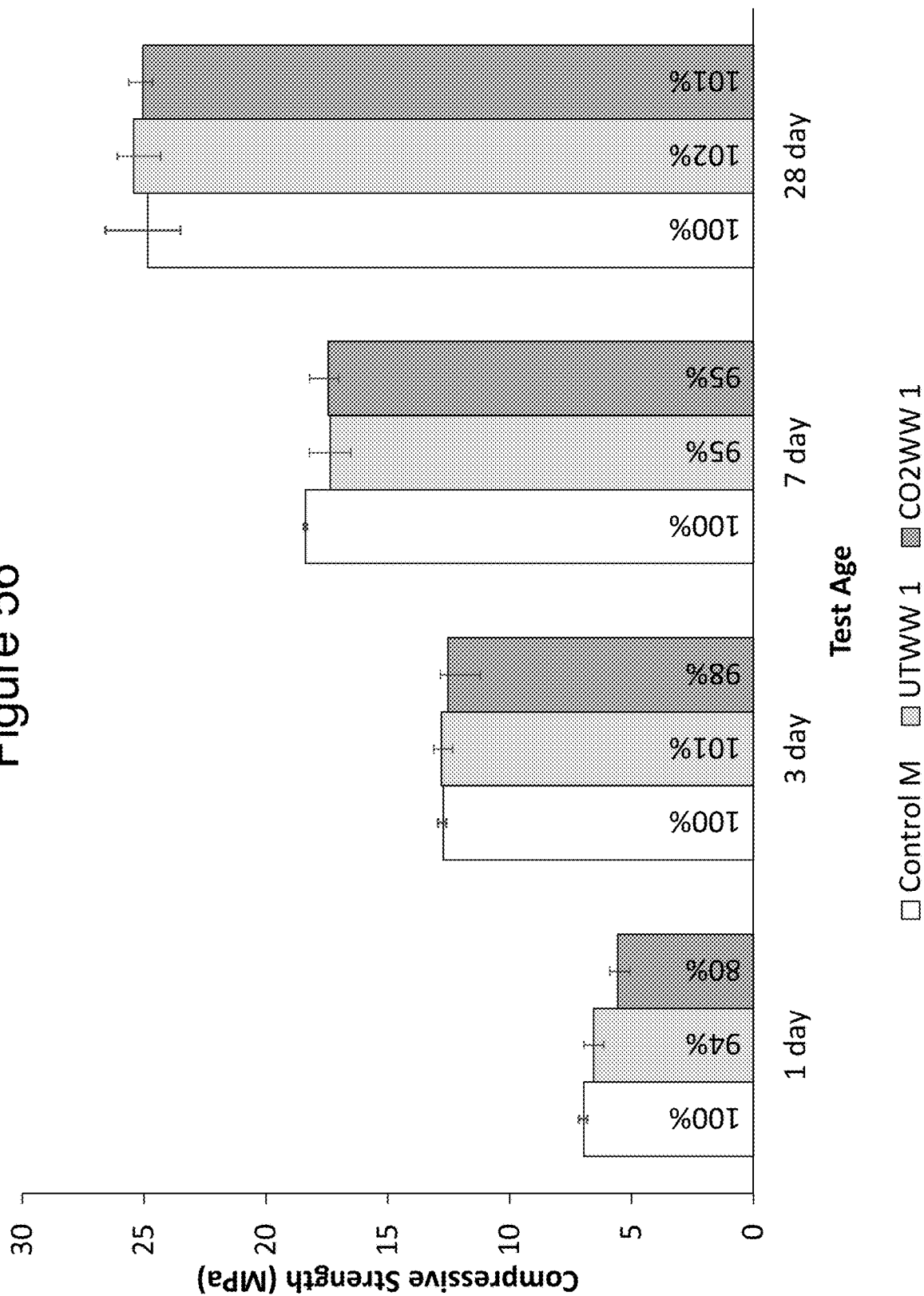
FIG. 56 shows the effects of untreated and carbon dioxide-treated wash water aged one day used in mortar cubes on compressive strengths of the mortar cubes.
Figure 57:
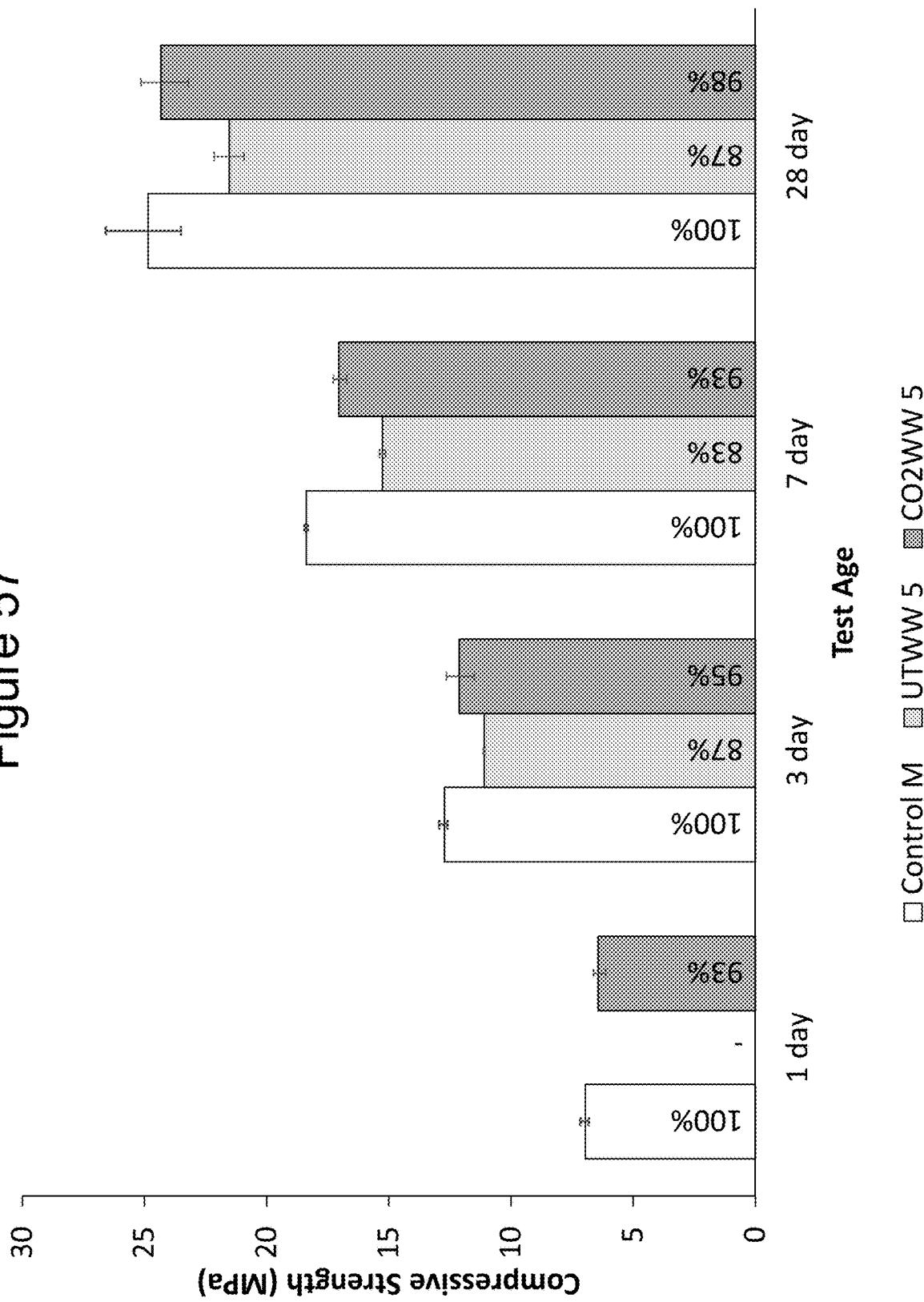
FIG. 57 shows the effects of untreated and carbon dioxide-treated wash water aged five day used in mortar cubes on compressive strengths of the mortar cubes.
Figure 58:
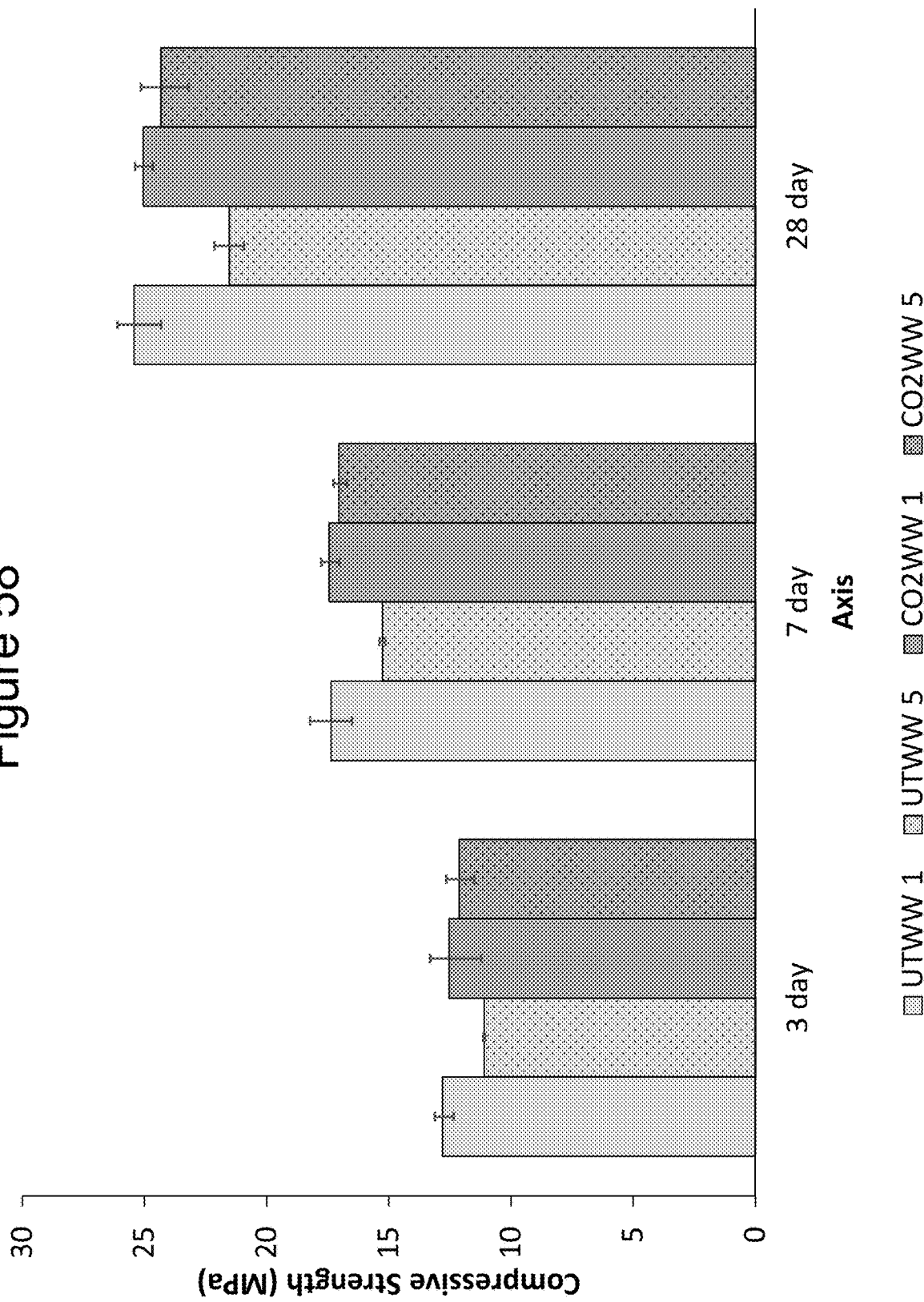
FIG. 58 shows the effects of untreated and carbon dioxide-treated wash water aged one to five day used in mortar cubes on compressive strengths of the mortar cubes.

The effects of various treatments on strength of mortar cubes made with the wash waters are shown in FIGS. 56-58. Concrete was an average of 3 specimens in all cases. FIG. 56 shows that for 1 day old wash water the concrete performs equivalent to the control at 28 days. There is 6 percent less binder in the wash water mix designs, so the corresponding amount of wash water solids contributes to the concrete strength. FIG. 57 shows the strength of concrete produced with untreated wash water aged 5 days is 13 to 17% lower than the control concrete (13% lower at 28 days). If the wash water is treated with CO2 the performance relative to the control is only 2 to 7% lower (2% lower at 28 days CO2 improves the strength of concrete produced with 5 day old wash water. FIG. 58 shows increasing the age of the wash water from 1 to 5 days meant the concrete produced with untreated water showed a strength decrease of 12-15%. If the wash water was treated with CO2 the strength with 5 day old wash water was only 2-3% less than with 1 day old wash water.

It appeared that the air content may have been impacted by the wash water. While there was no apparent impact when using 1 old day wash water, both the batches of concrete made with 5 day old wash water (both untreated and CO2 treated) had an air content about 20 to 30% lower than the control. Unit mass and normalized unit mass (normalized for air differences) were consistent among the batches.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of preparing a concrete mix comprising
   (i) adding concrete materials to a mixer;
   (ii) adding mix water to the mixer, wherein the mix water comprises carbonated concrete wash water, and wherein the wash water comprises water produced by washing-out of concrete mixer trucks following delivery of concrete; and
   (iii) mixing the water and the concrete materials to produce a concrete mix,
   wherein the carbonated concrete wash water is produced by a method comprising placing wash water in a container and circulating the wash water and adding carbon dioxide to the circulating concrete wash water, wherein the circulating wash water is in a loop in fluid communication with the concrete wash water in the container.

2. The method of claim 1 wherein the carbonated concrete wash water comprises at least 10% of the total mix water.

3. The method of claim 1 or 2 wherein the carbonated concrete mix water comprises at least 40% of the total mix water.

4. The method of any one of claims 1 to 3 wherein the mix water comprises a first portion of water that is not carbonated mix water and a second portion of mix water that comprises carbonated mix water, wherein the first batch of mix water is added to the concrete materials before the second batch of mix water.

5. The method of claim 4 wherein the first portion of water is added at a first location and the second portion of water is added at a second location, wherein the first and second locations are different.

6. The method of claim 5 wherein the second location is the drum of a ready-mix truck.

7. The method of any one of claims 4 to 6 wherein the second portion of mix water is added at least 2 minutes after the first portion.

8. The method of any one of claims 1 to 7 wherein the carbonated concrete wash water has a density of at least 1.10 g/cm$^3$.

9. The method of any one of claims 1 to 8 wherein the carbonated concrete wash water has been held for at least 1 day.

10. The method of any one of claims 1 to 9 wherein the mix water comprises carbonated wash waster in an amount that results in a concrete mix that is at least 5% stronger at a time after pouring than the same concrete mix made without carbonated wash water.

11. The method of claim 1 wherein the mix water comprises carbonated wash water in an amount that allows the concrete mix to contain at least 5% less cement than, and retain a compressive strength after pouring of within 5% of, the same concrete mix made without carbonated wash water and with the extra 5% cement.

12. The method of claim 1 wherein the wash water has been treated with carbon dioxide in such a manner that the carbon dioxide content of the water increases at least 10% beyond saturation achieved by bubbling carbon dioxide through the water, until saturation is achieved, without using manipulation of the water beyond the contact with the carbon dioxide gas.

13. The method of claim 1 wherein the carbonated wash water comprises products of carbonation of the wash water, wherein the products account for a carbon dioxide content of at least 5% by weight cement.

14. The method of claim 13 wherein the carbonated wash water comprises products of carbonation of the wash water, wherein the products account for a carbon dioxide content of at least 10% by weight cement.

15. The method of claim 1 wherein some or all of the carbon dioxide used in carbonating the wash water is from a cement kiln operation in proximity to the location where the concrete mix is produced.

16. The method of claim 1 wherein some or all of the carbon dioxide used in carbonating the wash water is from a cement kiln operation that produces cement for use in a facility where the concrete mix is produced.

17. The method of claim 1 wherein the carbonated wash water has a density of at least 1.15 gm/cm$^3$.

18. The method of claim 1 wherein the carbonated wash water has a density of at least 1.20 gm/cm$^3$.

* * * * *